(12) United States Patent
Massey, Jr.

(10) Patent No.: US 10,696,484 B2
(45) Date of Patent: Jun. 30, 2020

(54) CONVEYOR SYSTEM

(71) Applicant: George W. Massey, Jr., Edisto, SC (US)

(72) Inventor: George W. Massey, Jr., Edisto, SC (US)

( * ) Notice: Subject to any disclaimer, the term of this patent is extended or adjusted under 35 U.S.C. 154(b) by 0 days.

(21) Appl. No.: 16/541,357

(22) Filed: Aug. 15, 2019

(65) Prior Publication Data

US 2020/0055673 A1 Feb. 20, 2020

Related U.S. Application Data

(60) Provisional application No. 62/764,903, filed on Aug. 16, 2018.

(51) Int. Cl.
*B62J 13/04* (2006.01)
*B65G 21/08* (2006.01)
*B65G 23/44* (2006.01)

(52) U.S. Cl.
CPC ............ *B65G 21/08* (2013.01); *B65G 23/44* (2013.01); *B65G 2207/40* (2013.01); *B65G 2812/02108* (2013.01)

(58) Field of Classification Search
CPC .......... B62J 13/04; B65G 21/08; B65G 21/23; B65G 21/44
USPC ............ 474/144, 165; 198/837, 860.1, 860.3
See application file for complete search history.

(56) References Cited

U.S. PATENT DOCUMENTS

| | | | | |
|---|---|---|---|---|
| 1,985,839 A * | 12/1934 | Rutkoskie | ................. | B41L 1/00 118/202 |
| 3,623,246 A * | 11/1971 | Skomial et al. | ........ | E02F 3/083 37/348 |
| 3,856,133 A | 12/1974 | Dyachkov | | |
| 3,885,471 A * | 5/1975 | Morine | ..................... | F16P 1/02 474/144 |
| 4,240,303 A * | 12/1980 | Mosley | .................... | B62M 9/00 474/144 |
| 4,583,451 A * | 4/1986 | Kanagy | .................... | A21B 1/48 198/403 |
| 6,231,136 B1 * | 5/2001 | Freeman | ................ | B62D 25/16 305/107 |
| 6,330,147 B1 | 12/2001 | Adams et al. | | |

(Continued)

OTHER PUBLICATIONS

U.S. Appl. No. 16/053,167, filed Aug. 2, 2018.

*Primary Examiner* — Douglas A Hess
(74) *Attorney, Agent, or Firm* — Dority & Manning, P.A.

(57) ABSTRACT

Conveyor systems and assemblies for use in conveyor systems are provided. In some embodiments, a conveyor system comprises a mechanical chain and a chain adjustment assembly. In other embodiments, a conveyor system comprises a panel mount assembly, and in still other embodiments, a conveyor system comprises a support structure and a leveling assembly. In yet other embodiments, a conveyor system comprises a conveyor track assembly and a conveyor top protection assembly. Any embodiment of the conveyor system may also comprise a blocking bar configured to be positioned under a lower conveyor track assembly and/or a cap positioned between an end of a conveyor track assembly and a sprocket. Further, a cover assembly for a conveyor system may comprise a shield positioned over a sprocket assembly and/or an idler assembly of the conveyor system. A guard for positioning at an end of the conveyor system also may be provided.

20 Claims, 50 Drawing Sheets

(56) References Cited

U.S. PATENT DOCUMENTS

| | | | |
|---|---|---|---|
| 6,715,274 B2* | 4/2004 | Peeters | A01D 57/20 |
| | | | 56/366 |
| 7,011,208 B2 | 3/2006 | Nakashima | |
| 7,971,707 B2 | 7/2011 | Elsner | |
| 8,662,292 B2* | 3/2014 | Brackemyer | B65G 41/006 |
| | | | 198/494 |
| 8,790,200 B2* | 7/2014 | Boissonneault | F16P 1/02 |
| | | | 474/146 |
| 8,827,069 B2* | 9/2014 | Freehill | A01D 41/1217 |
| | | | 198/595 |
| 9,856,090 B1 | 1/2018 | Massey, Jr. | |
| 10,390,485 B2* | 8/2019 | Heyns | A01F 12/446 |
| 2004/0216987 A1 | 11/2004 | Wiggins | |
| 2014/0116850 A1 | 5/2014 | Musick et al. | |
| 2014/0367228 A1 | 12/2014 | Laverdiere et al. | |
| 2017/0146135 A1 | 5/2017 | Arora | |

* cited by examiner

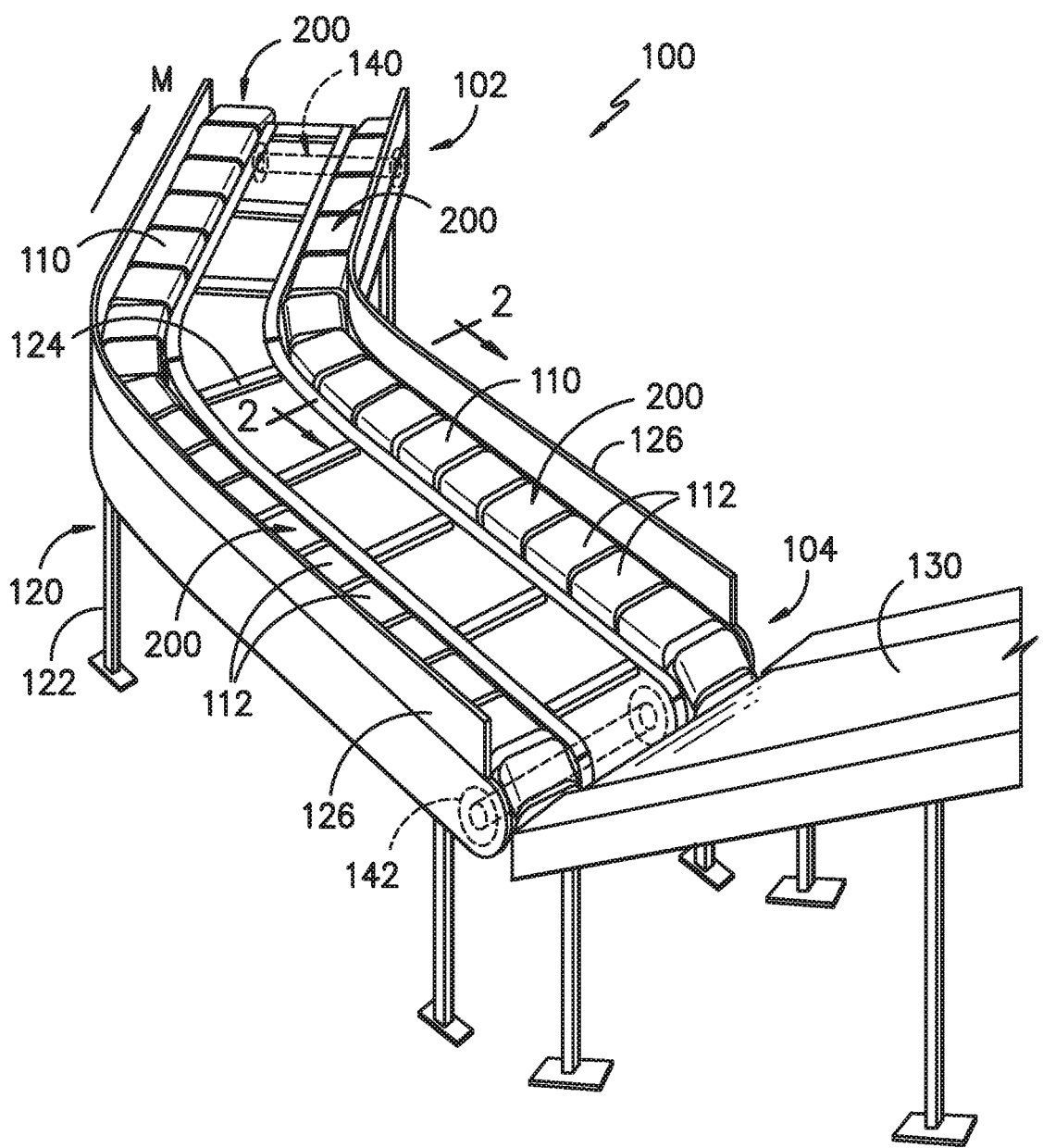
FIG. -1-

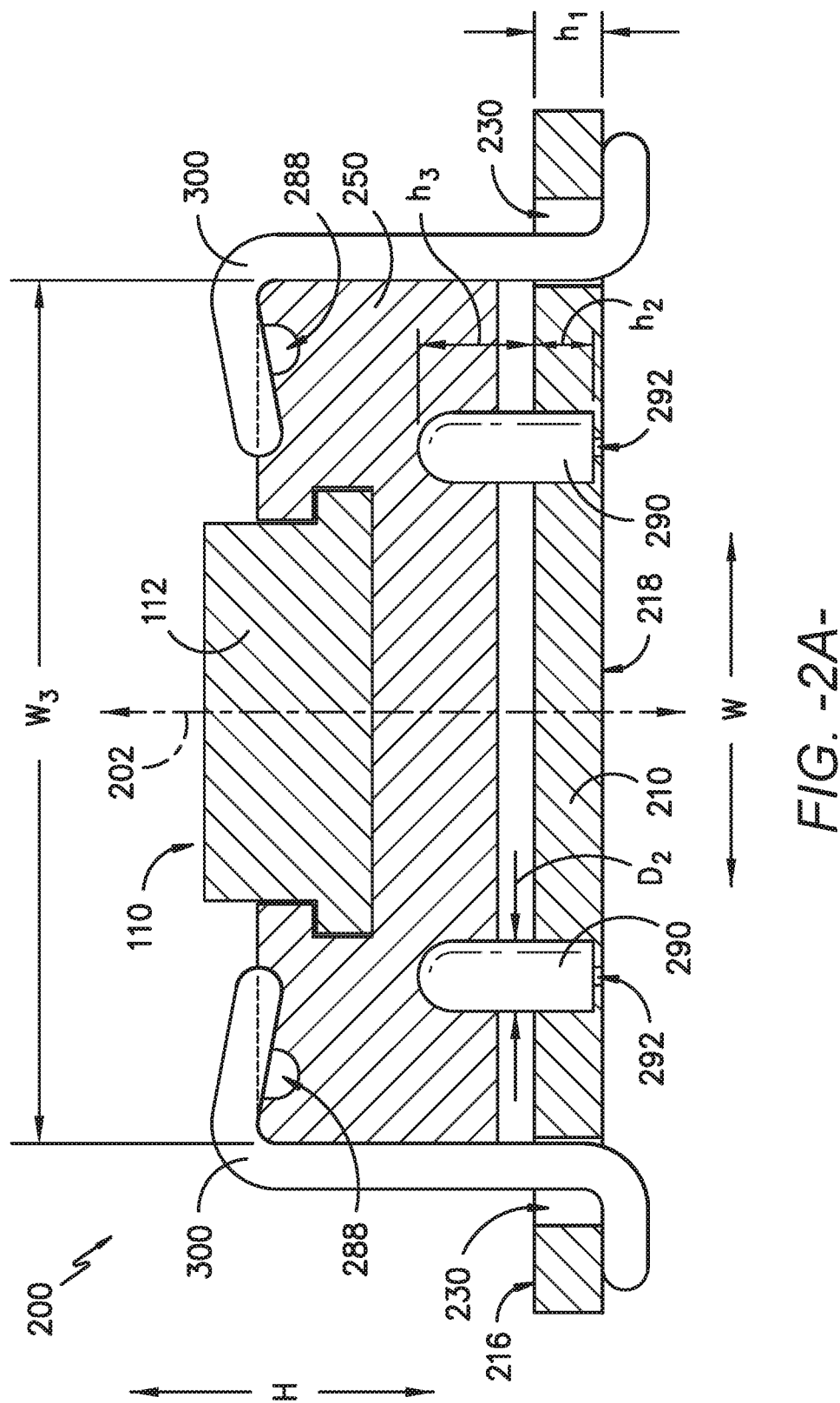
FIG. -2A-

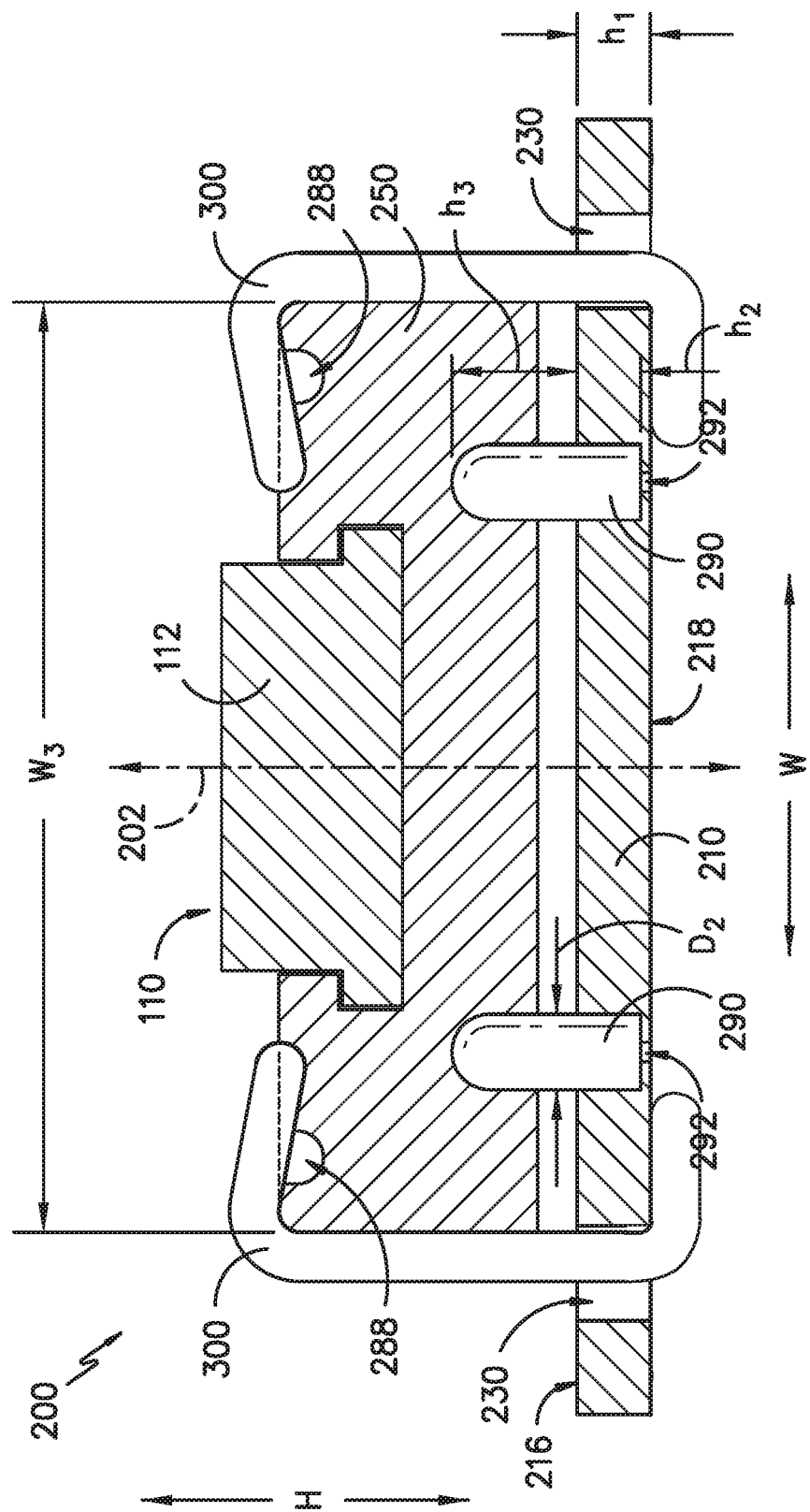
FIG. -2B-

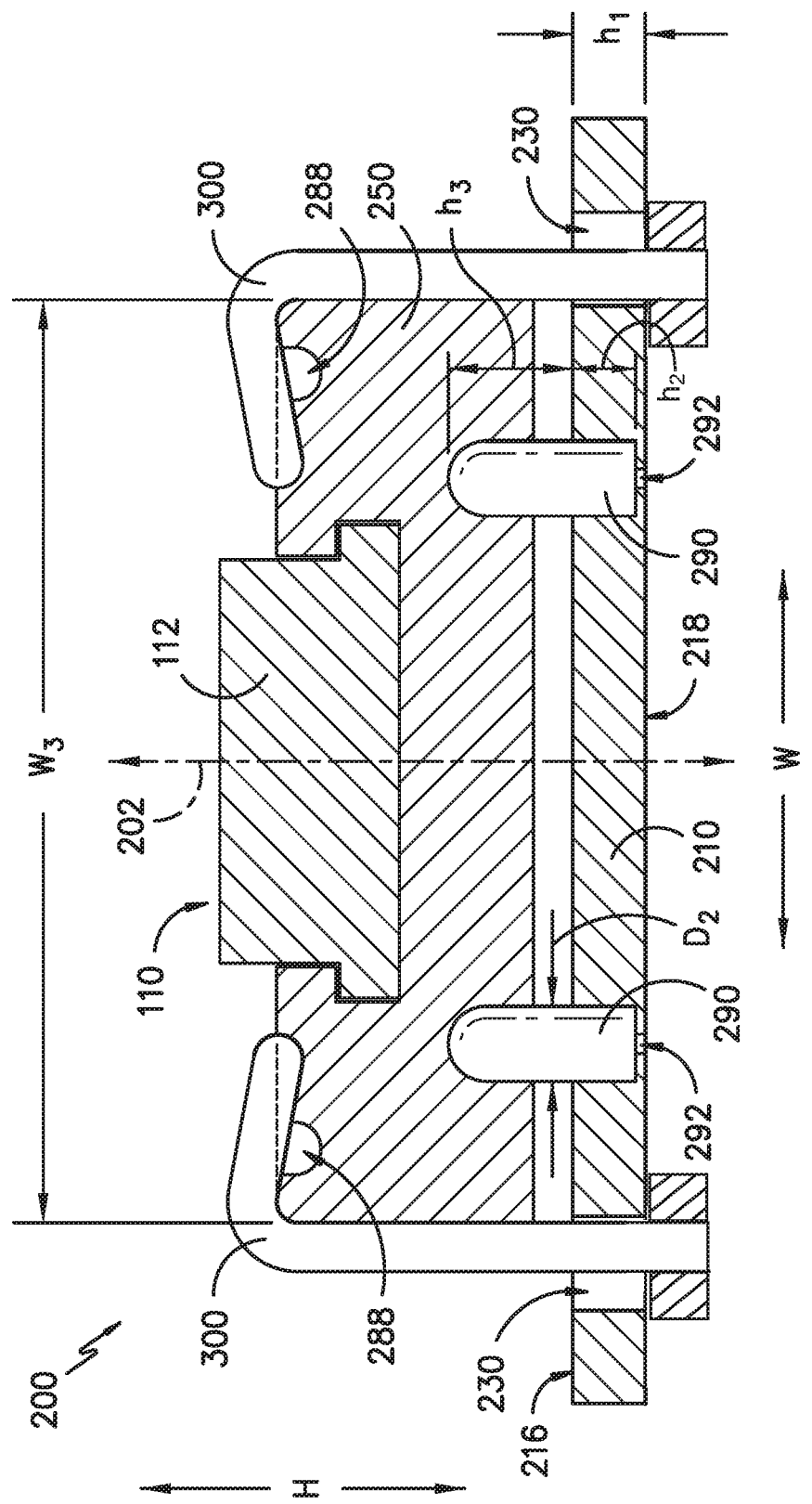
FIG. -2C-

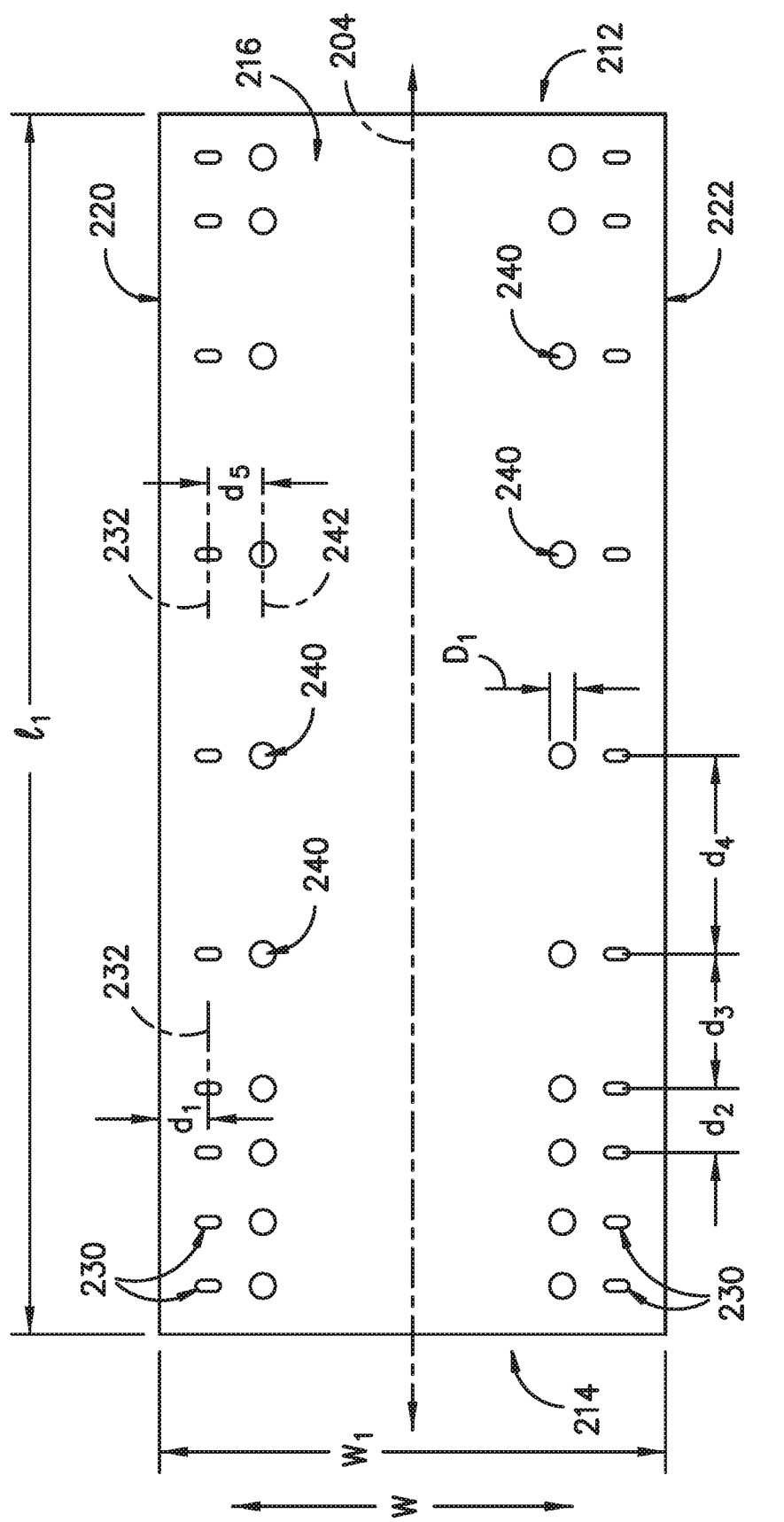
FIG. -3-

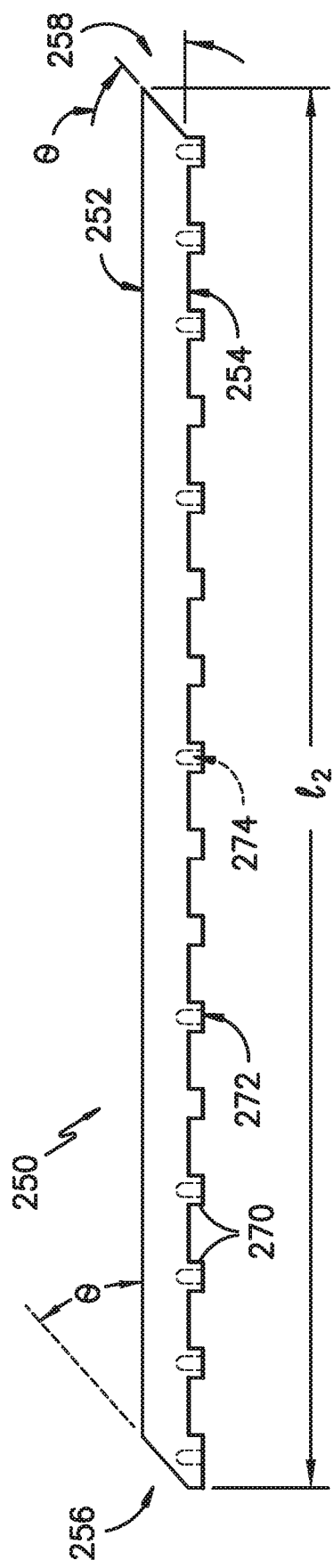
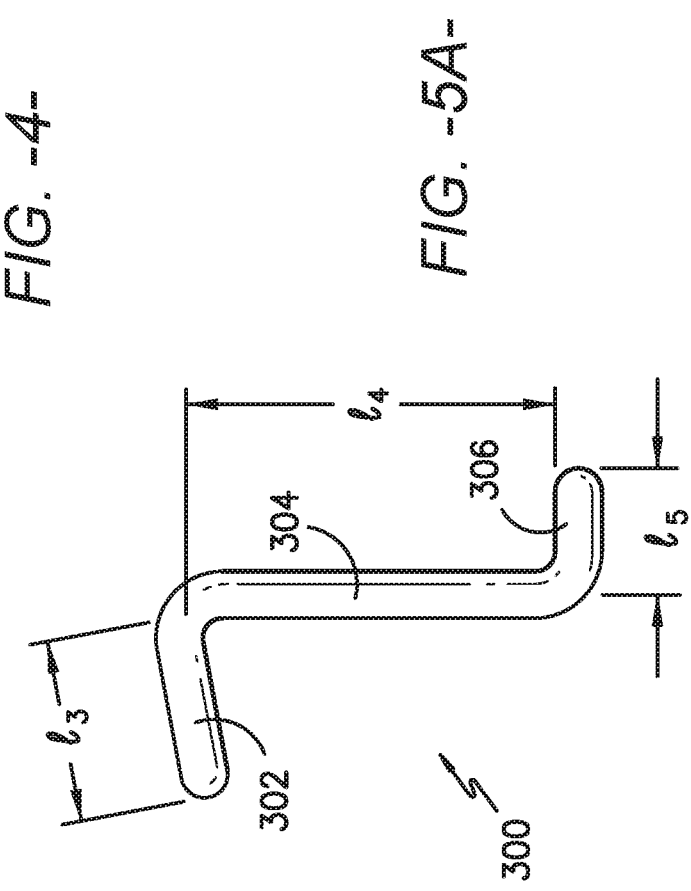

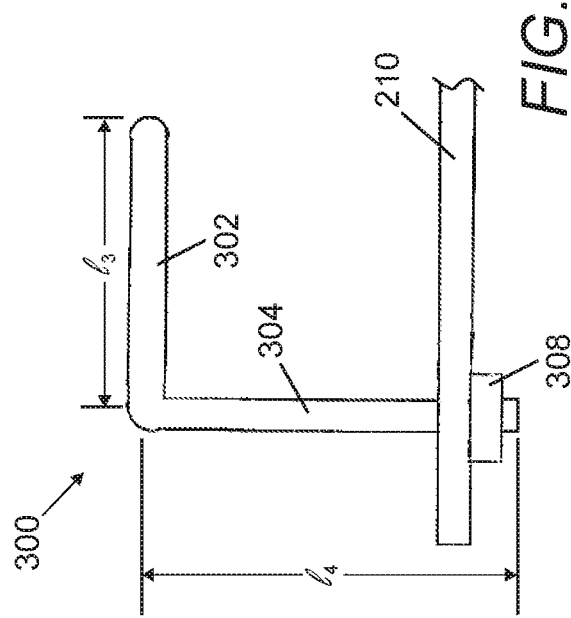
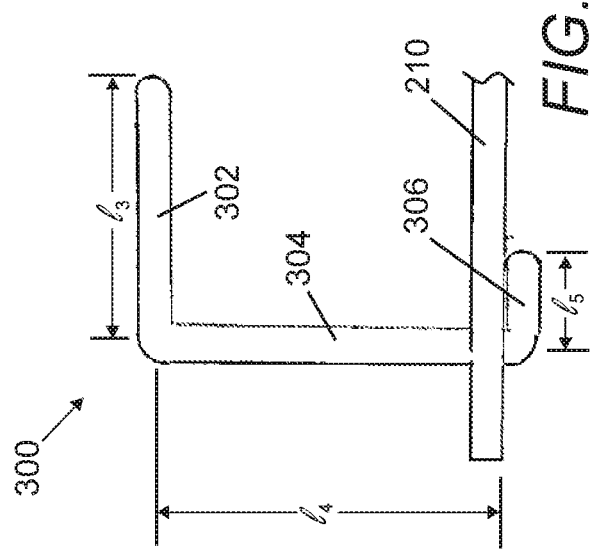
FIG. -5C-
FIG. -5B-

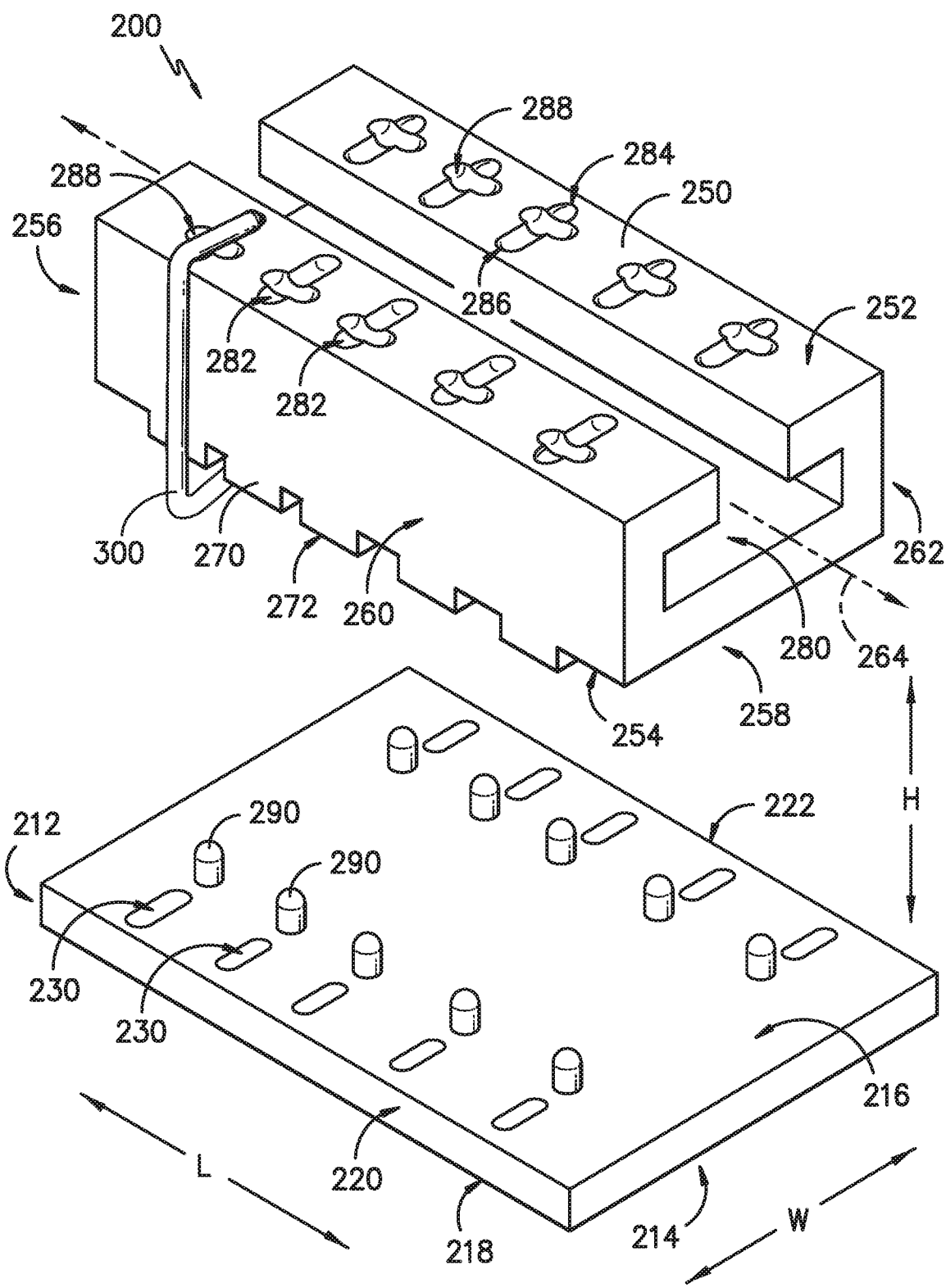
FIG. -6-

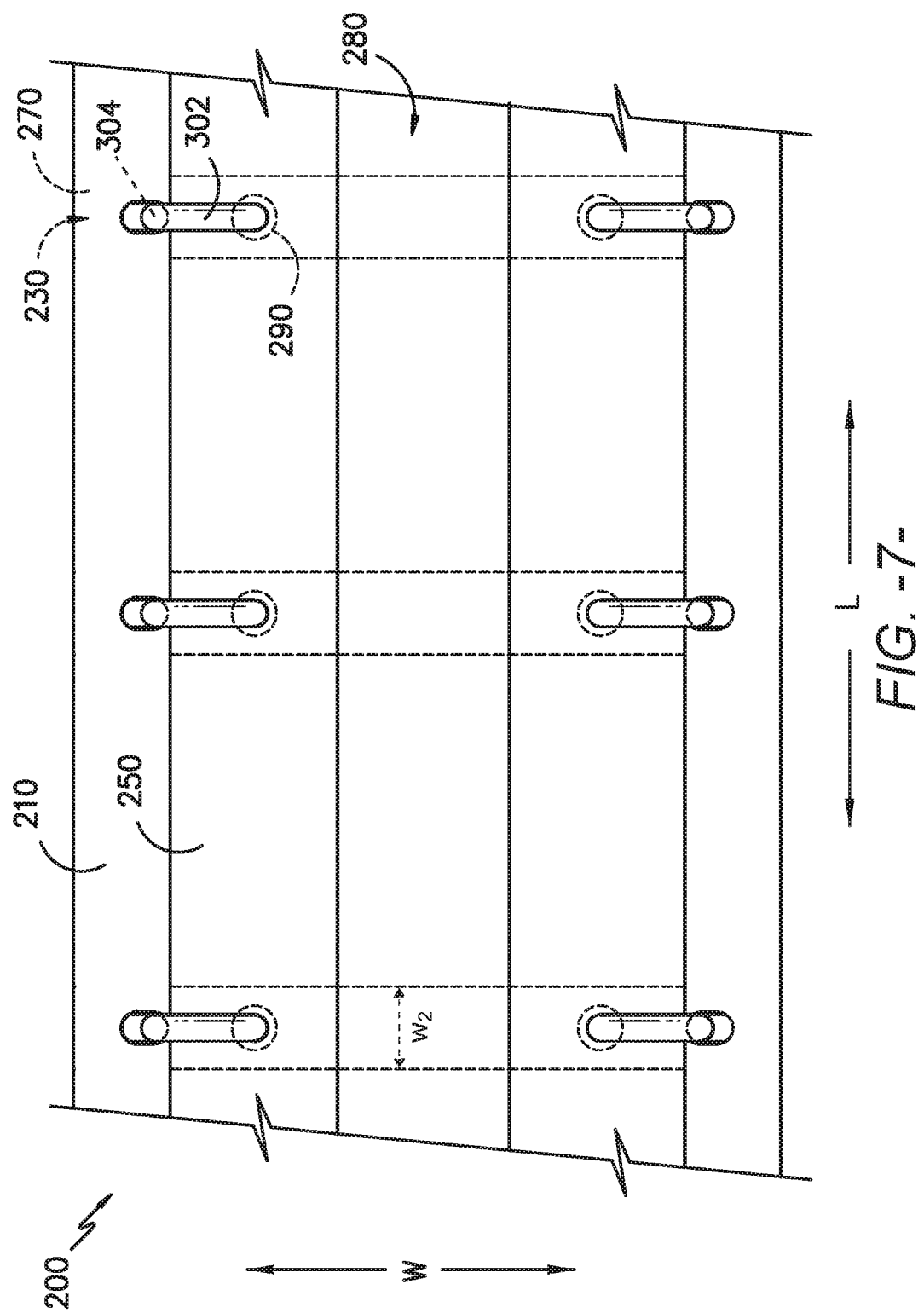

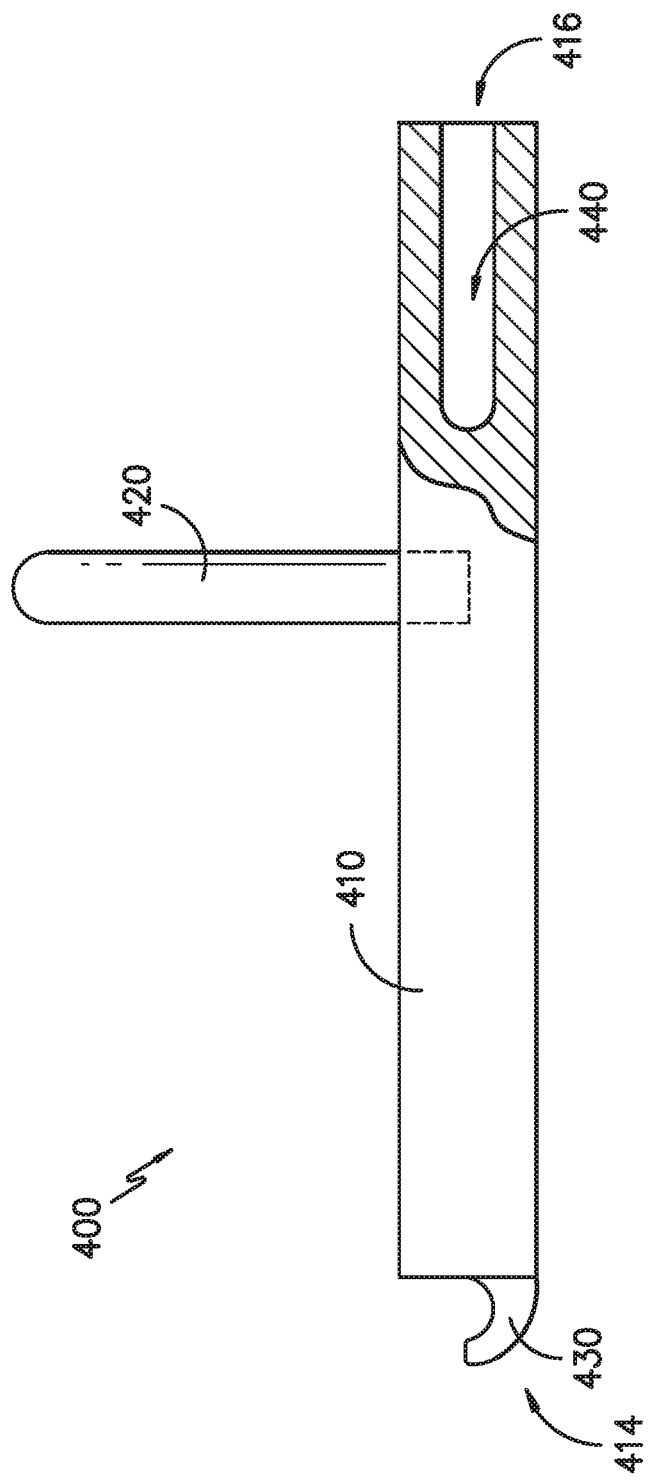

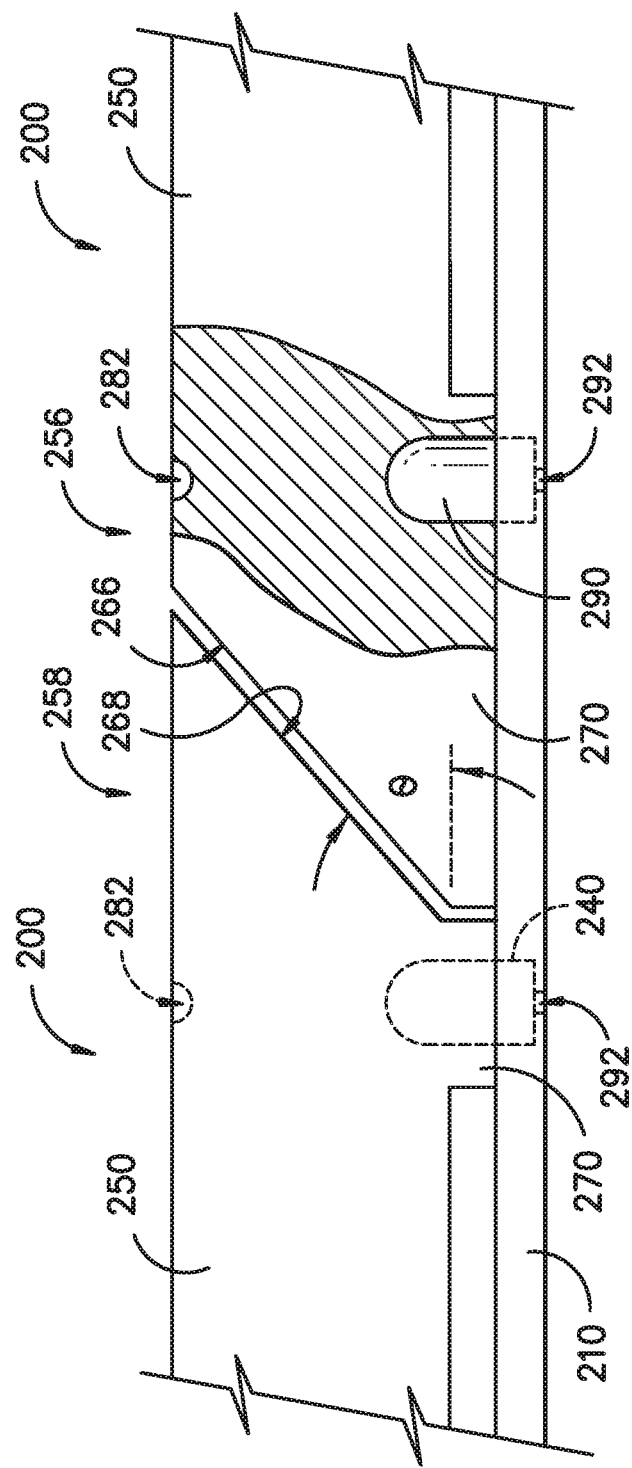
FIG. -9-

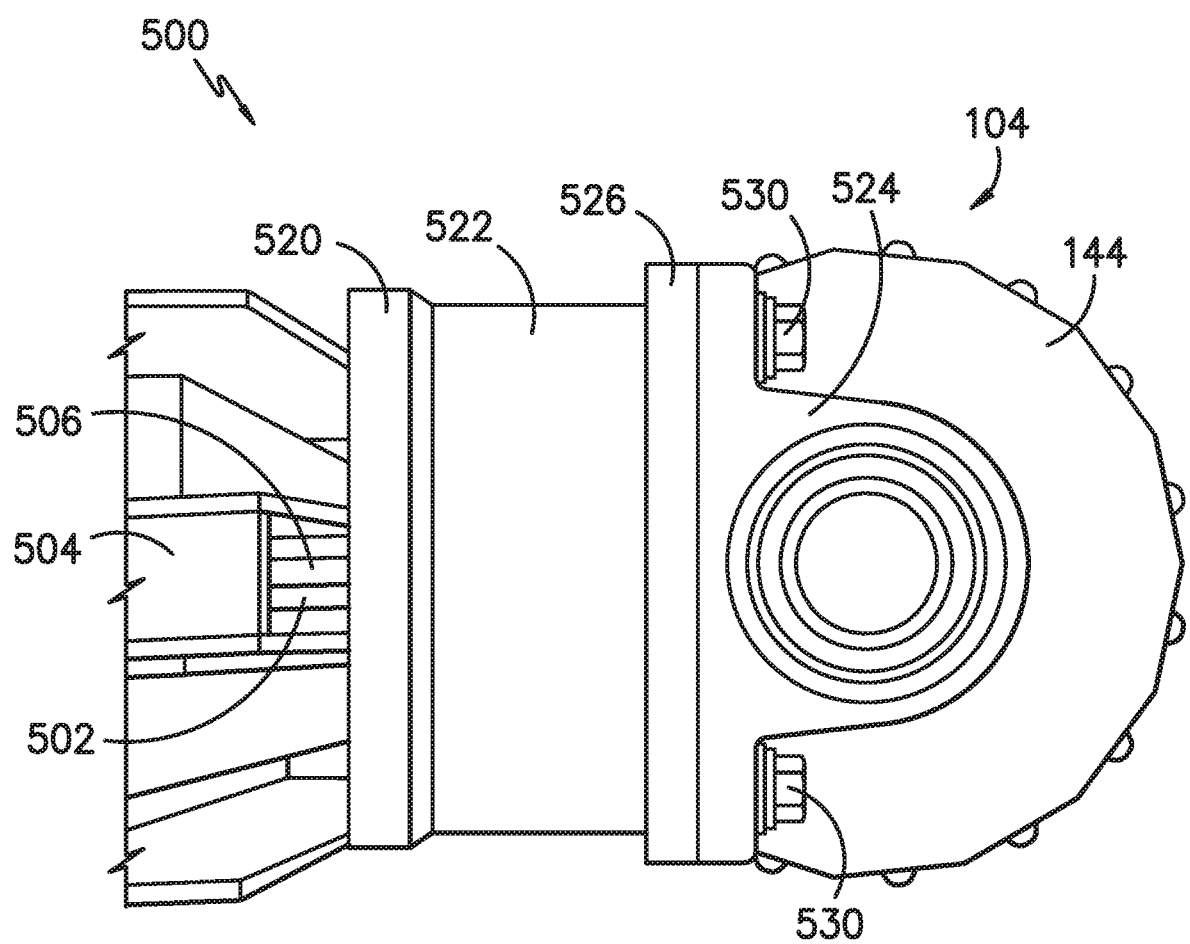
FIG. -10-

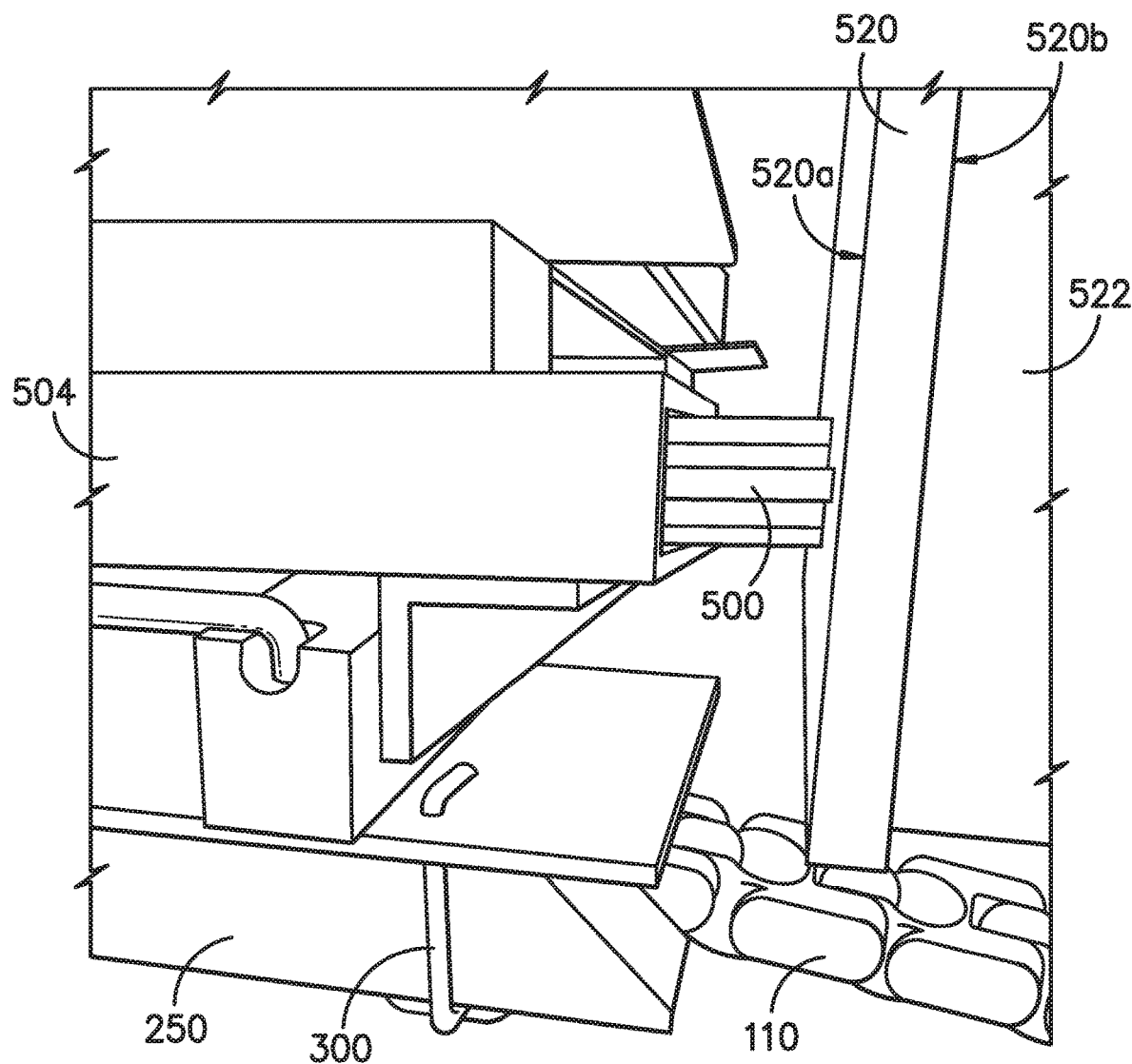
FIG. -11-

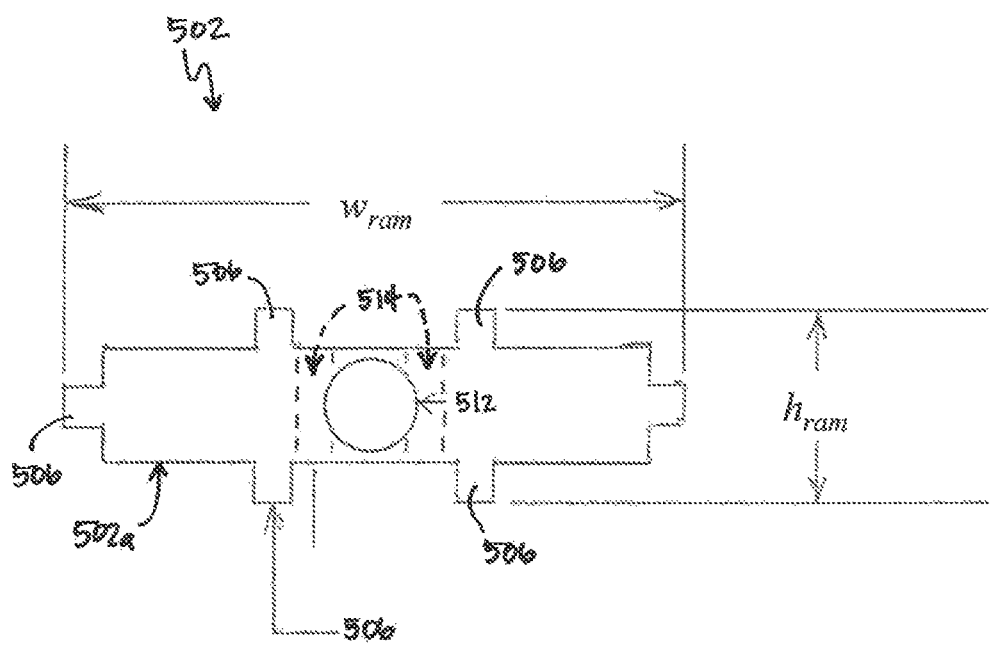
FIG. -12-

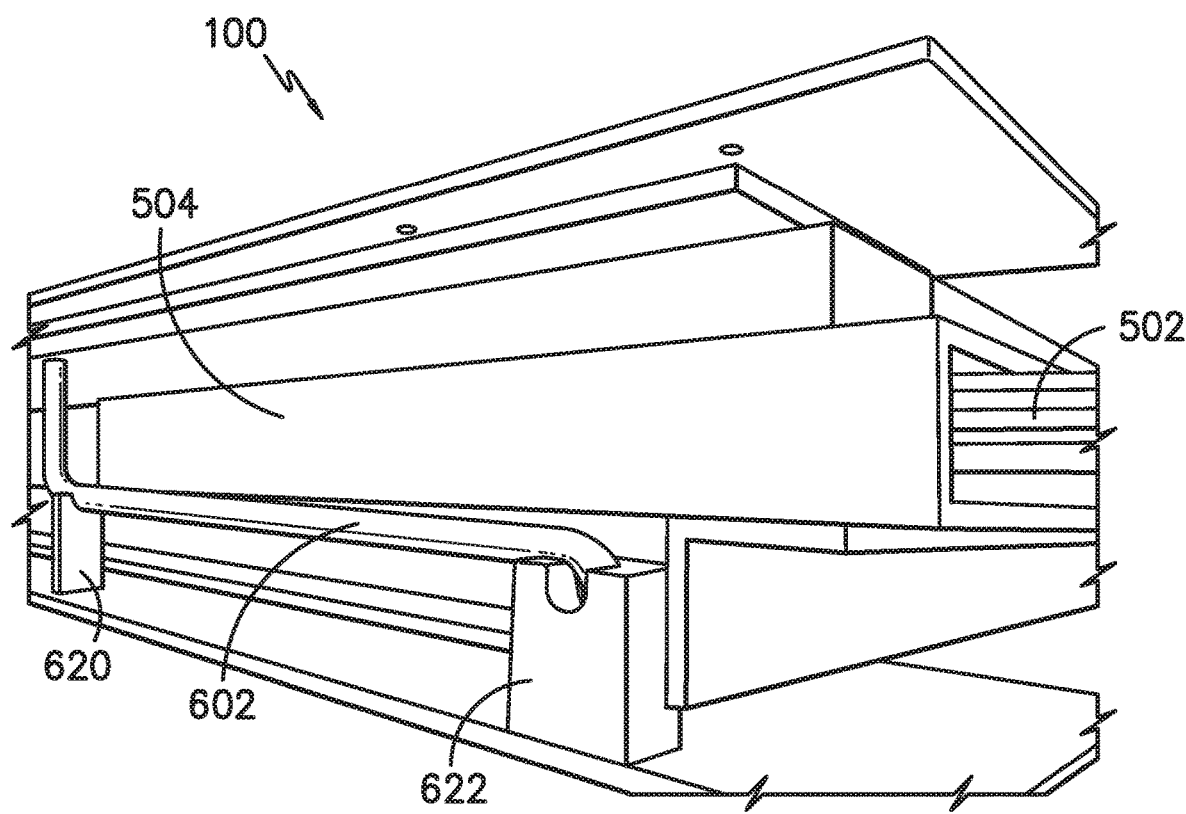
FIG. -13-

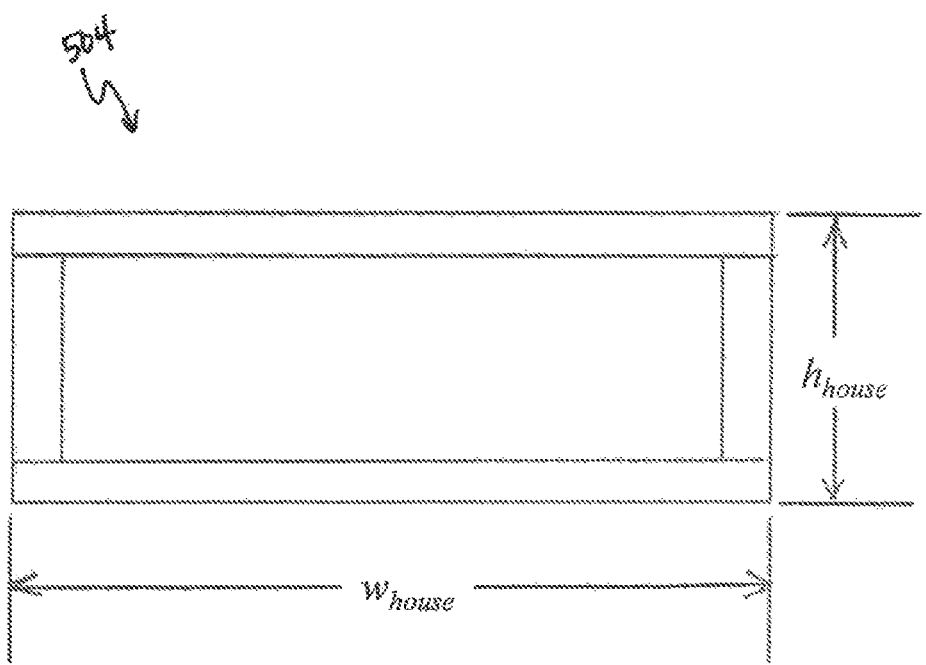
FIG. -14-

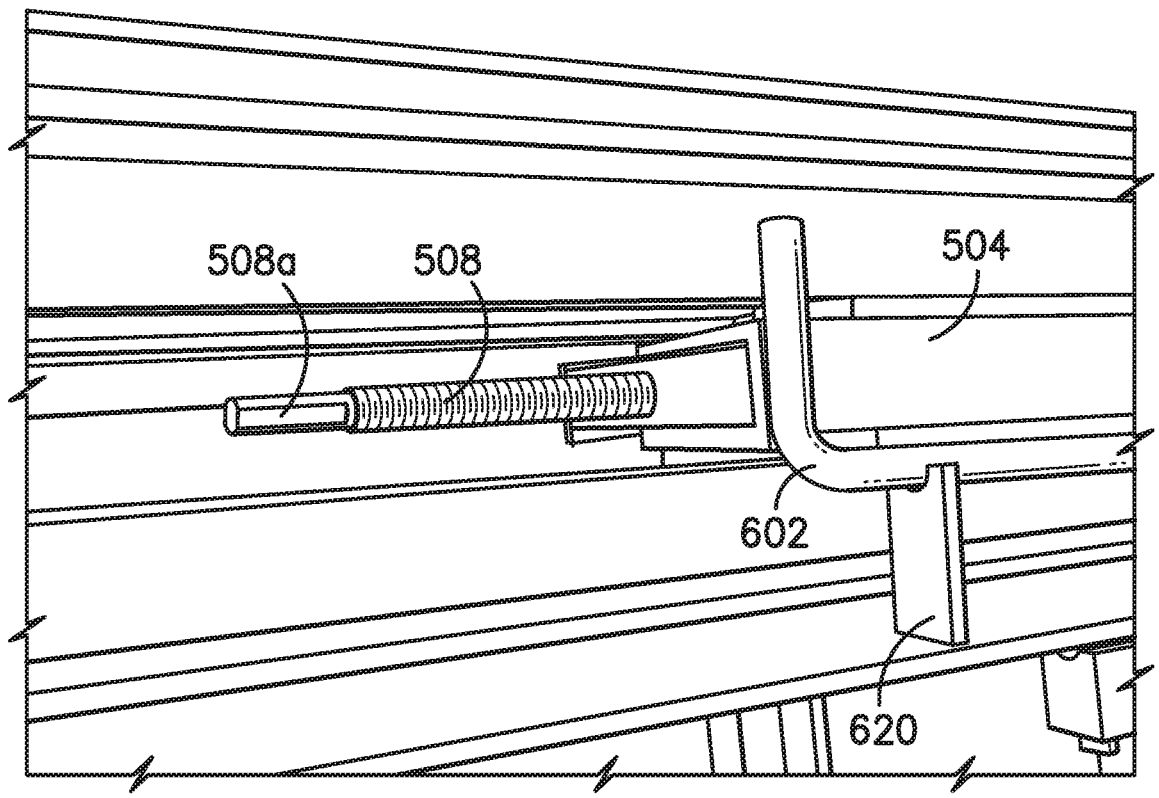
FIG. -15-

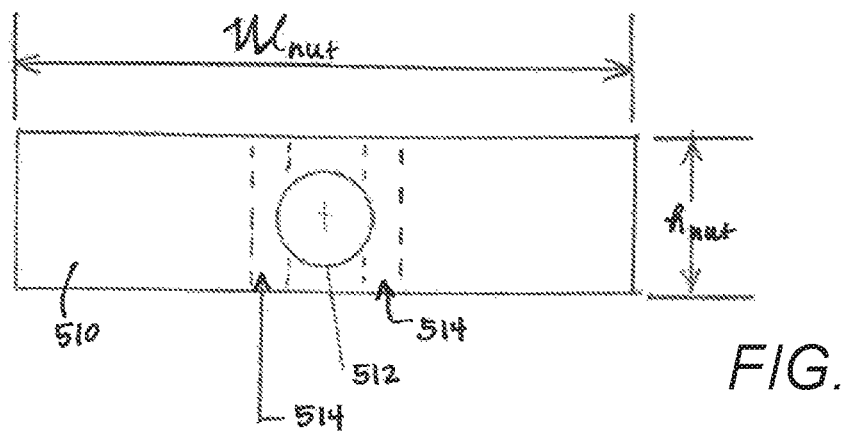
FIG. -16B-
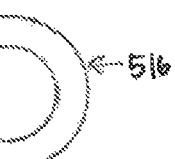
FIG. -16C-
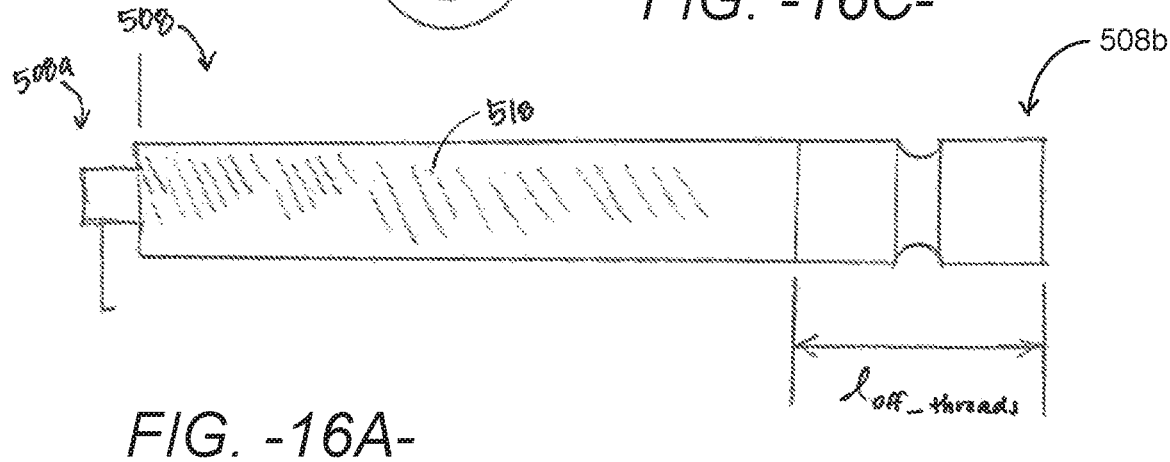
FIG. -16A-

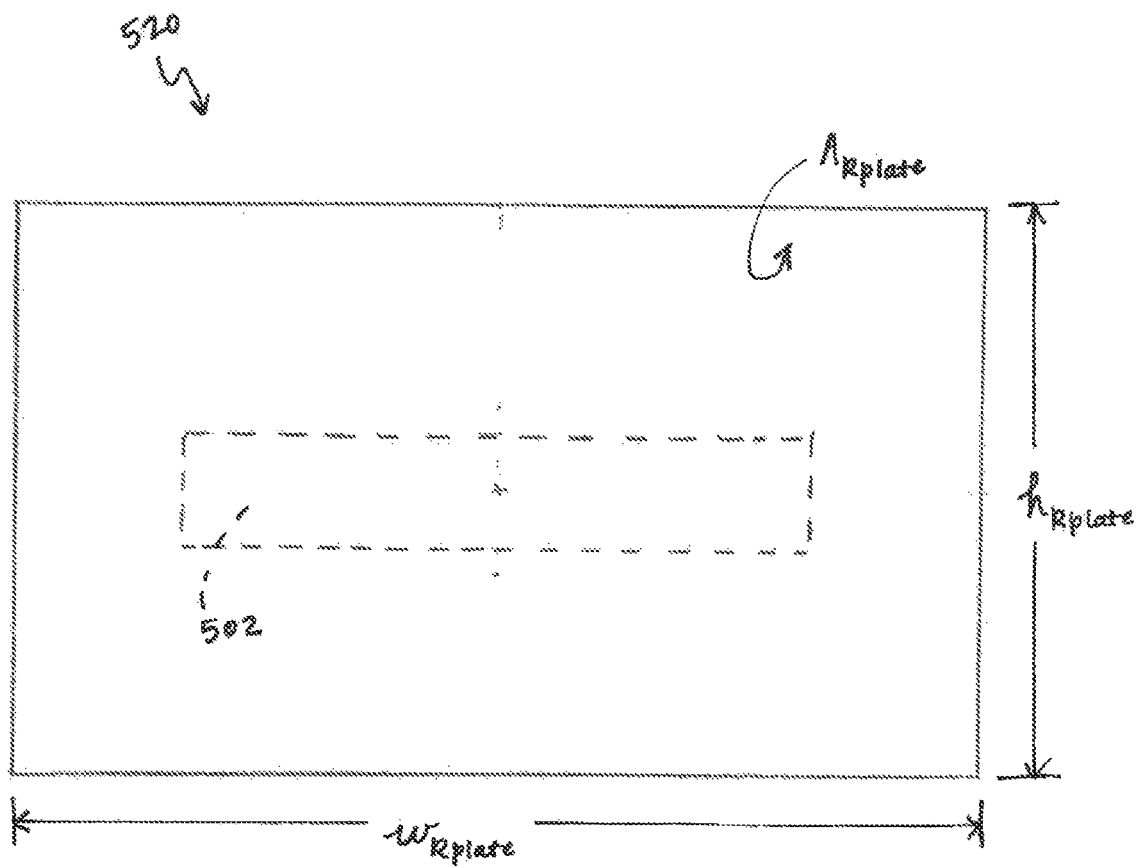
FIG. -17-

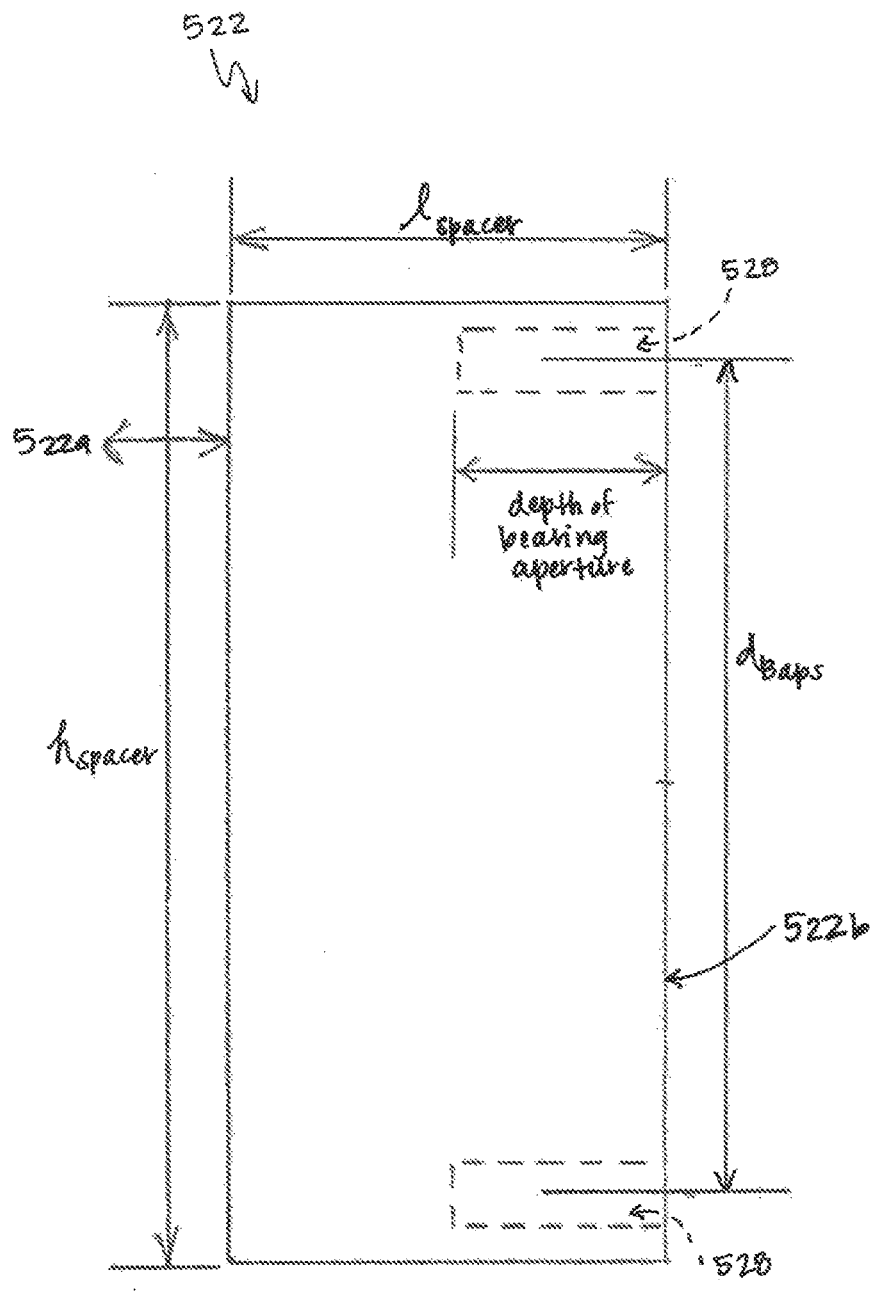
FIG. -18-

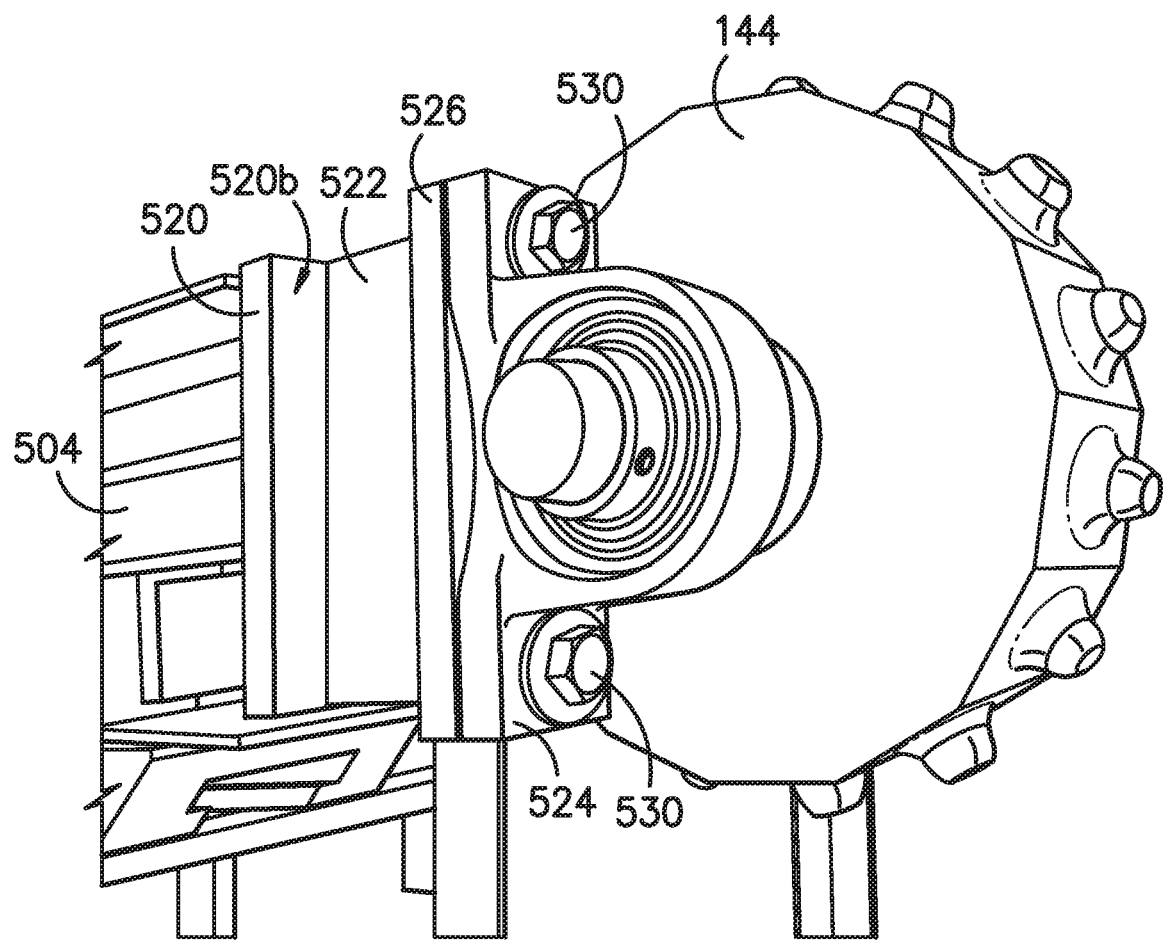
FIG. -19-

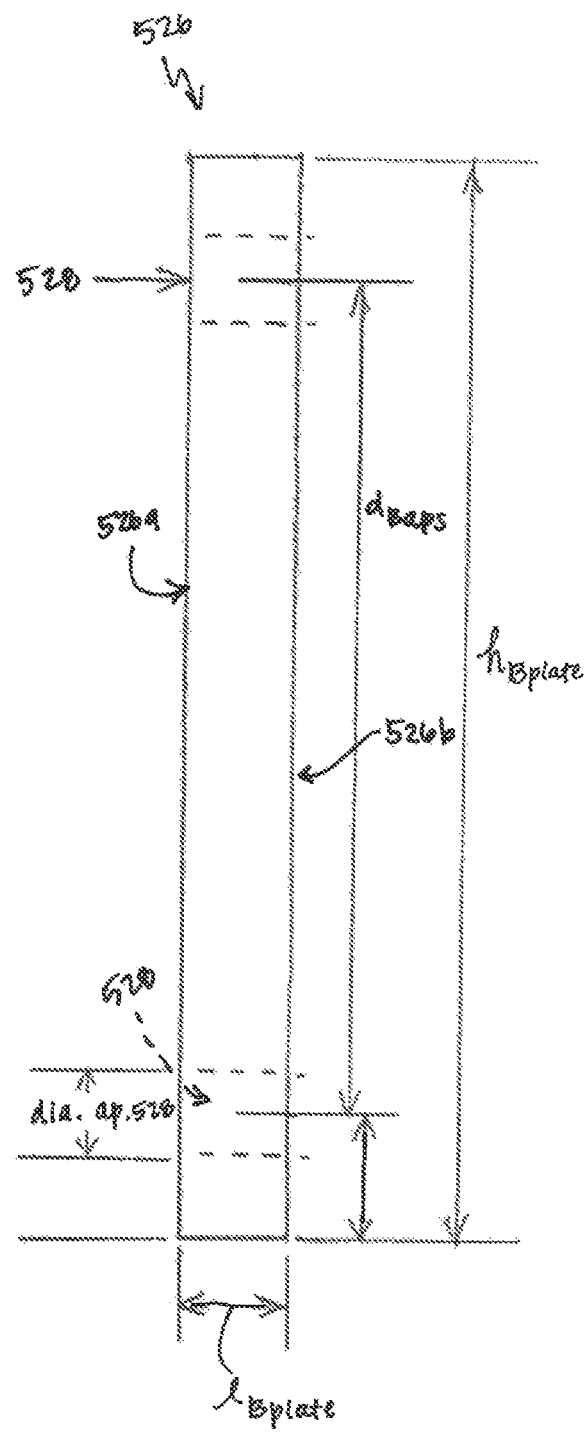
FIG. -20-

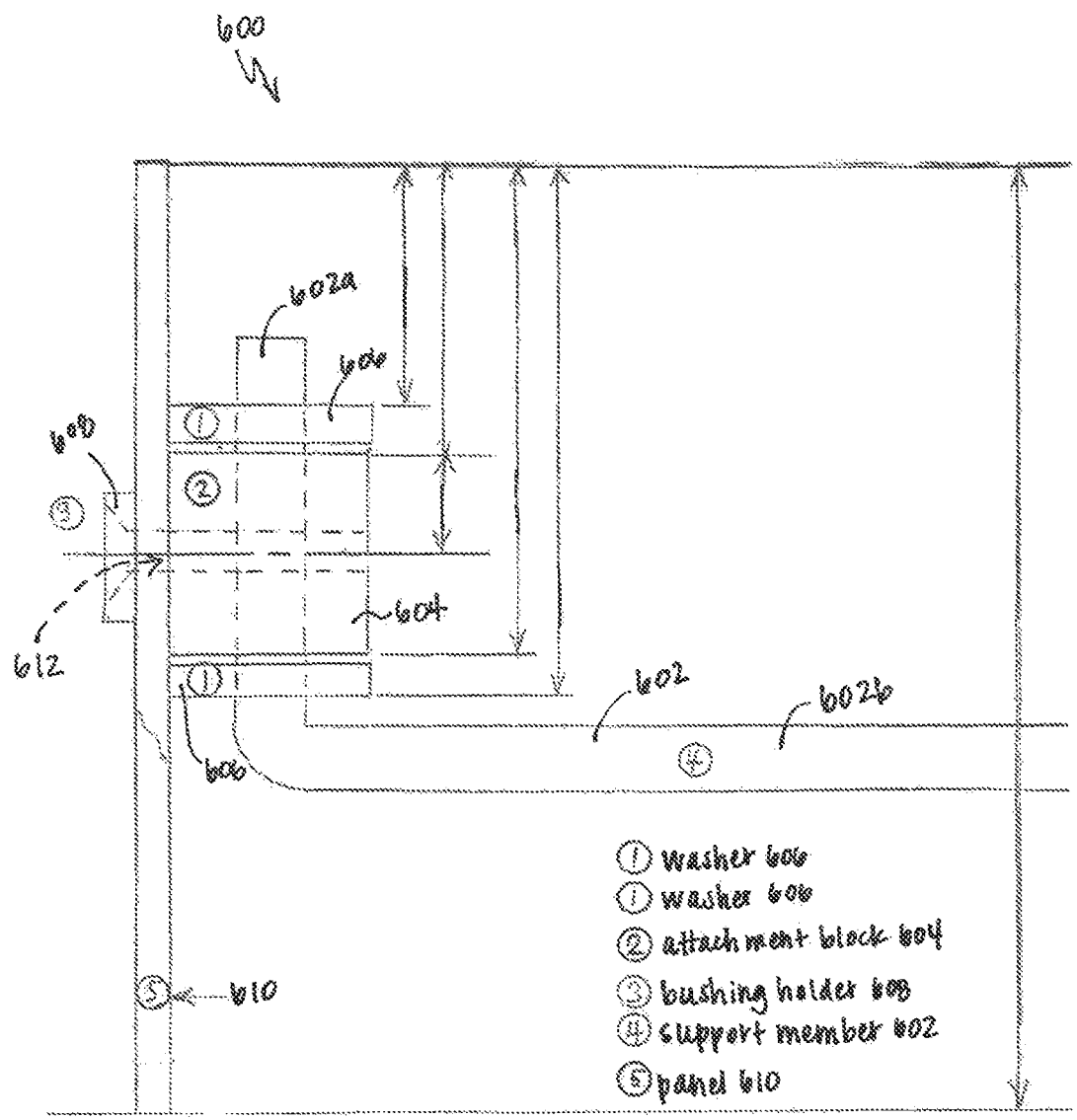
FIG. -21-

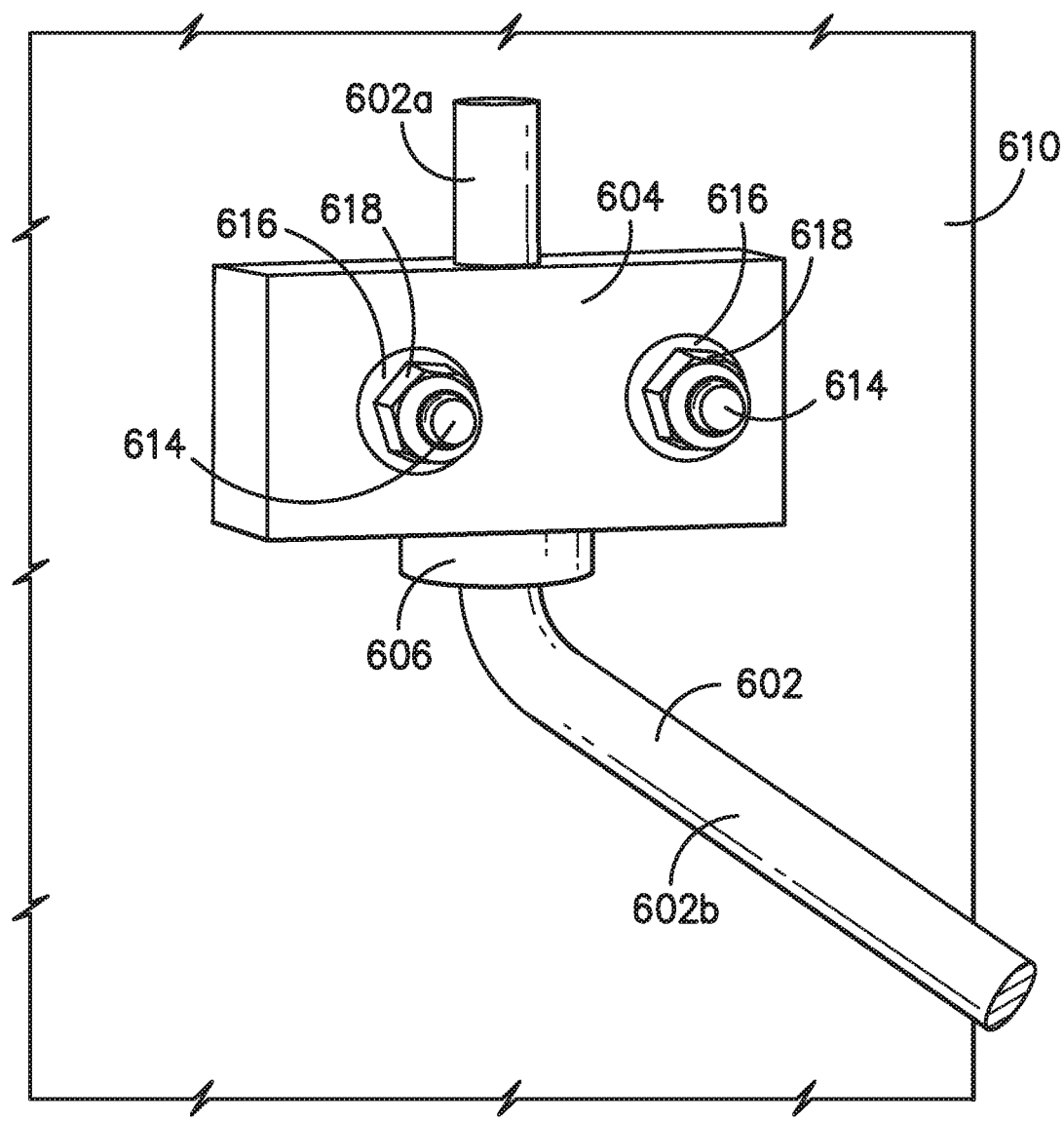
FIG. -22-

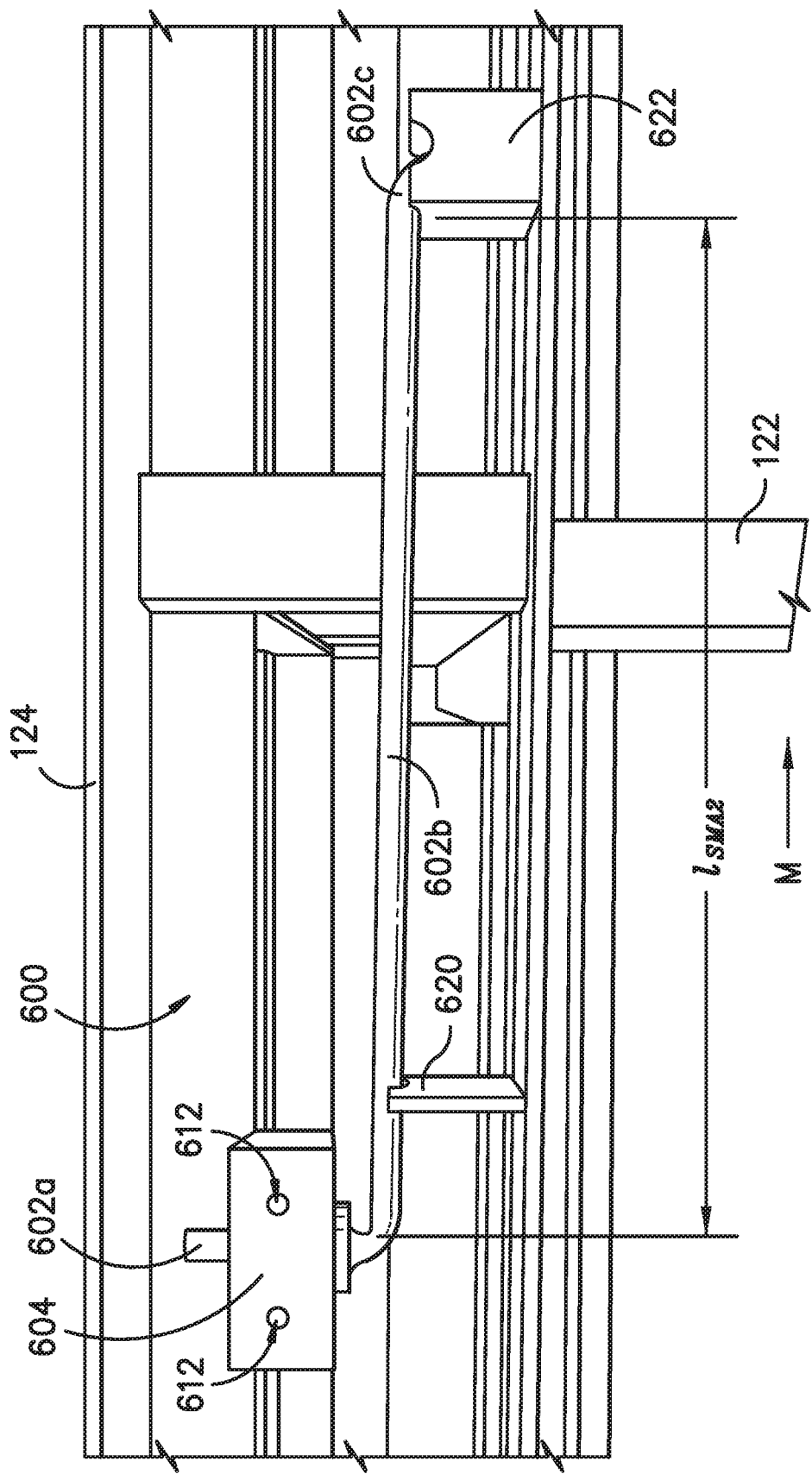
FIG. -23-

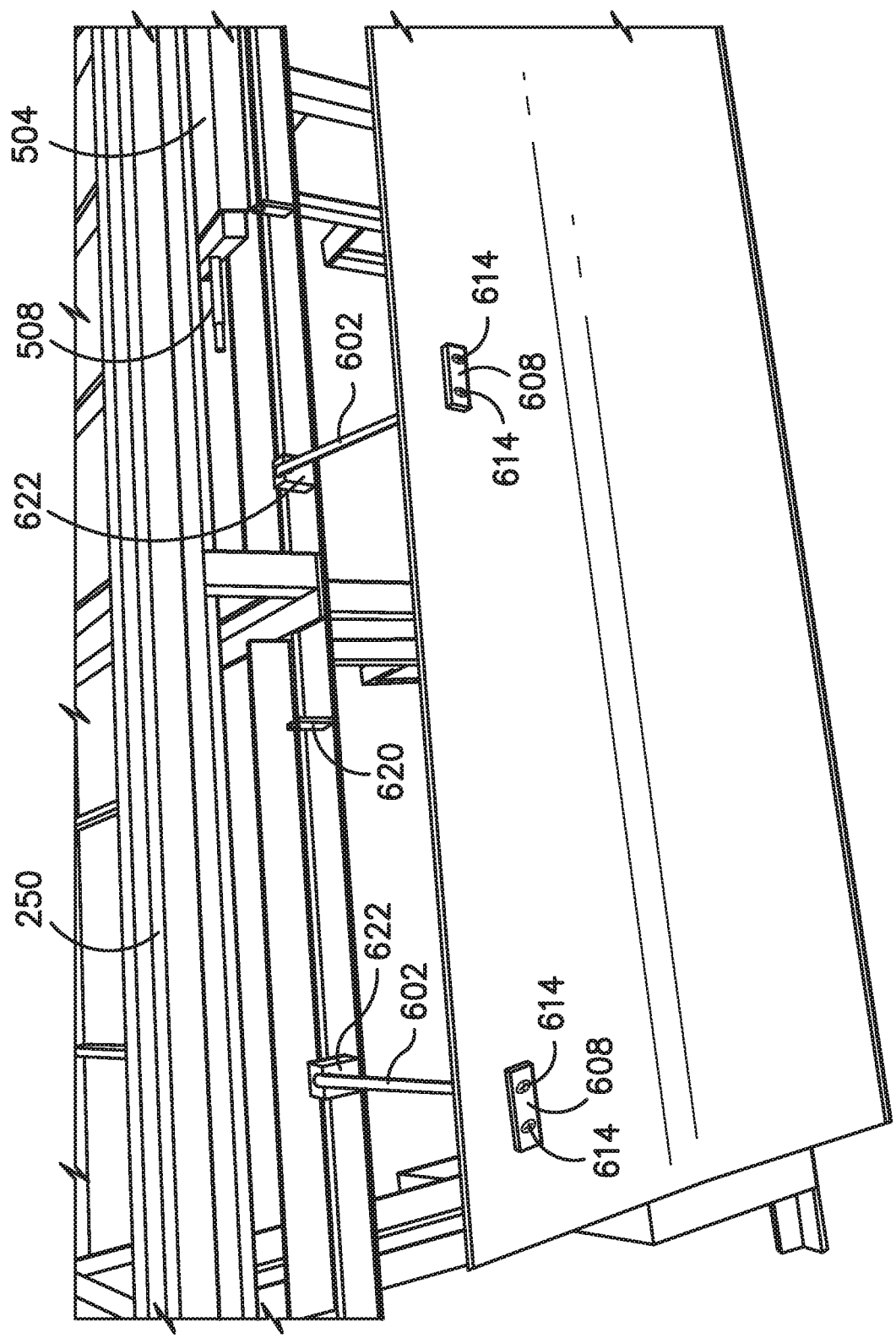
FIG. -24-

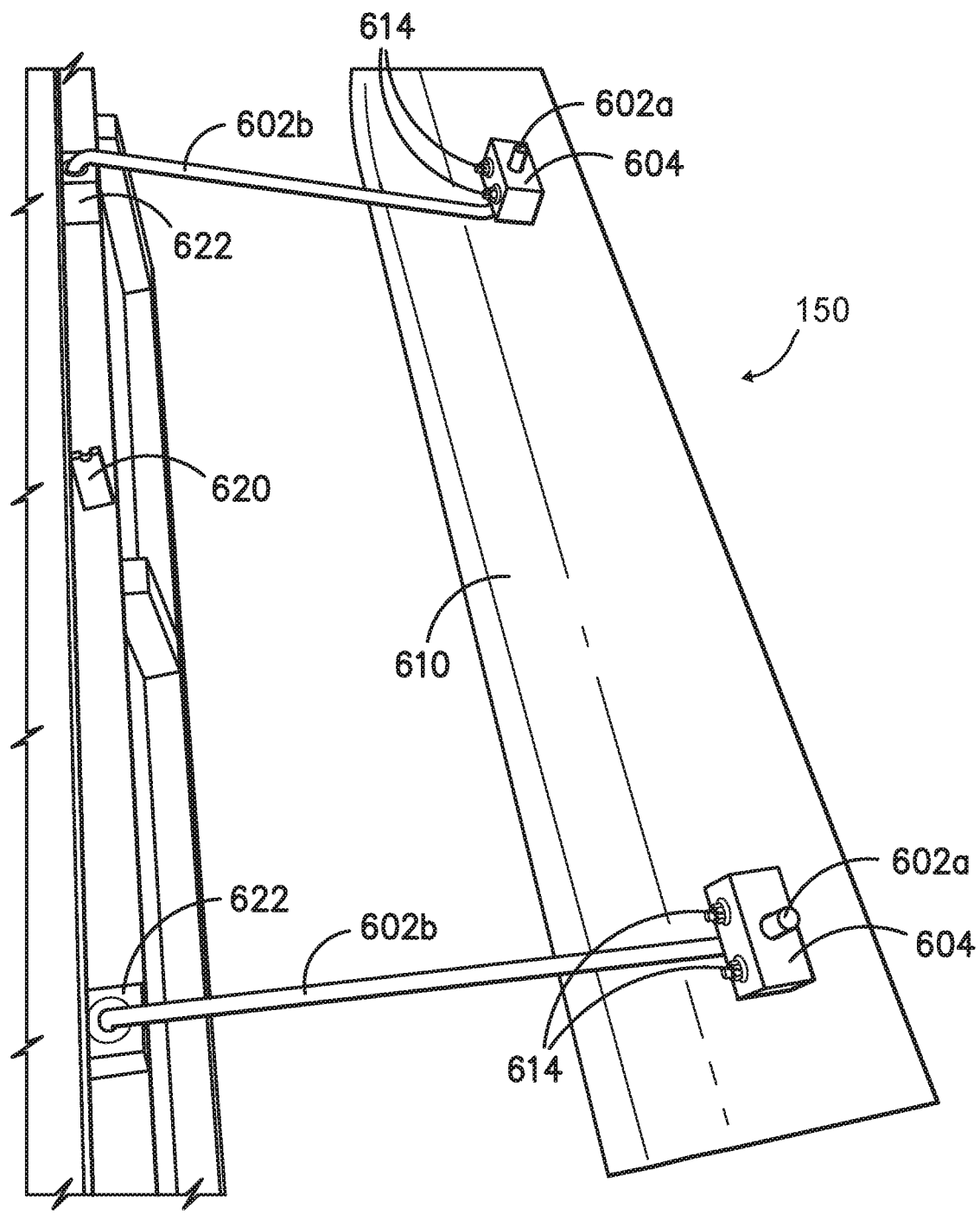
FIG. -25-

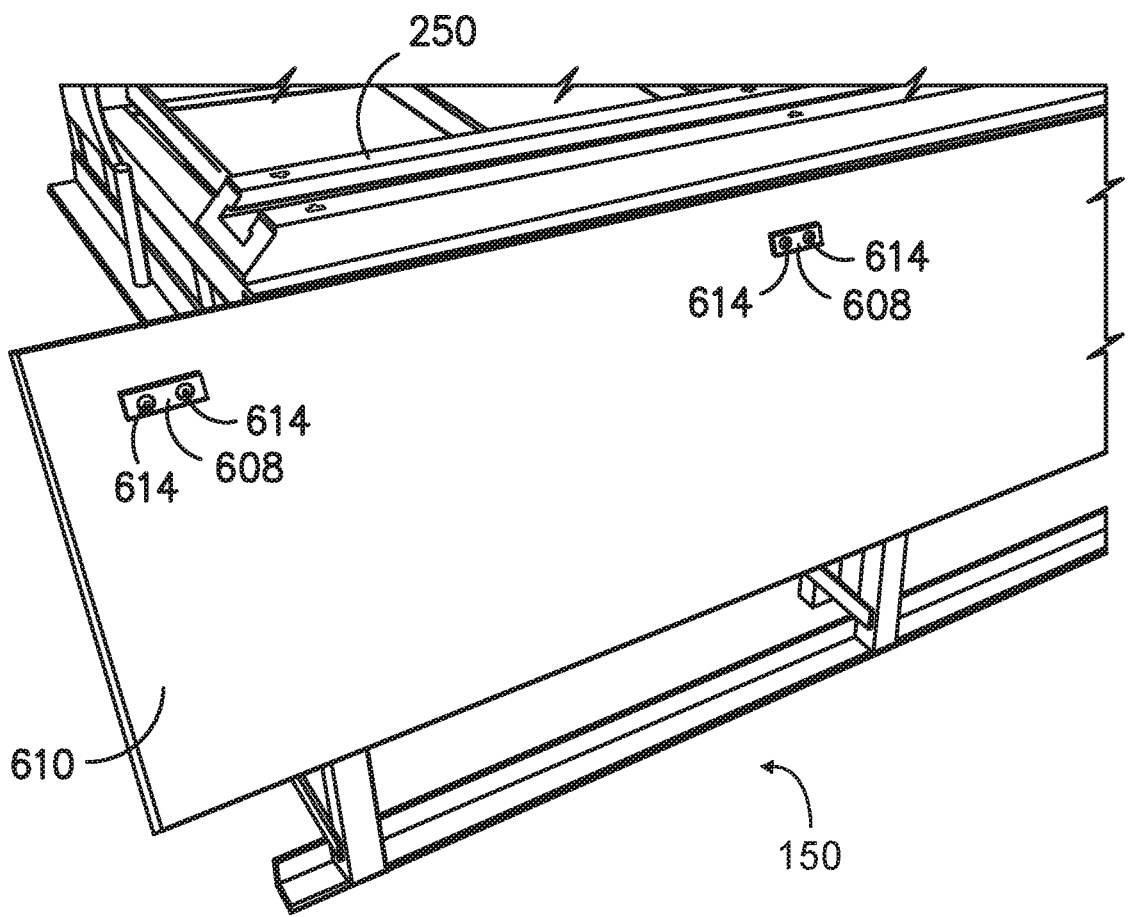
FIG. -26-

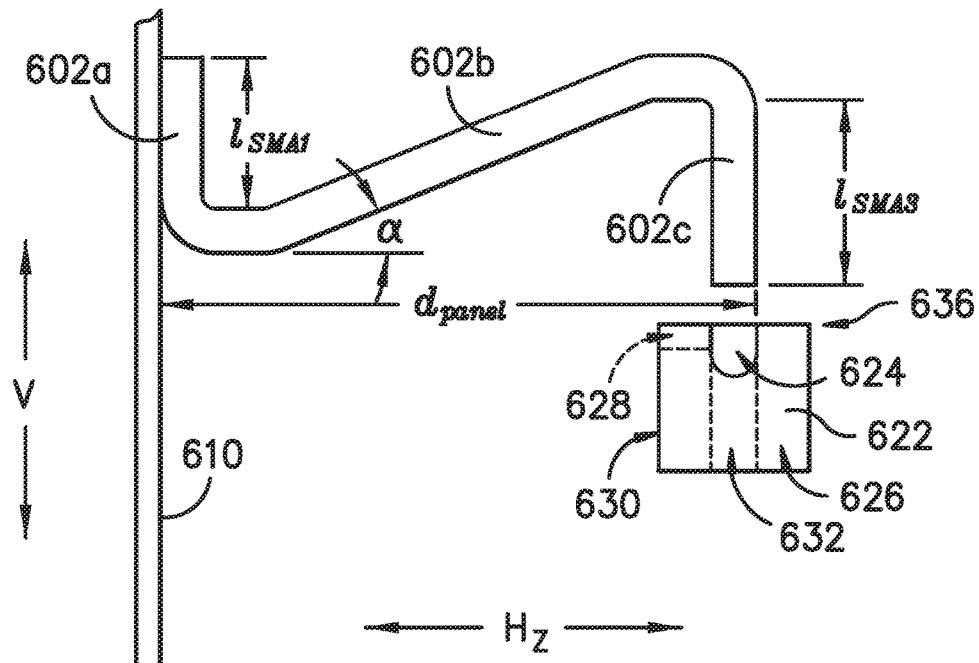
FIG. -27A-
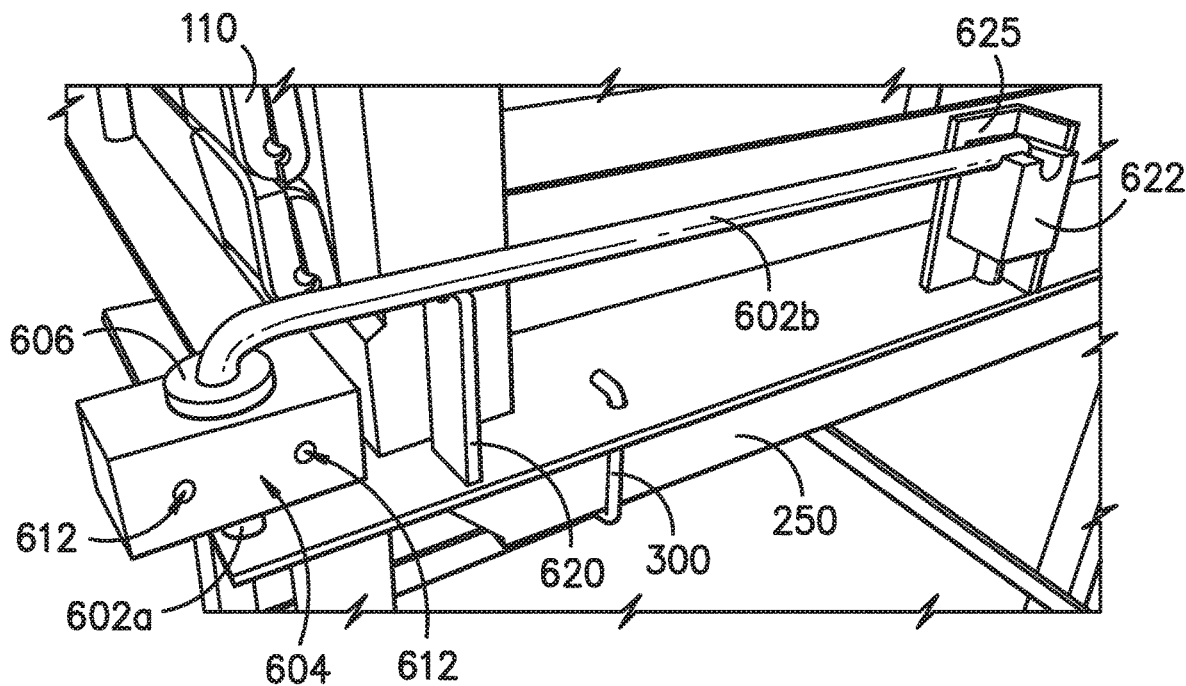
FIG. -27B-

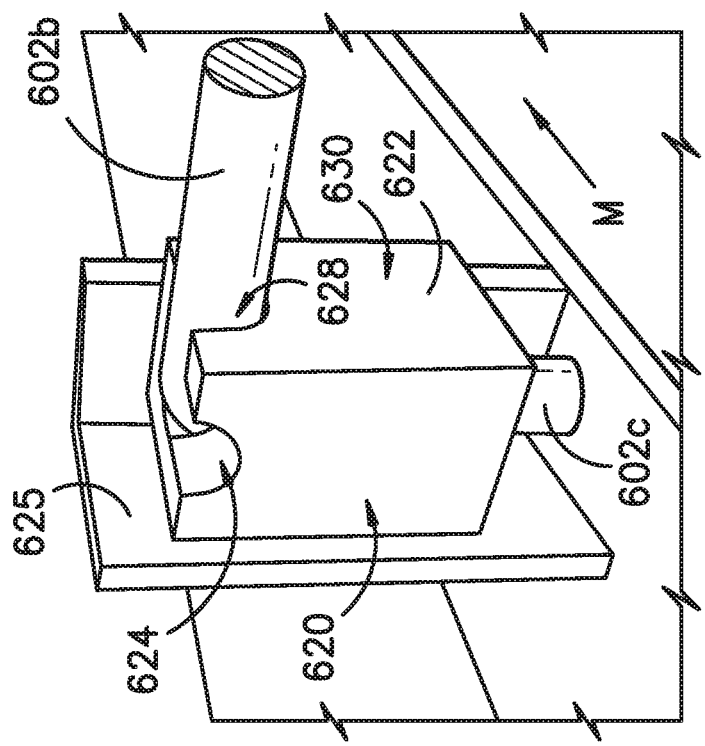
FIG. -28B-
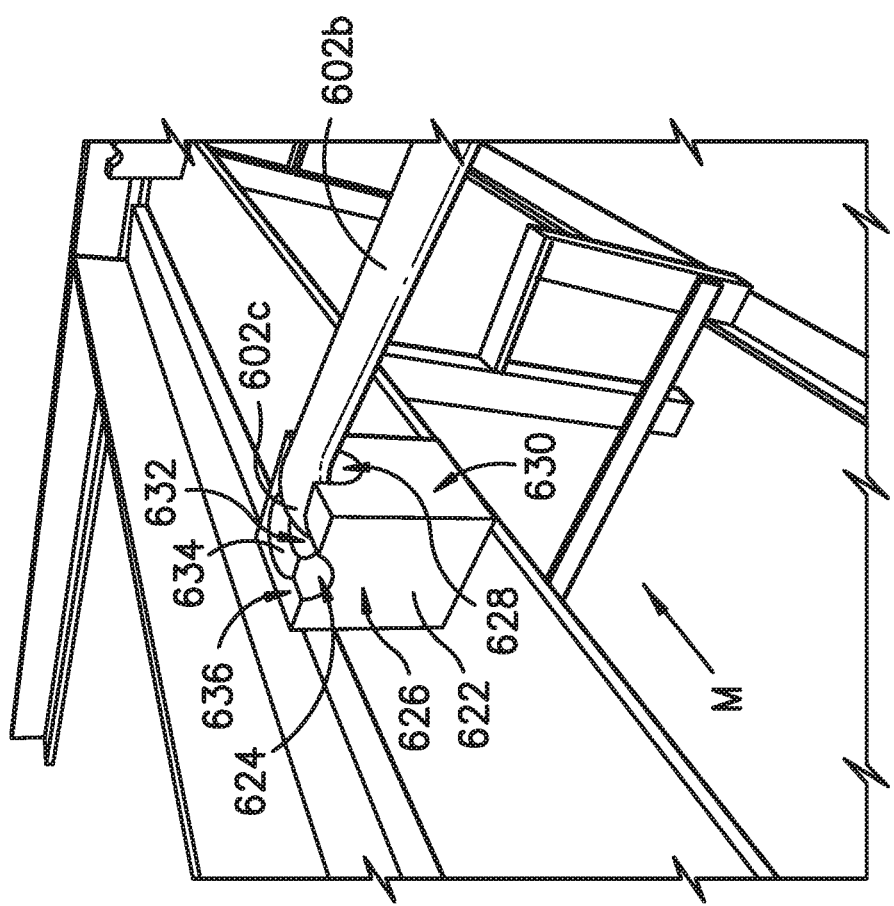
FIG. -28A-

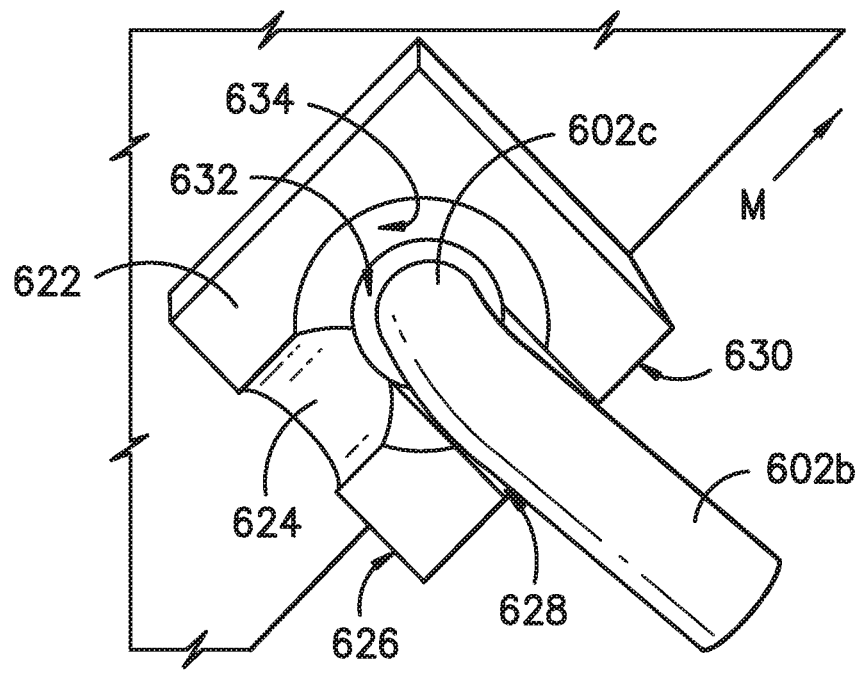
FIG. -29A-
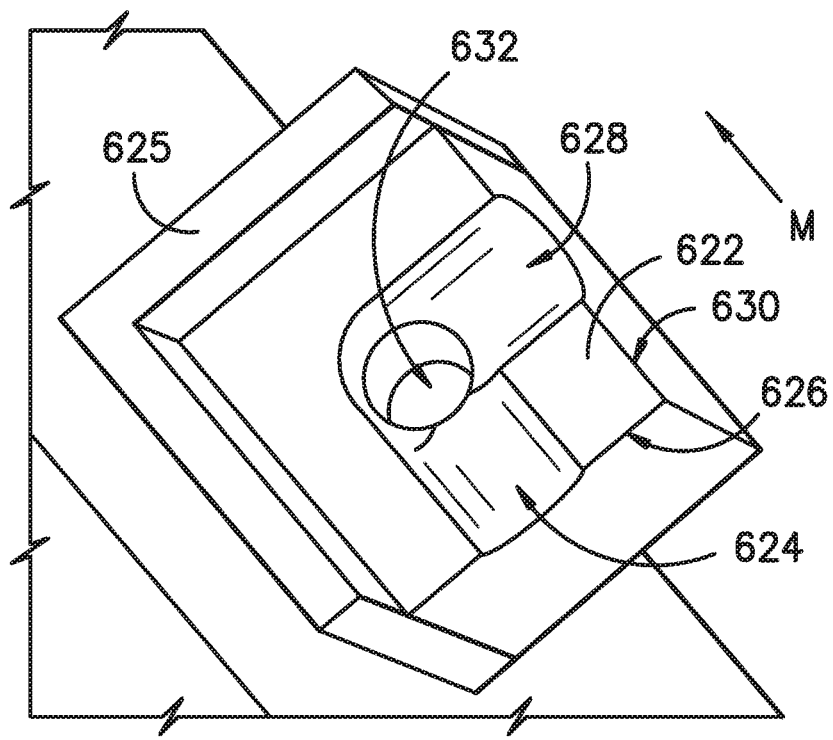
FIG. -29B-

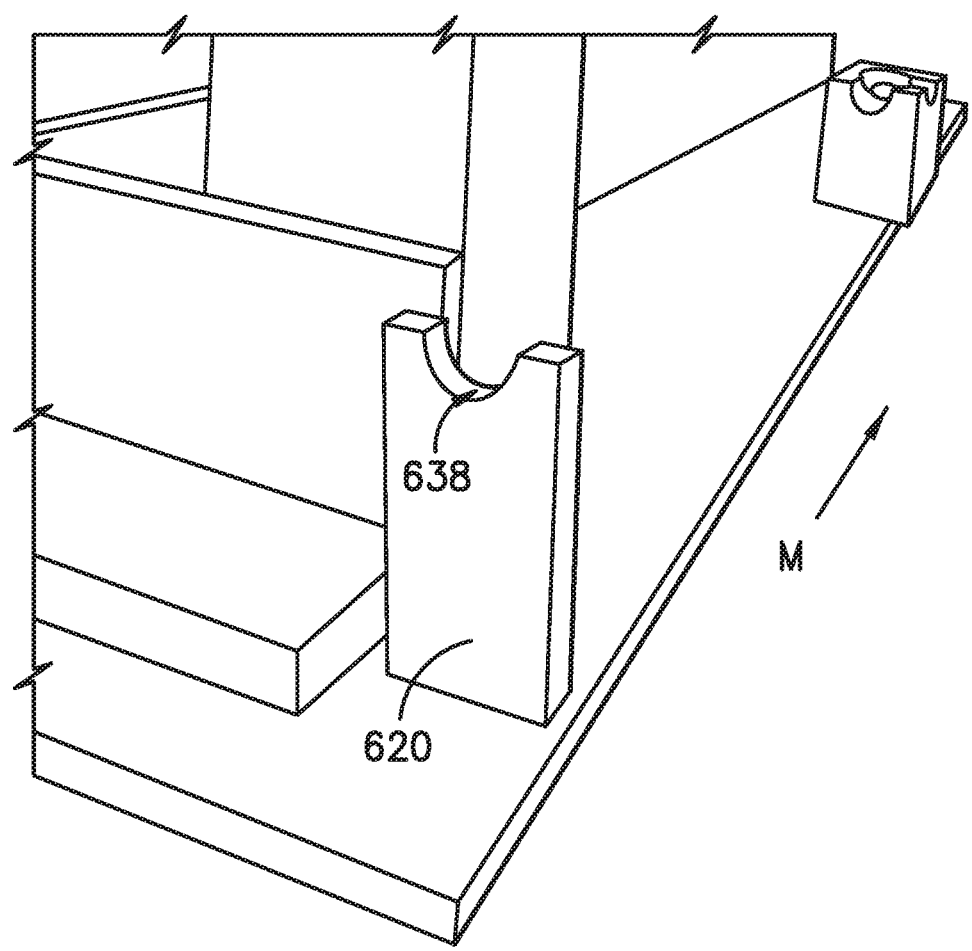
FIG. -30-

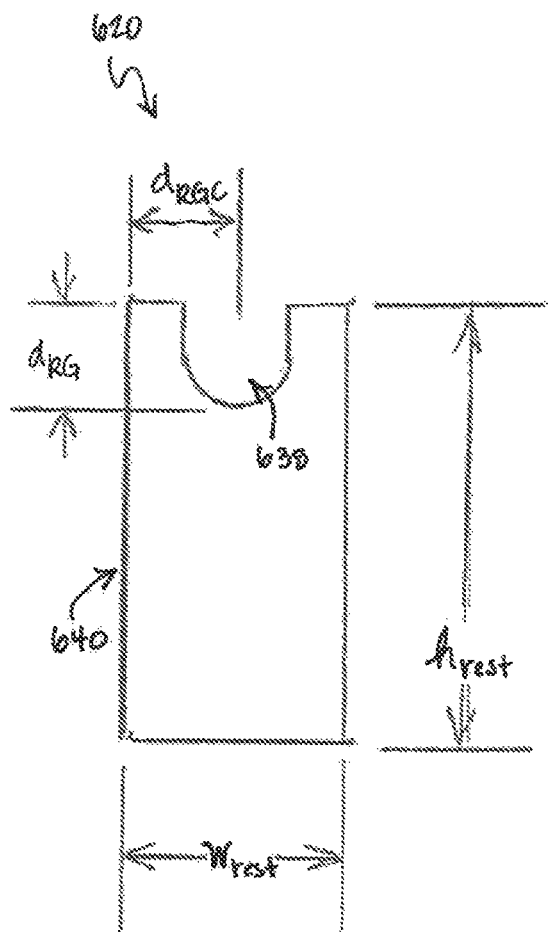
FIG. -31-

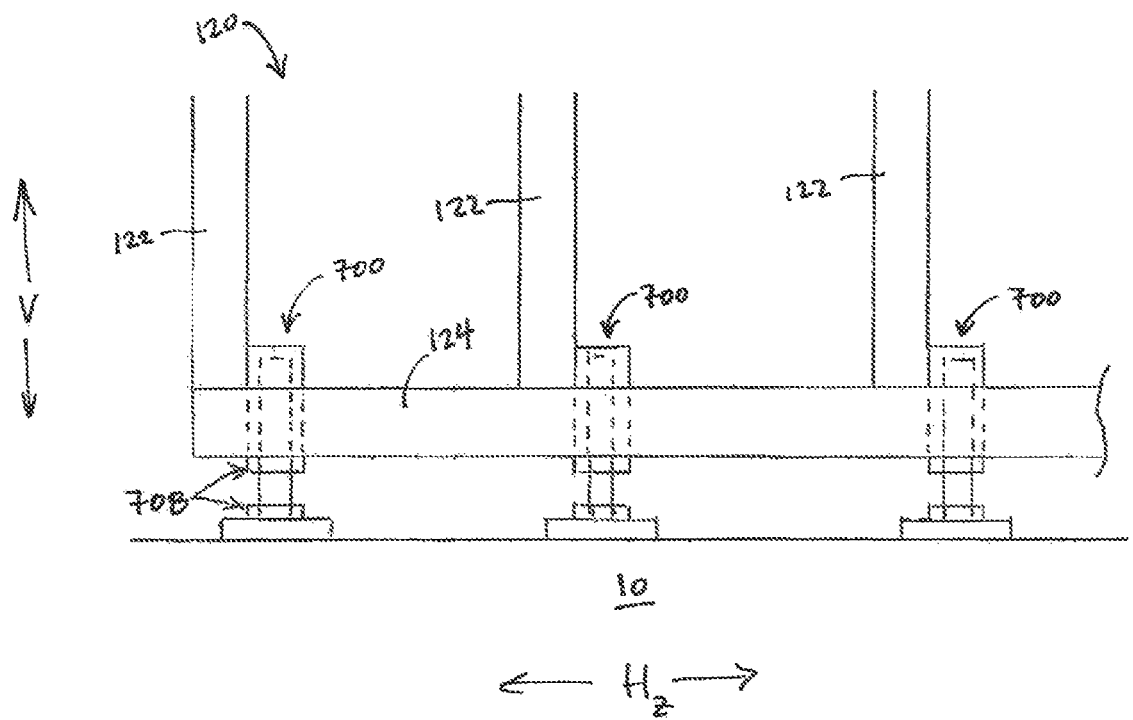
FIG. -32-

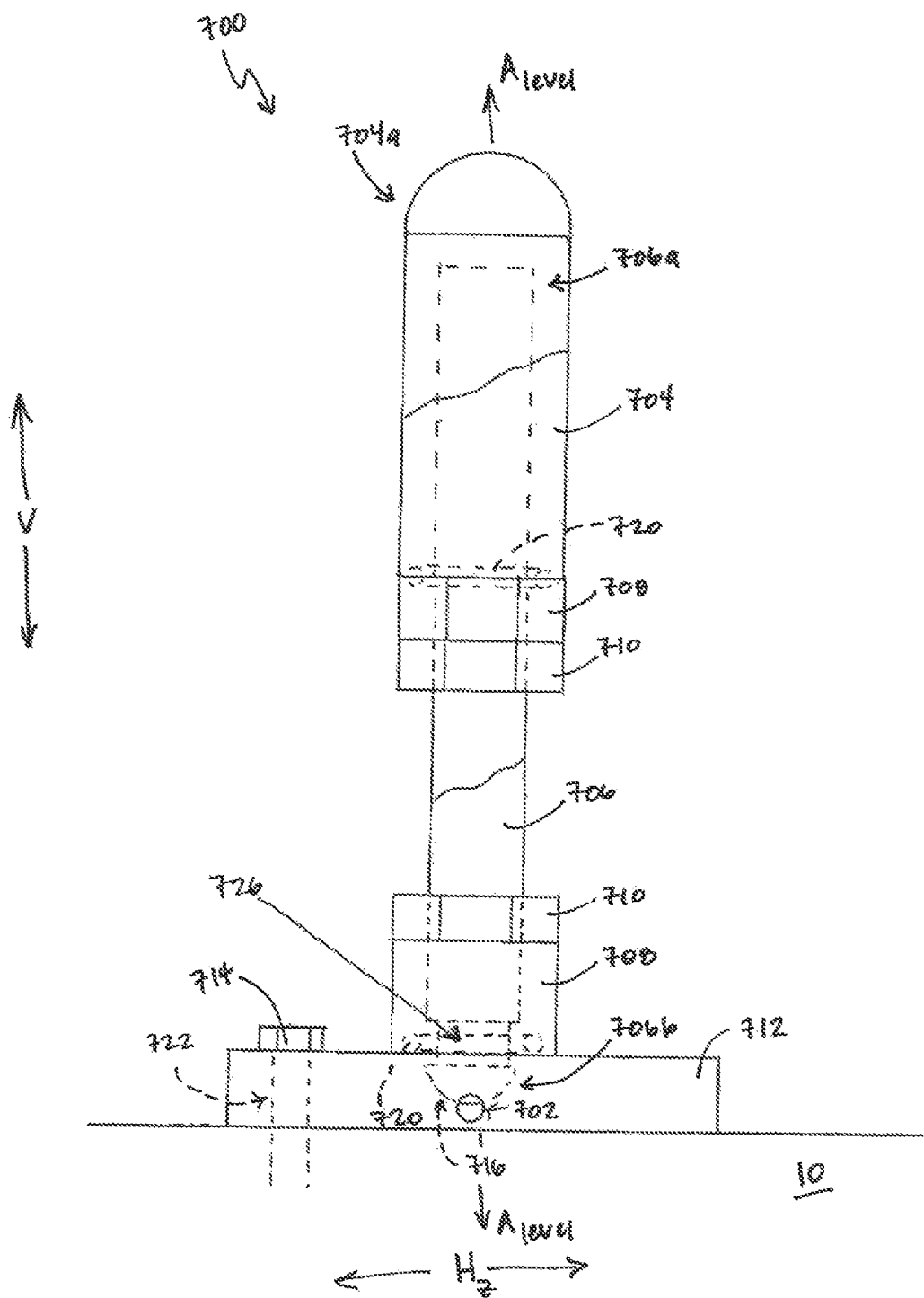
FIG. -33-

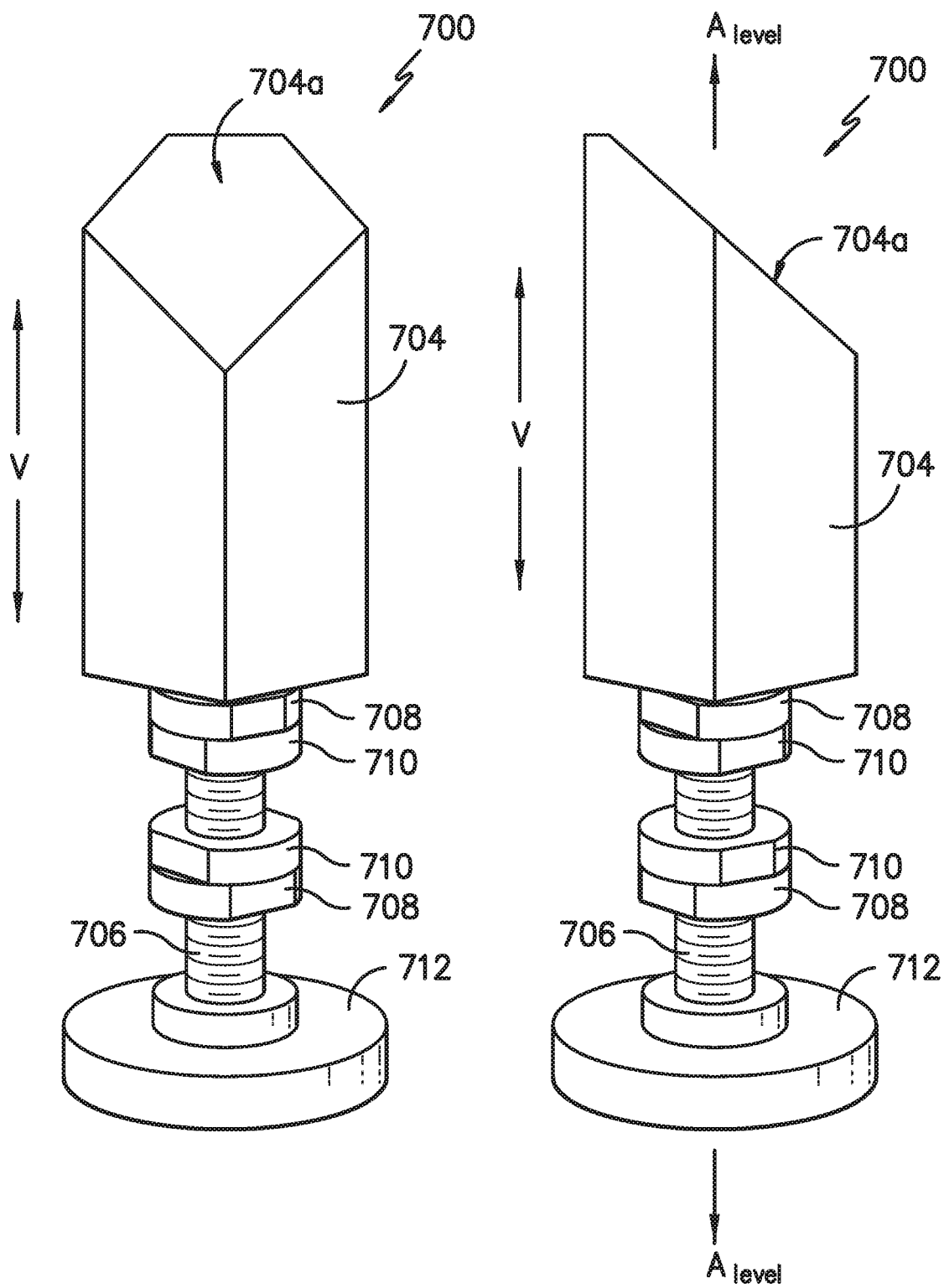
FIG. -34-    FIG. -35-

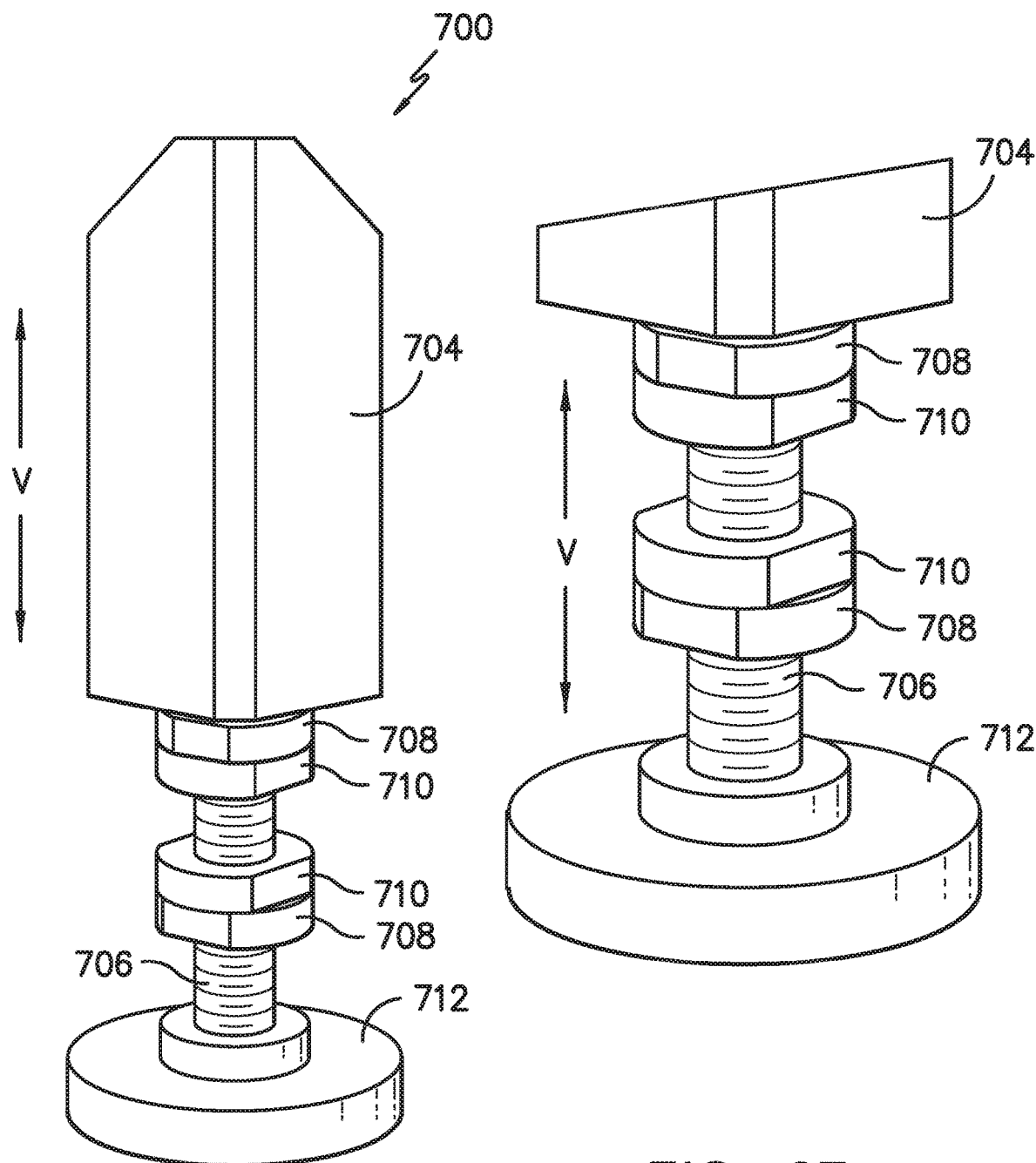
FIG. -36-
FIG. -37-

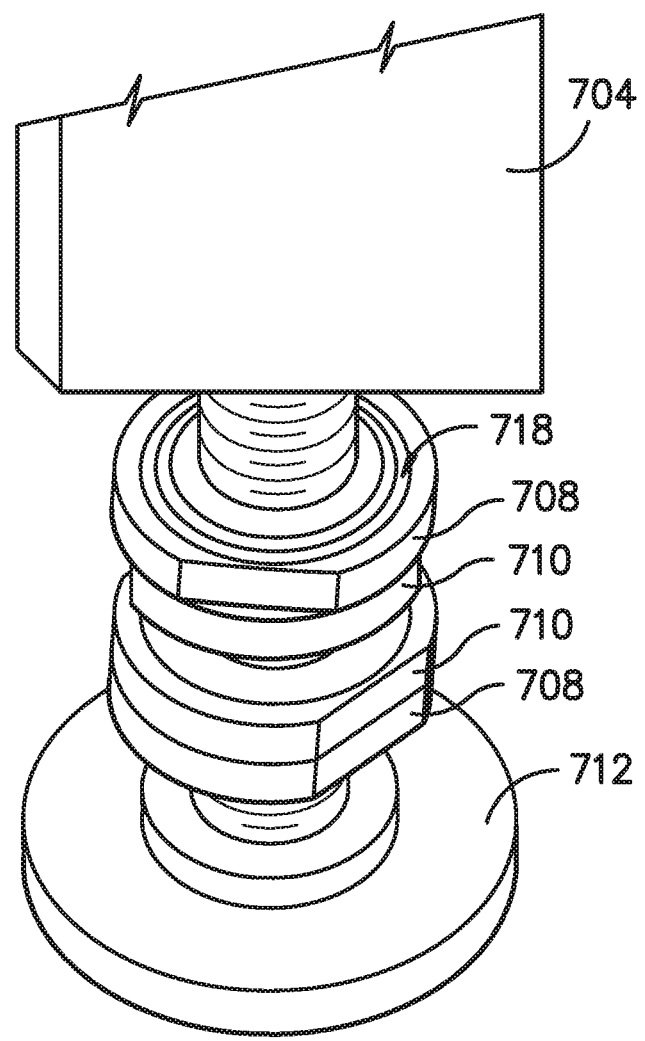
FIG. -38-

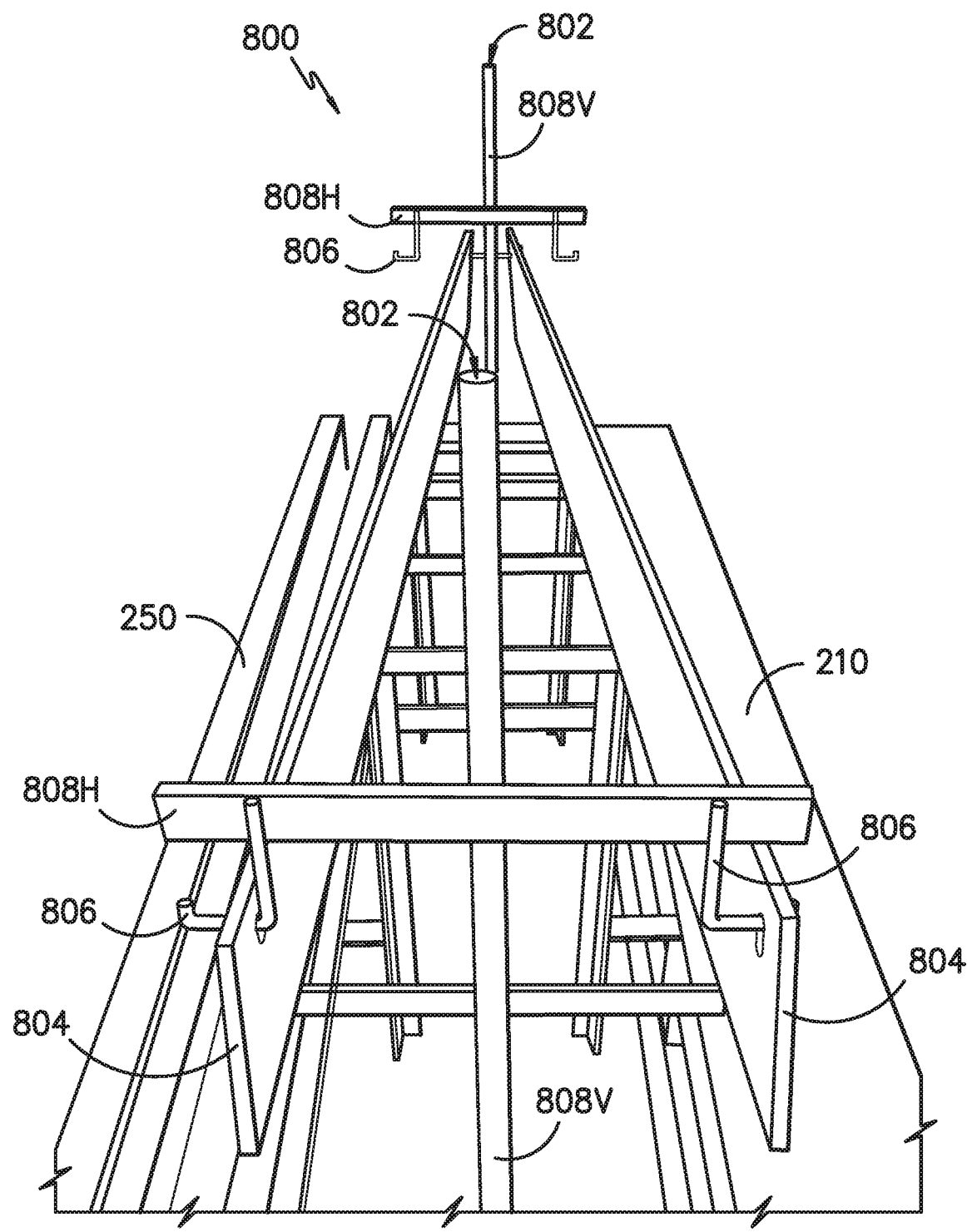
FIG. -39-

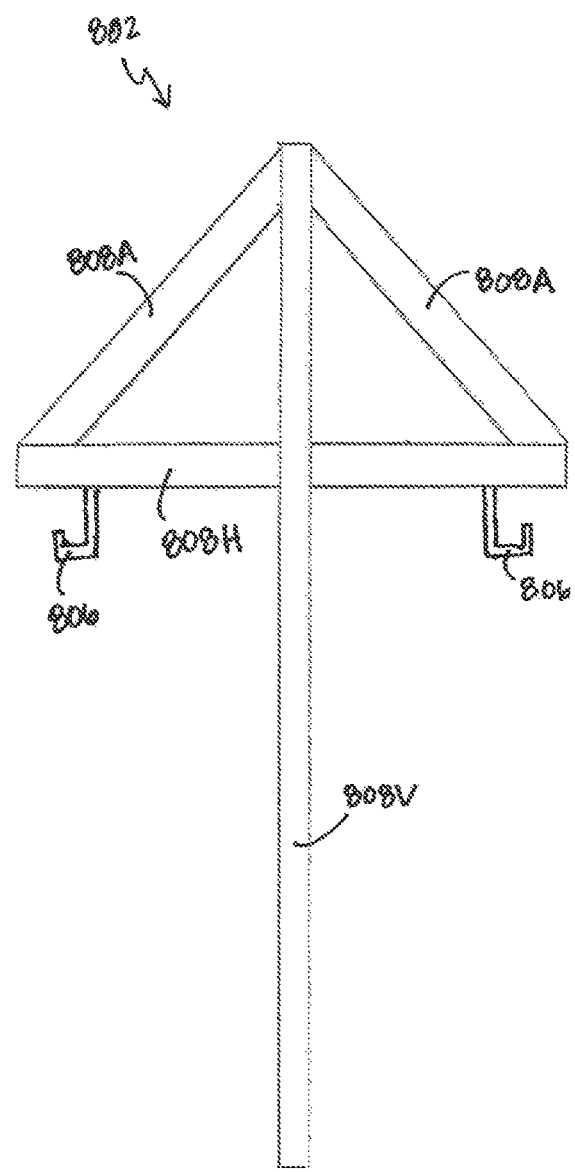
FIG. -40-

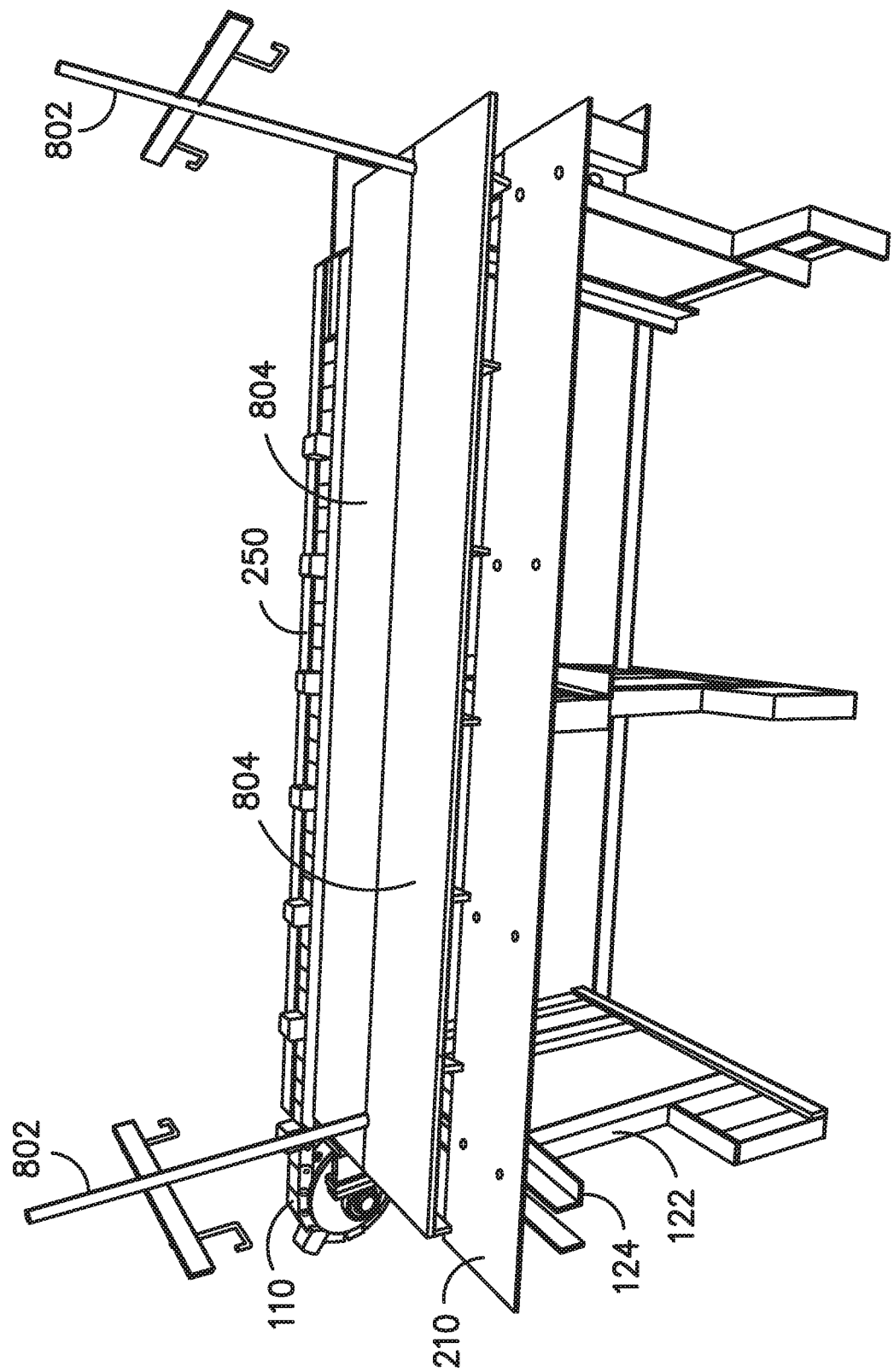
FIG. -41-

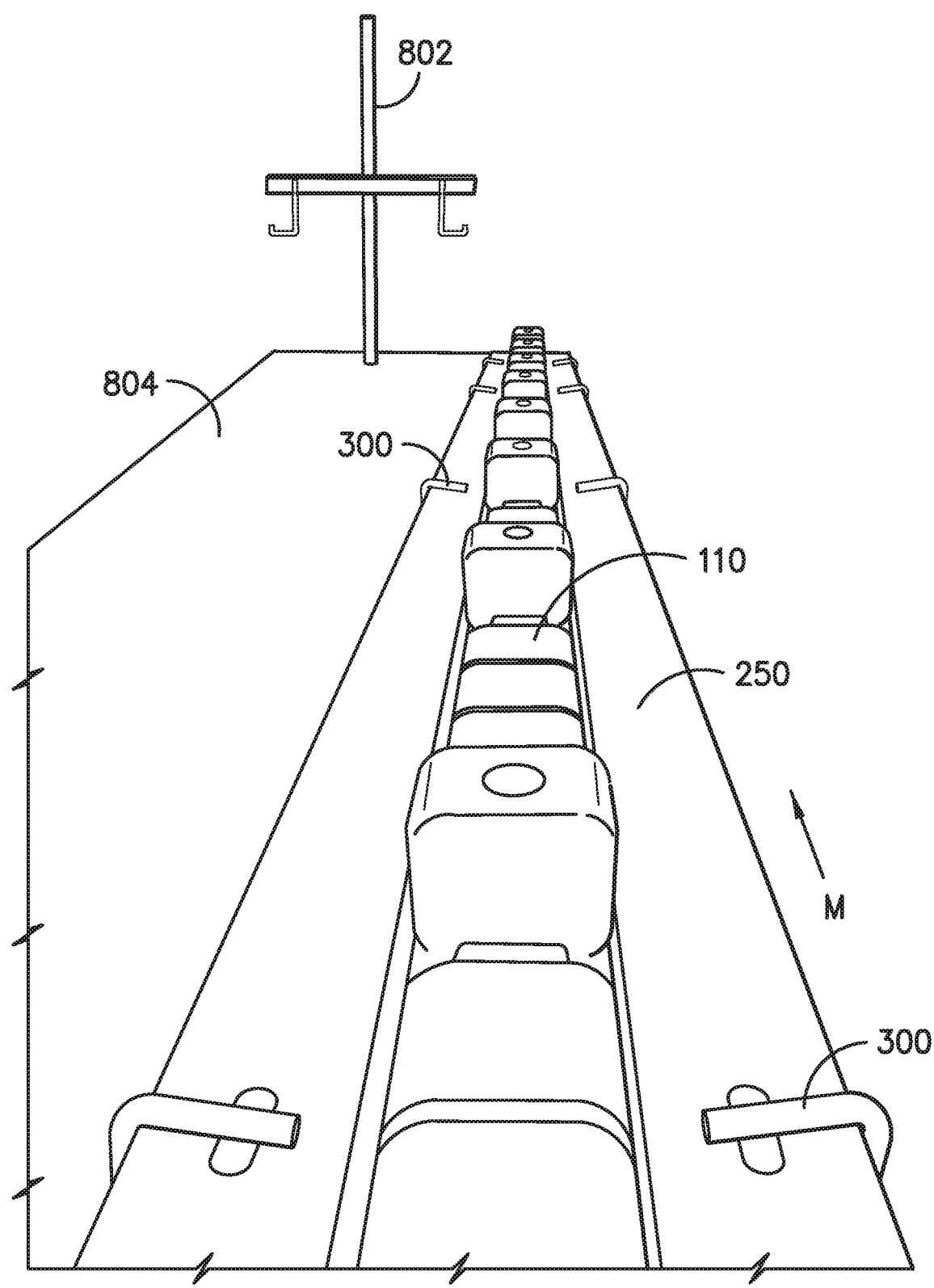
FIG. -42-

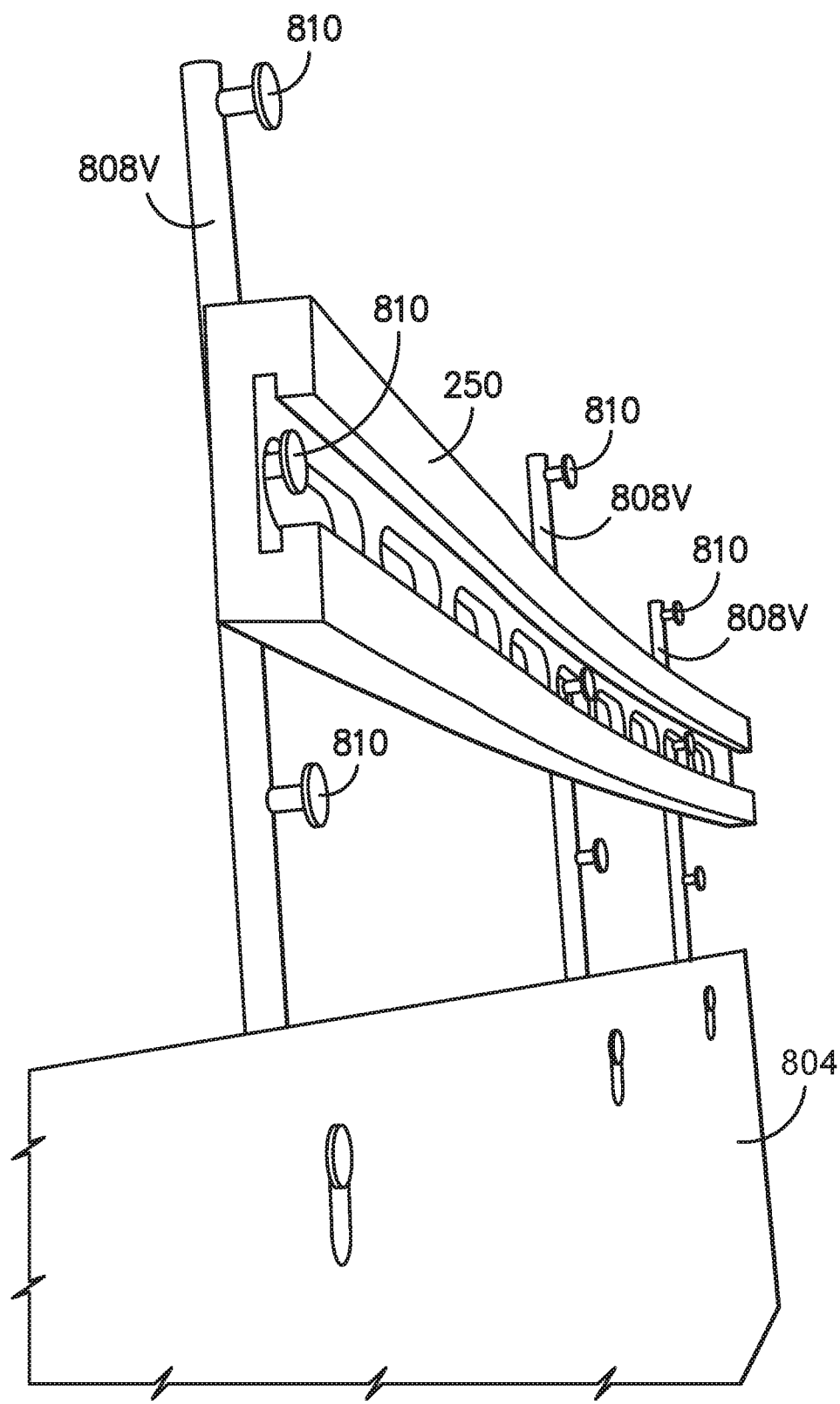
FIG. -43-

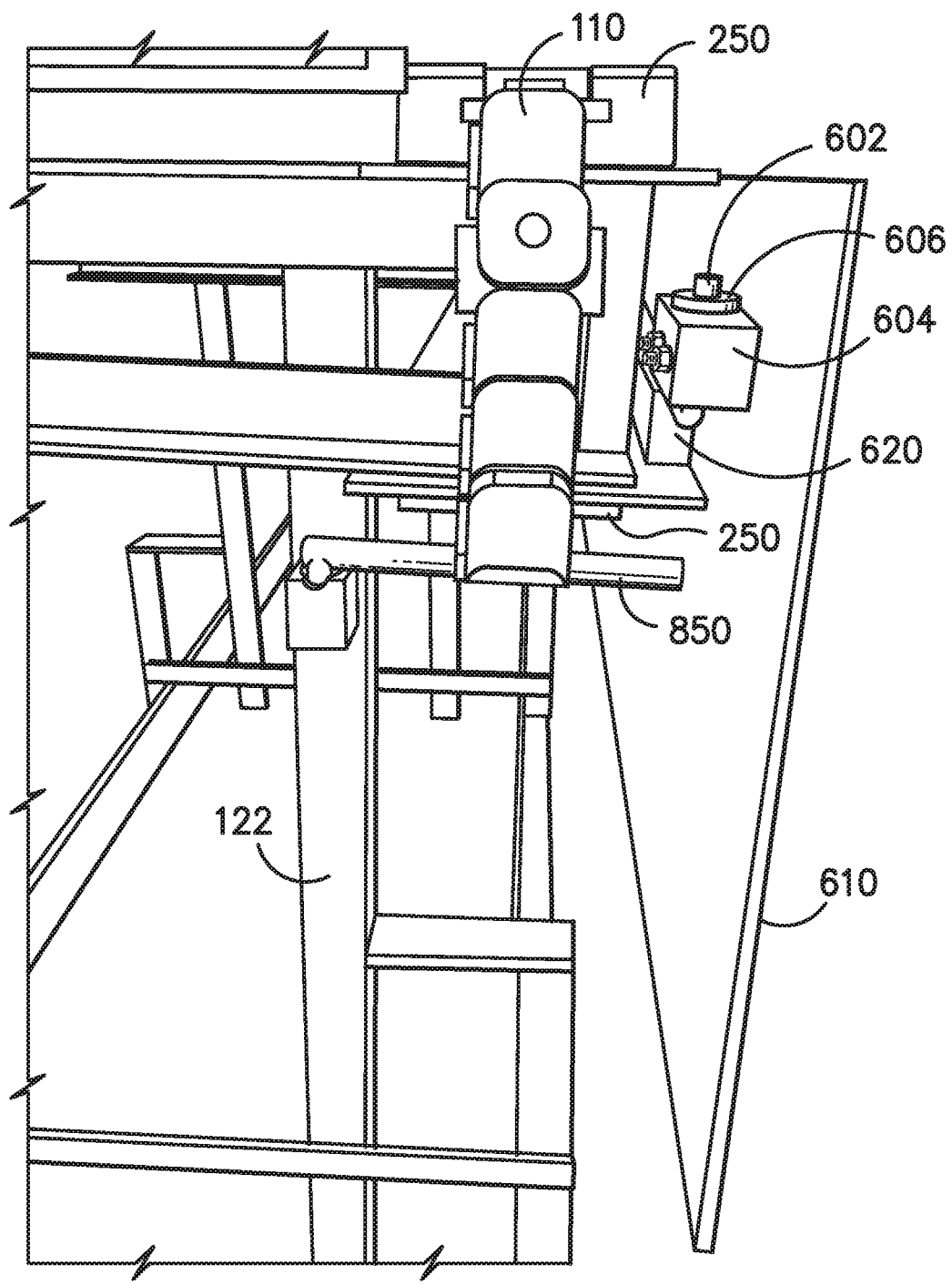
FIG. -44-

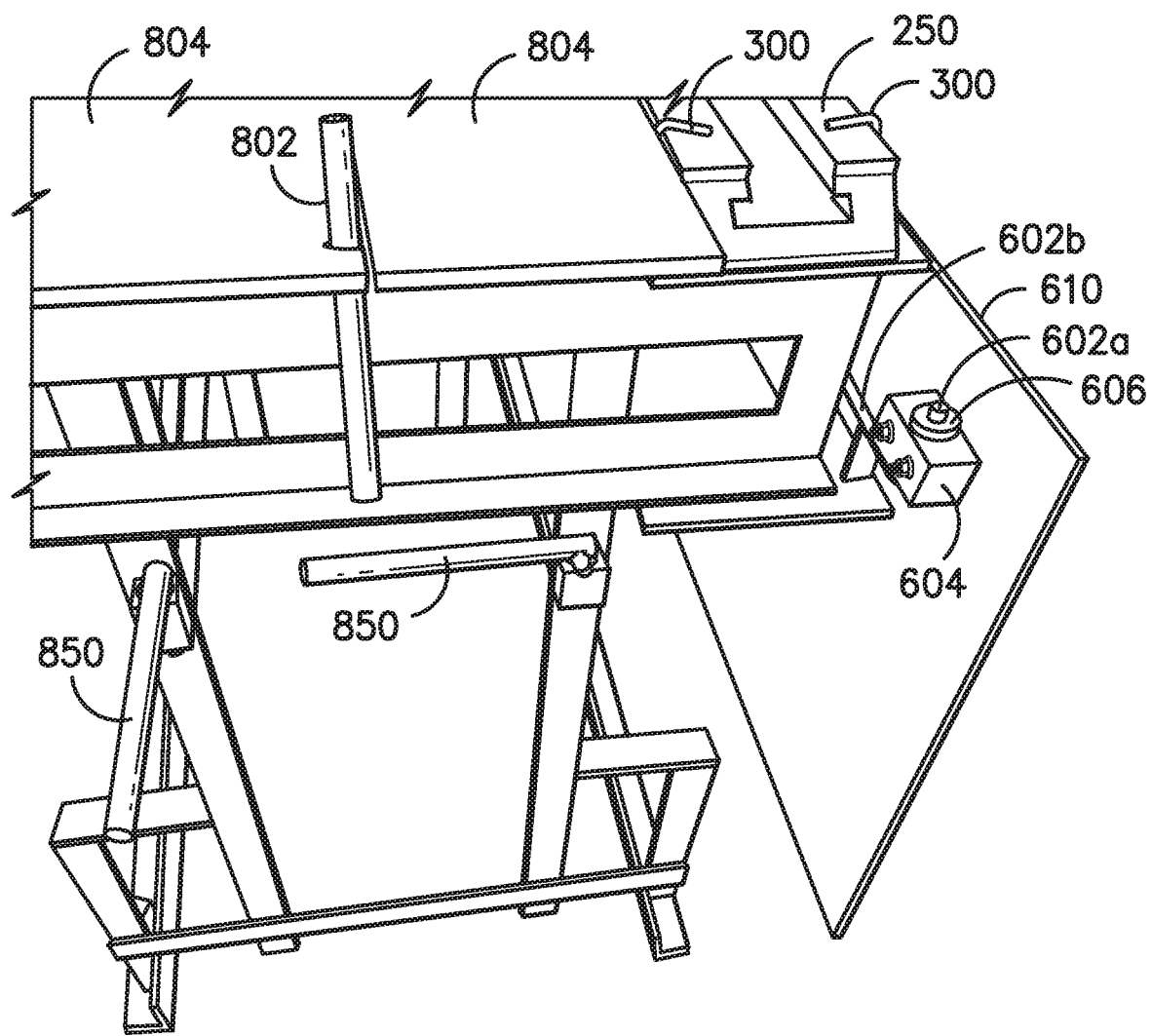
FIG. -45-

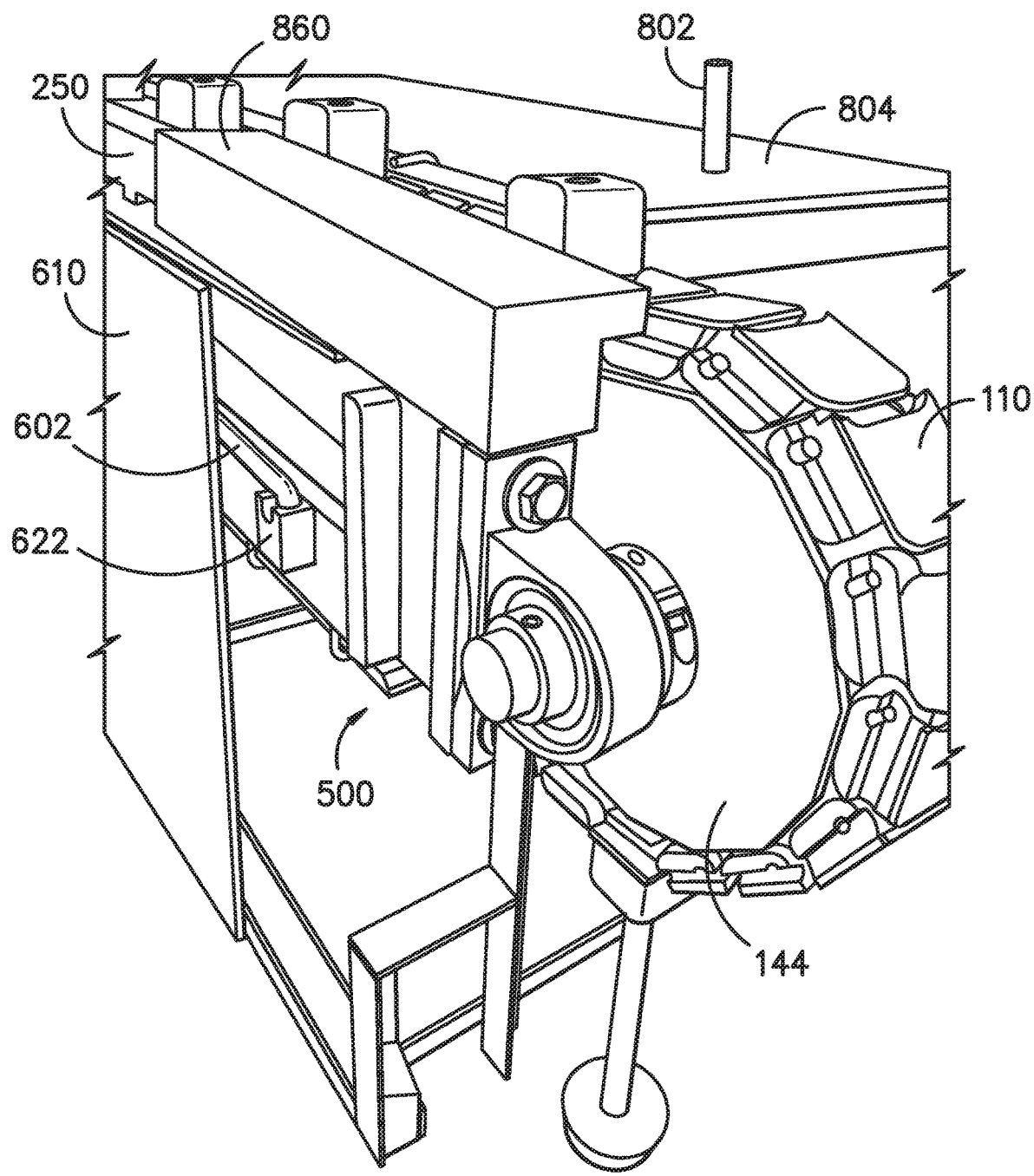
FIG. -46-

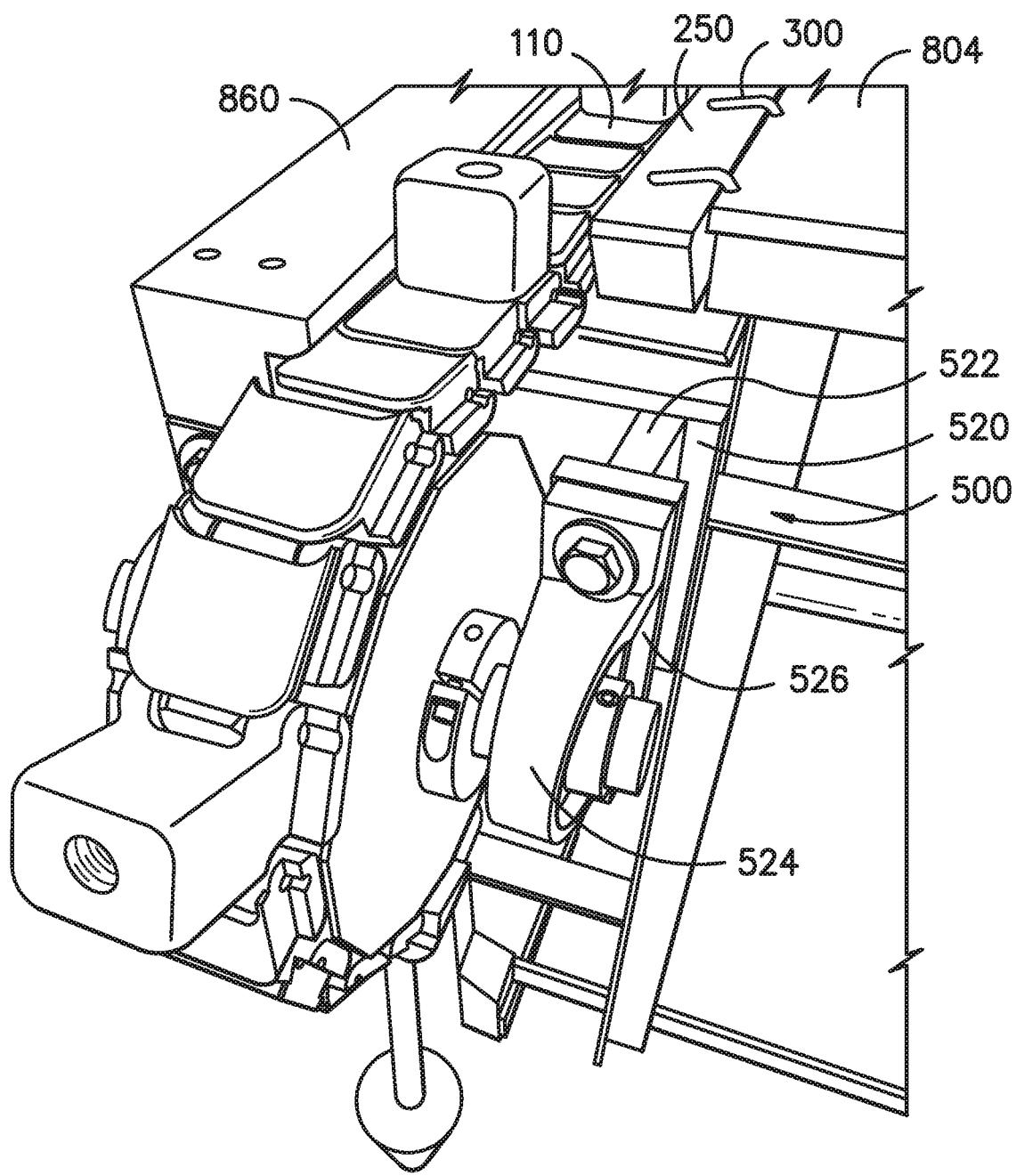
FIG. -47-

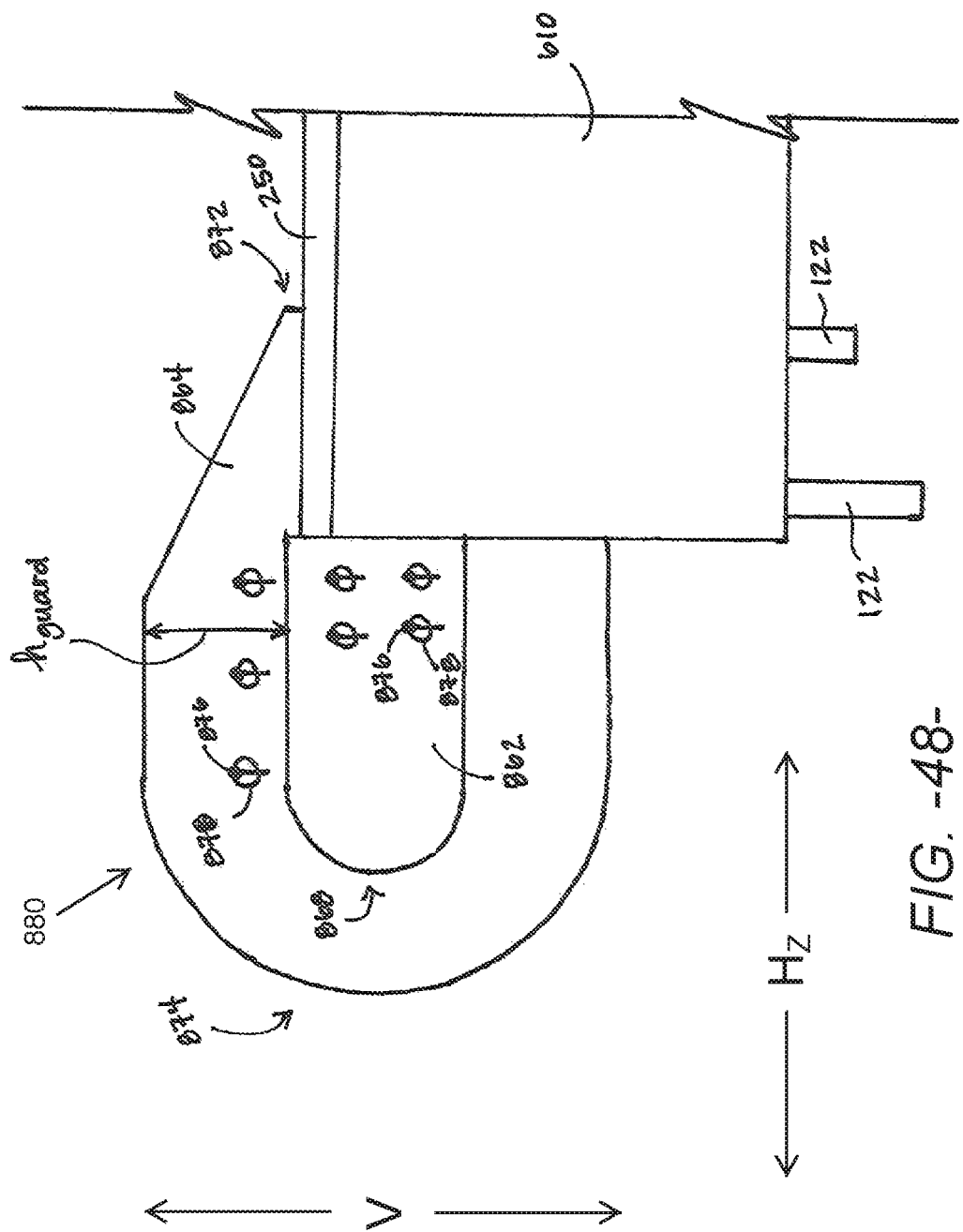
FIG. -48-

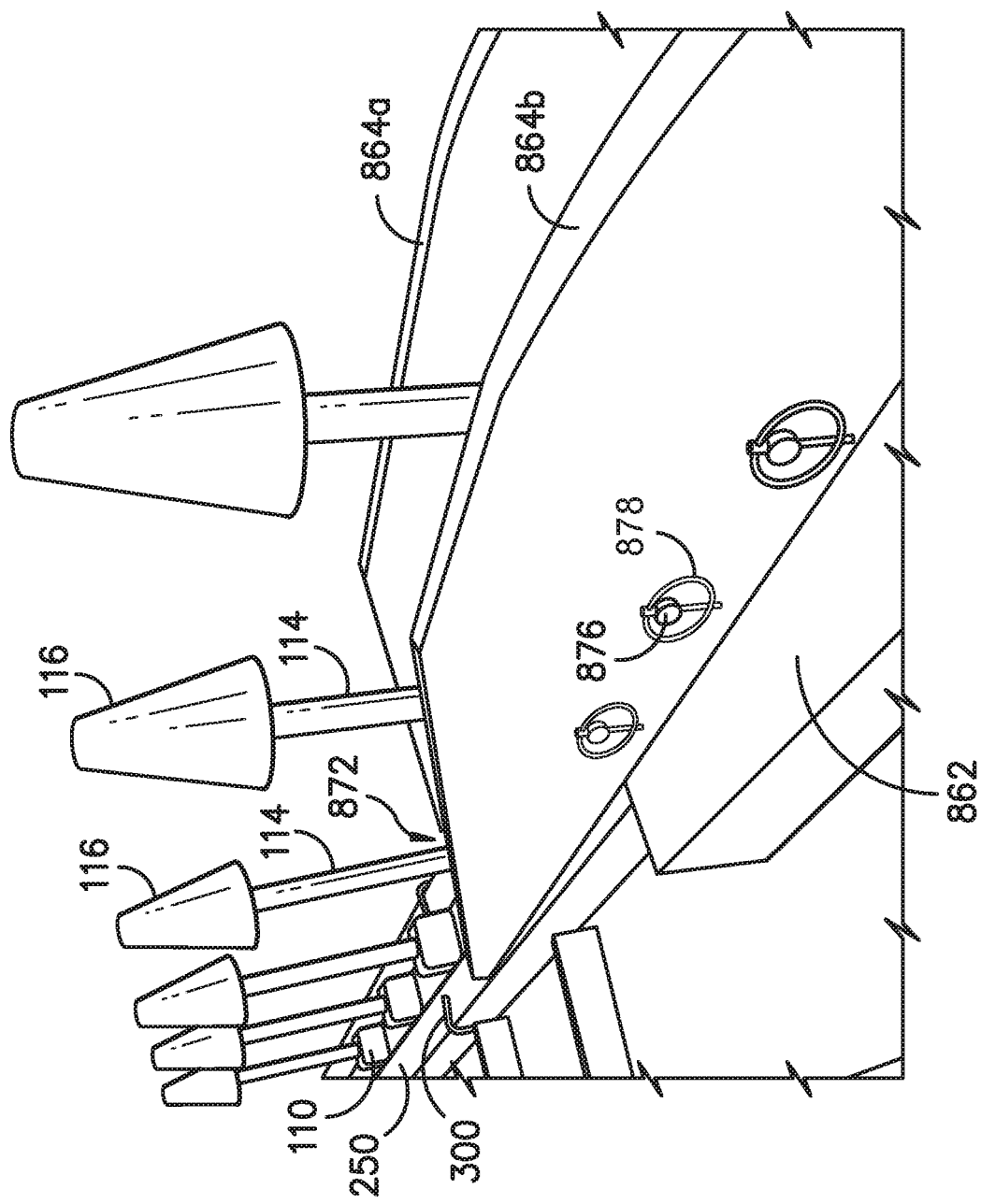
FIG. -49-

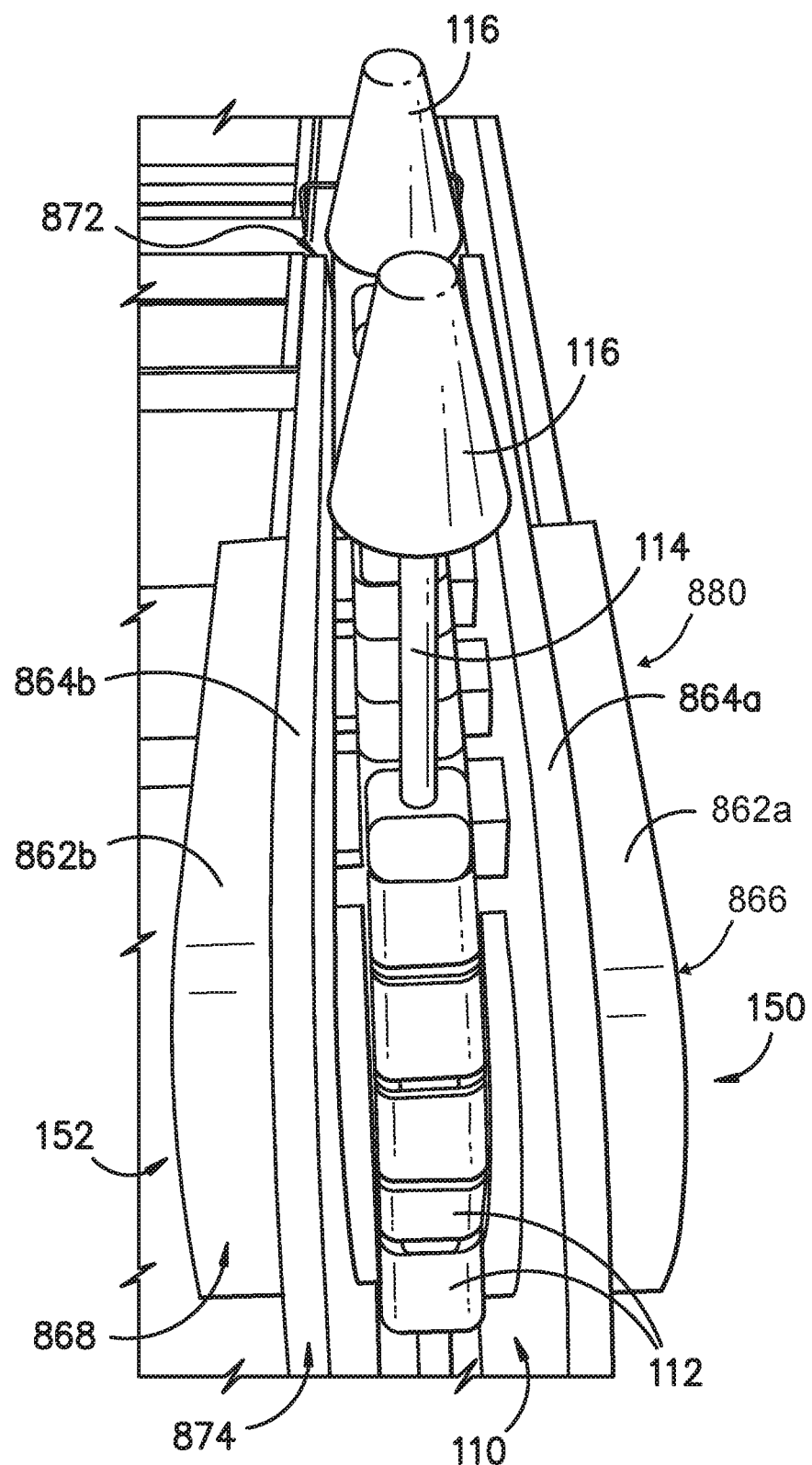
FIG. -50-

CONVEYOR SYSTEM

CROSS-REFERENCE TO RELATED APPLICATIONS

The present application claims priority to U.S. Provisional Application Ser. No. 62/764,903, filed on Aug. 16, 2018, which is incorporated herein in its entirety by reference thereto.

FIELD

The present subject matter generally involves conveyor assemblies and systems. More particularly, the present subject matter is directed to a conveyor system comprising features for maintaining or increasing performance of the conveyor system, increasing safety of users of the conveyor system, facilitating cleaning of the conveyor system, and/or maintaining or increasing the cleanliness of the conveyor system.

BACKGROUND

Mechanical chain profiles are utilized in a variety of manufacturing processes to move goods or products throughout a production environment. Typical chain assembly systems utilize a wear track profile to provide a channel for a mechanical chain link to traverse. Generally, the wear track profiles are secured to a fixed structure utilizing various types of mechanical fasteners such as of screws and bolts. Often, the wear track profiles must be removed from their respective fixed location for preventative maintenance purposes and sanitation purposes. For example, in the poultry industry, when mechanical chains are used to convey products in a production environment, it is imperative for sanitation purposes that the mechanical chains and wear track profiles can easily be cleaned to comply with various government health and safety regulations. However, when the wear track profile is secured using screws or bolts, the process time to properly clean the conveyor assembly and mechanical links can be lengthy. This can result in the production line being shut down for an extended period of time, which negatively impacts the production output of the manufacturing facility.

Further, typical conveyor assemblies have shortcomings with respect to cleanliness and safety. In addition, the mechanical chain may become loose or otherwise out of alignment over time, which can impede the performance of a conveyor assembly. Moreover, conveyor assemblies can be difficult to adjust such that the conveyor (and/or other components of the assembly) is level.

Accordingly, a need exists for improved conveyor assemblies that may overcome one or more disadvantages of existing systems.

BRIEF DESCRIPTION

Aspects and advantages of the invention will be set forth in part in the following description, or may be obvious from the description, or may be learned through practice of the invention. For instance, an improved conveyor system may comprise a chain adjustment assembly for adjusting the tension of the mechanical chain. As another example, an improved system may comprise a panel mounting assembly for mounting one or more panels below a conveyor track assembly to improve the safety and cleanliness of the system. Further, an improved system may comprise a leveling assembly for leveling the system that is easier to manufacture, adjust, and keep clean. Still further, an improved system may comprise a conveyor top protection assembly for blocking areas that are undesirable to leave open. What is more, an improved system may comprise one or more blocking bars and/or caps to prevent inadvertent contact with the system that could be dangerous and/or to improve the cleanliness of the system.

In one aspect, the present subject matter is directed to a cover assembly for a conveyor system. The conveyor system includes a drive end and a return end, a sprocket assembly positioned at the drive end for driving a mechanical chain of the conveyor system, and an idler assembly positioned at the return end. The cover assembly comprises a shield positioned over at least one of the sprocket assembly and the idler assembly. The shield is attached to a stationary component of the conveyor system.

In another aspect, the present subject matter is directed to a conveyor system. The conveyor system comprises a mechanical chain, a drive end and a sprocket assembly positioned at the drive end for driving the mechanical chain, a return end and an idler assembly positioned at the return end, and a guard positioned adjacent at least one of the drive end and the return end. The guard includes a first guard and a second guard, the first guard and the second guard defining a gap therebetween. The mechanical chain is disposed between the first guard and the second guard such that the first guard is positioned on a first side of the mechanical chain and the second guard is positioned on a second side of the mechanical chain.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is a perspective view of a conveyor system according to an exemplary embodiment of the present subject matter.

FIG. 2A is a cross section view of a conveyor track section according to an exemplary embodiment of the present subject matter, comprising a base plate, a wear track profile, a plurality of securing members having a Z shape, and a plurality of placement pins.

FIG. 2B is a cross section view of a conveyor track section according to another exemplary embodiment of the present subject matter, comprising a base plate, a wear track profile, a plurality of securing members having a C shape, and a plurality of placement pins.

FIG. 2C is a cross section view of a conveyor track section according to another exemplary embodiment of the present subject matter, comprising a base plate, a wear track profile, a plurality of securing members having an L shape, and a plurality of placement pins.

FIG. 3 is a top view of the base plate of FIGS. 2A, 2B, and 2C.

FIG. 4 is a side view of the wear track profile of FIGS. 2A, 2B, and 2C.

FIG. 5A is a side perspective view of a securing member of the plurality of Z shape securing members of FIG. 2A, according to an exemplary embodiment of the present subject matter.

FIG. 5B is a side perspective view of a securing member of the plurality of C shape securing members of FIG. 2B, according to an exemplary embodiment of the present subject matter.

FIG. 5C is a side perspective view of a securing member of the plurality of L shape securing members of FIG. 2C, according to an exemplary embodiment of the present subject matter.

FIG. 6 is an exploded perspective view of the conveyor track section of FIG. 2A.

FIG. 7 is a top view of the conveyor track section of FIG. 2A.

FIG. 8 is a side view of a quick release tool used to detach and install a securing member with respect to a conveyor track section according to an exemplary embodiment of the present subject matter.

FIG. 9 is a side view of a combination of conveyor track sections according to an exemplary embodiment of the present subject matter.

FIG. 10 is a side view of a portion of a chain adjustment assembly at a return or idler end of a conveyor system according to an exemplary embodiment of the present subject matter.

FIG. 11 is a close up side view of a portion of the chain adjustment assembly of FIG. 10.

FIG. 12 is a schematic end view of a ram of the chain adjustment assembly of FIG. 10.

FIG. 13 is a perspective side view of a housing and the ram of the chain adjustment assembly of FIG. 10.

FIG. 14 is a schematic end view of the housing of FIG. 13.

FIG. 15 is a perspective end view of a portion of the chain adjustment assembly of FIG. 10, showing a linear drive member and the housing of the chain adjustment assembly.

FIGS. 16A, 16B, and 16C provide schematic views of a shuttle or nut, a jam nut, and the linear drive member or leadscrew of the chain adjustment assembly of FIG. 10.

FIG. 17 is a schematic end view of a ram plate of the chain adjustment assembly of FIG. 10.

FIG. 18 is a schematic side view of a spacer of the chain adjustment assembly of FIG. 10.

FIG. 19 is a perspective end view of the chain adjustment assembly of FIG. 10, showing the idler sprocket secured to the chain adjustment assembly.

FIG. 20 is a schematic side view of a bearing plate of the chain adjustment assembly of FIG. 10.

FIG. 21 is a schematic side view of a panel mount assembly according to an exemplary embodiment of the present subject matter.

FIG. 22 is a rear view of an attachment block of the panel mount assembly of FIG. 21.

FIG. 23 is a front view of the panel mount assembly of FIG. 21 in a secured position.

FIG. 24 is a front view of the panel mount assembly of FIG. 21 in a mounting position, with a panel attached to the panel mount assembly.

FIG. 25 is a top, rear view of the panel mount assembly of FIG. 21 in the mounting position, with a panel attached to the panel mount assembly.

FIG. 26 is a front view of the panel mount assembly of FIG. 21 in the secured position, with a panel attached to the panel mount assembly.

FIG. 27A provides a schematic side view and FIG. 27B provides a perspective side view of a support member of the panel mount assembly of FIG. 21 according to other exemplary embodiments of the present subject matter.

FIGS. 28A and 28B provide side perspective and close up views of a pivot holder and one end of a support member of the panel mount assembly of FIG. 21 according to various embodiments of the present subject matter.

FIGS. 29A and 29B provide top, close up views of the pivot holders and end of the support members of FIGS. 28A and 28B.

FIG. 30 is a side perspective, close up view of a support rest of the panel mount assembly of FIG. 21.

FIG. 31 is a schematic view of the support rest of FIG. 31.

FIG. 32 is a schematic view of a plurality of leveling assemblies attached to a conveyor system according to an exemplary embodiment of the present subject matter.

FIG. 33 is a schematic view of a leveling assembly according to an exemplary embodiment of the present subject matter.

FIG. 34 is a front view of a leveling assembly according to another exemplary embodiment of the present subject matter.

FIG. 35 is a side view of the leveling assembly of FIG. 34.

FIG. 36 is a rear view of the leveling assembly of FIG. 34.

FIG. 37 is a close up view of an exposed portion of a leveling screw of the leveling assembly of FIG. 34.

FIG. 38 is a top view of a sealing nut and leveling pad of the leveling assembly of FIG. 34.

FIG. 39 is a perspective view of a portion of a conveyor system having a conveyor top protection assembly according to an exemplary embodiment of the present subject matter, with panels of the conveyor top protection assembly in a stored or hung up position on a hanger structure.

FIG. 40 is a schematic view of a hanger structure of the conveyor top protection assembly of FIG. 39 according to another exemplary embodiment of the present subject matter.

FIG. 41 is a side view of the conveyor system of FIG. 39 with the panels in a deployed position.

FIG. 42 is an end view of the conveyor system of FIG. 39 with the panels in the deployed position.

FIG. 43 is a perspective view of a hanger structure of a conveyor system having a wear track profile and a panel hanging thereon.

FIGS. 44 and 45 provide end views of a portion of the conveyor system of FIG. 39, with FIG. 44 showing a blocking bar rotated into position under a mechanical chain of the conveyor system and FIG. 45 showing the blocking bar rotated away from the mechanical chain, according to an exemplary embodiment of the present subject matter.

FIGS. 46 and 47 are side perspective views of a portion of the conveyor system of FIG. 39, showing a cap on an end portion of a conveyor track assembly of the conveyor system, according to an exemplary embodiment of the present subject matter.

FIG. 48 is a side, schematic view of an end of the conveyor system having a shield positioned over a rotating assembly, such as the sprocket assembly or idler assembly, and a guard positioned at the end of the conveyor system between the shield and the mechanical chain of the conveyor system.

FIG. 49 is a perspective view of a portion of the conveyor system of FIG. 48, illustrating a portion of the shield and a top or upper portion of the guard.

FIG. 50 is an end perspective view of a portion of the conveyor system of FIG. 48, illustrating the shield and the guard relative to one another and to the mechanical chain of the conveyor system.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, terms such as "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 provides a perspective view of a portion of a conveyor system 100 according to an exemplary embodiment of the present subject matter. In the illustrated embodiment, two mechanical chains 110 form a conveyor to convey thereon items such as, e.g., empty or loaded boxes or the like. Each mechanical chain 110 is formed from a plurality of links 112 on which the items to be conveyed are placed. As shown in FIG. 1, the two mechanical chains 110 are positioned equidistant from each other throughout the conveyor system 100. As will be readily understood, one, two, or more than two chains may be used to form a conveyor to convey items thereon. Further, the conveyor system 100 comprises at least one conveyor track section 200. Each conveyor track section 200 includes a wear track profile 250 in which the mechanical chain 110 is received as it traverses a path through the conveyor system 100. The conveyor track section 200 is described in greater detail below.

Within the depicted conveyor system 100, mechanical chains 110 are supported on a support structure 120 that includes a plurality of vertical supports 122 and a plurality of horizontal supports 124. As shown in FIG. 1, the support structure 120 may also include one or more guide walls 126, e.g., to help guide items as they are conveyed by conveyor system 100. Additionally, other components such as, e.g., a ramp 130 or slide 130 may be used in conveyor system 100 to transfer items from one portion of the conveyor system 100 to another portion of the conveyor system 100.

As further illustrated in FIG. 1, mechanical chains 110 of conveyor system 100 are driven by sprocket assembly 140 positioned at a drive end 102 of conveyor system 100, with an idler assembly 142 positioned at a return end 104 of conveyor system 100 to guide mechanical chains 110. Specifically, each mechanical chain 110 generally traverses a loop such that the links 112 of the mechanical chain 110 in an upper grouping of the loop are pulled by sprocket assembly 140 away from idler assembly 142 along a direction of movement M, with a portion of each mechanical chain 110 exposed for the placement of items thereon. Links 112 in a lower grouping of the loop are pushed toward idler assembly 142 in a direction opposite to the direction of movement M.

FIGS. 2A, 2B, and 2C each provide a cross section view of an exemplary conveyor track section 200 of the present subject matter. The exemplary conveyor track section 200 of FIG. 2A utilizes a plurality of securing members 300 according to the exemplary embodiment of securing members 300 illustrated in FIG. 5A. The exemplary conveyor track section 200 of FIG. 2B utilizes a plurality of securing members 300 according to the exemplary embodiment of securing members 300 depicted in FIG. 5B. Further, the exemplary conveyor track section 200 of FIG. 2C utilizes a plurality of securing members 300 according to the exemplary embodiment of securing members 300 shown in of FIG. 5C.

The conveyor track section 200 defines a length direction L (FIG. 6), a width direction W, and a height direction $H_T$, which are orthogonal to one another. As shown, the conveyor track section 200 comprises a base plate 210, a wear track profile 250, placement pins 290, and securing members 300, which when assembled provide a path for the links 112 of the mechanical chain 110 to traverse. More particularly, as illustrated in FIGS. 2A-2C, the mechanical chain 110 is received within the wear track profile 250 such that the links 112 of the chain 110 move along the wear track profile 250 as the chain 110 moves within the conveyor system 100. Further, as described herein, the exemplary conveyor track section 200 comprises a plurality of placement pins 290 and a plurality of securing members 300. The placement pins 290 and securing members 300 removably or releasably align and secure the wear track profile 250 with the base plate 210. In some embodiments, the conveyor track section 200 is symmetric across an assembly section center axis 202, which extends along the height direction $H_T$. Therefore, in such embodiments, there is an equivalent number of securing members 300 and placement pins 290 on the left side and the right side of the first center axis 202. Each component is described in greater detail below.

FIG. 3 provides a top view of the base plate 210 shown in FIGS. 2A, 2B, and 2C. Base plate 210 is defined dimensionally by a length $l_1$, a width $w_1$, and a height $h_1$ (FIGS. 2A-2C). In the illustrated embodiment, the base plate 210 is a ¼ inch thick stainless steel plate; that is, height $h_1$ is ¼ inch. However, one skilled in the art will appreciate the base plate also may be made from other suitable materials and may have a different height or thickness. Further, base plate 210 has a first end 212, a second end 214, a top surface 216, and a bottom surface 218 (FIGS. 2A-2C). Between a first side surface 220 and a second side surface 222 and extending along the length direction L, the base plate 210 has a base plate center axis 204. In the illustrated embodiment, the base plate 210 is symmetric across the second center axis 204. As further described below, the symmetric design allows for an even distribution of forces across the base plate 210 in the conveyor system 100.

Adjacent the first side surface 220, the base plate 210 defines a first row of slots 230. Each slot 230 in the row of slots is an opening that extends through the base plate 210 from the top surface 216 to the bottom surface 218. In the illustrated embodiment, each slot 230 has the same dimensions, which are dictated by the dimensions of securing members 300. More particularly, each slot 230 must be large enough for a securing member 300 to extend through the opening for proper assembly of conveyor track section 200, while also being small enough for securing member 300 to remain in place once the conveyor track section 200 is assembled. A widthwise center 232 of each slot 230 in the first row of slots is a distance $d_1$ from the first side surface 220. It can further be seen in FIG. 3 that the slots 230 are more condensed near the first end 212 and the second end 214 than a lengthwise central portion of the base plate 210. Because the first end 212 and the second end 214 experience the greatest forces and moments during use, the slots 230 near the ends 212, 214 are more condensed and, in the depicted embodiment, are spaced from one another at a distance $d_2$. As forces decrease toward the center, i.e., away from each of the first end 212 and second end 214, the slots 230 can be spaced from one another at larger and larger distances, such as the distances $d_3$ and $d_4$ in the exemplary embodiment. Similarly, as shown in FIG. 3, a symmetrical second row of slots 230 is defined adjacent the second side surface 222 of the base plate 210. Each slot 230 in the second row of slots is configured as described with respect to the slots 230 of the first row of slots.

The base plate 210 defines a hole 240 adjacent each slot 230. In the exemplary embodiment, each hole 240 receives a placement pin 290, as shown in FIGS. 2A, 2B, and 2C. A center 242 of each hole 240 is located a widthwise distance $d_5$ from the center 232 of each slot 230. The diameter $D_1$ of each hole 240 is dictated by the diameter $D_2$ of the placement pins 290 (FIGS. 2A-2C). As illustrated in each of FIGS. 2A, 2B, and 2C, the depth or height $h_2$ of each hole 240 may be dictated by a desired height $h_3$ that the placement pin 290 extends above the top surface 216 of the base plate 210. In the depicted embodiment, the height $h_2$ of each of the holes 240 does not extend completely through the base plate 210, i.e., from the top surface 216 of the base plate 210 to the bottom surface 218 of the base plate 210, which permits a placement pin 290 to be received and secured in each hole 240 as will be described in further detail below.

FIG. 4 is a side view of the wear track profile 250 of the conveyor track section 200 shown in FIGS. 2A-2C. In exemplary embodiments, the wear track profile 250 is made of a single piece of ultra-high molecular weight polyethylene. However, one skilled in the art will appreciate that, in other embodiments, the wear track profile may consist of multiple components and/or be made from other suitable materials. The wear track profile 250 has a top surface 252, a bottom surface 254, a first end 256 opposite a second end 258 along the length direction L, and a first side 260 opposite a second side 262 along the width direction W. The wear track profile 250 has a length $l_2$ extending along the length direction L from the first end 256 to the second end 258. While the lengths $l_1$ of the base plate 210 and $l_2$ of the wear track profile 250 may be different in some embodiments, in the illustrated embodiment, each length $l_1$, $l_2$ is identical. Further, like the base plate 210, the wear track profile 250 is symmetric across a longitudinal or lengthwise center axis 264 (FIG. 6) that extends along the length direction L.

At least a portion of each of the first end 256 and the second end 258 of the wear track profile 250 is biased at an angle with respect to the bottom surface 254. As shown in FIG. 4, a portion of the first end 256 is biased at an angle θ with respect to the top surface 252, and a portion of the second end 258 likewise is biased at the angle θ with respect to the bottom surface 254 of the wear track profile 250; the top surface 252 and bottom surface 254 are parallel to one another. Angle θ is greater than 0°, and in some embodiments, angle θ may be within a range from about 30° to about 60°. In the illustrated embodiment, angle θ is about 45°, but the angle θ may have other values as well, up to about 90°. The angled first end 256 and angled second end 258 help prevent debris such as waste or contaminants from filling the gaps between conveyor track sections 200, as well as help transition between uneven surfaces and bends or curves in the conveyor system 100.

As shown in FIG. 4, the bottom surface 254 of the wear track profile includes a plurality of ribs 270. Each rib of the plurality of ribs 270 extends from the bottom surface 254 of the wear track profile 250 and has a height $h_4$. Further, each rib 270 comprises a width $w_2$ (FIG. 7) and extends the entire width $w_3$ (FIGS. 2A-2C) of the wear track profile 250. The bottom surface 272 of each rib 270 defines at least one hole 274 that receives a corresponding placement pin 290 secured to the base plate 210. Therefore, each hole 274 in the wear track profile 250 corresponds to a hole 240 in the base plate 210, such that a first row of holes 274 and a second row of holes 274 are defined in the plurality of ribs 270. As illustrated in FIGS. 2A, 2B, and 2C, the placement pins 290 secured within the plurality of holes 240 of the base plate 210 thereby are received in the corresponding hole 274 on the wear track profile 250. As such, the plurality of placement pins 290 aligns the wear track profile 250 and the base plate 210 and prevents the wear track profile 250 from shifting on the base plate 210 when the conveyor system 100 is in operation.

In exemplary embodiments, the shape of each hole 274 is complementary to the shape of each placement pin 290, but the holes 274 may have any suitable shape for receipt of placement pins 290. Further, the diameter $D_3$ of each hole 274 is large enough to receive a placement pin 290 but also small for the placement pin 290 to snugly fit within the hole 274. It will also be appreciated by one skilled in the art that in other embodiments, the bottom surface 254 of the wear track profile 250, rather than ribs 270, may define the holes 274 that receive corresponding placement pins 290 that are secured to the base plate 210.

In the illustrated embodiment, the ribs 270 are equally spaced along the length direction L from the first end 256 to the second end 258, but like the holes 240 defined in the base plate 210, the holes 274 in the first row of holes 274 are not equally spaced from one another and the number of holes 274 in the second row of holes are not evenly spaced from one another along the length direction L. Accordingly, in the embodiment depicted in FIG. 4, the number of ribs 270 differs from the number of holes 274 in the first row of holes and from the number of holes 274 in the second row of holes. It will be appreciated that, in other embodiments, a hole 274 in the first row of holes is defined in each rib 270 and a hole 274 in the second row of holes is defined in each rib 270 such that the number of holes 274 in the first row of holes and the number of holes 274 in the second row of holes 274 corresponds to the number of ribs 270. Thus, in such embodiments, the ribs 270 may not be equally spaced apart from one another along the length direction L.

Additionally, as shown in FIG. 6, the center of the wear track profile 250 defines a cutout 280 corresponding to the shape of the mechanical chain 110. The cutout 280 extends the entire length $l_2$ of the wear track profile 250, and the cutout 280 remains consistent across each conveyor track section 200 of the conveyor system 100. It will be appreciated by one skilled in the art that the shape of cutout 280 may be adapted for various types of mechanical chains 110 that may be used with the conveyor system 100 for a variety of applications.

FIG. 5A provides a side view of a securing member 300 illustrated in FIG. 2A. As shown in FIG. 5A, the securing member 300 comprises a first arm 302, a second arm 304, and a third arm 306. The arms together form a Z shape and provide stiffness to secure the wear track profile 250 to the base plate 210. The first arm 302 has a length $l_3$, the second arm 304 has a length $l_4$, and the third arm 306 has a length $l_5$. Further, the first and third arms 302, 306 may be substantially parallel as shown in FIG. 5 and, thus, substantially parallel to the top surface 252 of the wear track profile 250 and the bottom surface 218 of the base plate 210, or the first arm 302 may be angled downward as shown in FIG. 2A, which increases the pressure provided by the securing member 300 and can help the securing member 300 hold the wear track profile 250 in position with respect to the base plate 210. The first arm 302 may be angled downward only slightly, to provide increased pressure without making it overly difficult or impossible to install or remove the securing member 300. Moreover, the transitions between the arms 302, 304, 306 of the securing member 300 may be curved (i.e., may have a radius) or may be substantially square (i.e., the first and second arms 302, 304 and the second and third arms 304, 306 intersect at substantially right angles).

FIG. 5B provides a side view of a securing member 300 illustrated in FIG. 2B, i.e., FIG. 5B depicts another exemplary embodiment of a securing member for locking or securing the wear track profile 250 with respect to the base plate 210. As shown in FIG. 5B, the securing member 300 comprises a first arm 302, a second arm 304, and a third arm 306. The three arms together form a C shape and provide stiffness to secure the wear track profile 250 to the base plate 210; the shape of the securing member 300 also could be described as a U shape. The first arm 302 has a length $l_3$, the second arm 304 has a length $l_4$, and the third arm 306 has a length $l_5$. In various embodiments, the length $l_3$ of the first arm 302 may be approximately equal to the length $l_3$ of the third arm 306, or either the first arm 302 or the third arm 306 may be longer than the other. Further, the first and third arms 302, 306 may be substantially parallel as shown in FIG. 5B and, thus, substantially parallel to the top surface 252 of the wear track profile 250 and the bottom surface 218 of the base plate 210, or the first arm 302 may be angled downward as shown in FIG. 2B, which increases the pressure provided by the securing member 300 and can help the securing member 300 hold the wear track profile 250 in position with respect to the base plate 210. The first arm 302 may be angled downward only slightly, to provide increased pressure without making it overly difficult or impossible to install or remove the securing member 300. Moreover, the transitions between the arms 302, 304, 306 of the securing member 300 may be curved (i.e., may have a radius) or may be substantially square (i.e., the first and second arms 302, 304 and the second and third arms 304, 306 intersect at substantially right angles).

FIG. 5C provides a side view of the securing member 300 of FIG. 2C, i.e., FIG. 5C illustrates another exemplary embodiment of a securing member for locking or securing the wear track profile 250 with respect to the base plate 210. As shown in FIG. 5C, the securing member 300 comprises a first arm 302 and a second arm 304. The two arms together form an L shape and provide stiffness to secure the wear track profile 250 to the base plate 210. Further, a washer 308 is welded or otherwise secured to the end of the second arm 304 opposite the end at which the first arm 302 intersects the second arm 304. The second arm 304 may protrude beyond the washer 308 as shown in FIG. 5C, or the second arm 304 may not protrude beyond the washer 308 (i.e., the end of the second arm 304 may be flush with or recessed within the washer 308). In the embodiment depicted in FIG. 5C, the first arm 302 has a length $l_3$ and the second arm 304 has a length $l_4$, which may be different than the lengths $l_3$ and $l_4$ of the first and second arms 302, 304 of the C shaped securing member 300 shown in FIG. 5C. Additionally, as shown in FIG. 2C, the first arm 302 may be angled downward, rather than substantially parallel to the top surface 252 of the wear track profile 250, to increase the pressure provided by the securing member 300 and help the securing member 300 hold the wear track profile 250 in position with respect to the base plate 210. As previously described, the first arm 302 may be angled downward only slightly, to provide increased pressure without making it overly difficult or impossible to install or remove the securing member 300. Moreover, the transition between the first and second arms 302, 304 of the securing member 300 may be curved (i.e., may have a radius) or may be substantially square (i.e., the first and second arms 302, 304 intersect at a substantially right angle).

It will be understood that, in other embodiments, the securing member 300 may have other suitable shapes, with any appropriate number of arms; the shape is selected for the securing member 300 to secure the wear track profile 250 to the base plate 210. Further, the relative lengths and diameters of the arms 302, 304, 306 of the securing members 300 illustrated in FIGS. 5A and 5B are by way of example only. In other embodiments, the length and diameter of each arm 302, 304, 306 may vary from the depicted embodiments.

FIG. 6 provides an exploded perspective view and FIG. 7 provides a top view of a portion of the conveyor track section 200 depicted in FIG. 2A, which comprises the components depicted in FIG. 3-5A. Although only one securing member 300 is depicted in FIG. 6, it will be appreciated that a securing member 300 extends through each slot 230 in the base plate 210 such that the first arm 302 is positioned on the top surface 252 of the wear track profile 250 and the third arm 306 is positioned on the bottom surface 218 of the base plate 210 as further described herein. A plurality of securing members 300 are shown in FIG. 7. Further, although only illustrated with respect to the Z shape securing member 300 of FIG. 5A, it will be easily understood from FIGS. 2B and 2C that the following description of FIGS. 6 and 7 also generally applies to conveyor track sections 200 having C shape securing members 300 as shown in FIG. 5B and L shape securing members 300 as shown in FIG. 5C.

As illustrated in FIG. 6, the placement pins 290 are secured in the holes 240 in the base plate 210. The placement pins 290 may be made from stainless steel or another suitable material and, in exemplary embodiments, are welded into the holes 240. For example, the base plate 210 may define a recess 292 (FIGS. 2A-2C, 9) adjacent each hole 240 that provides an area for placement pins 290 to be welded to the base plate 210 within the holes 240. However, one skilled in the art will appreciate that the placement pins 290 may be secured to the base plate 210 using other suitable methods.

The holes 274 defined by the wear track profile 250, e.g., in ribs 270 as shown in the depicted embodiment, correspond to the placement pins 290 on the base plate 210. Therefore, the first end 212 and second end 214 of the base plate 210 align with the first end 256 and second end 258 of the wear track profile 250. The placement pins 290 received in the wear track profile 250 permit proper alignment of wear track profile 250 and base plate 210 and prevent the wear track profile 250 from shifting during operation of the conveyor system 100.

Further, as generally designated in FIG. 6, the top surface 252 of the wear track profile defines a first row of grooves 282 and a second row of grooves 282 spaced laterally apart from the first row. Each groove 282 in the first and second rows of grooves 282 is defined directly above a hole 274 defined in the wear track profile 250. As illustrated in FIGS. 6 and 7, each groove 282 receives the first arm 302 of a securing member 300, and the grooves 282 may be tapered in depth, as most clearly illustrated in FIG. 2A. That is, each groove 282 has a first end 284 that is deeper than an opposite second end 286. In the depicted embodiment, the first ends 284 of the grooves 282 are defined toward the center of the wear track profile 250. As such, as shown in FIG. 6 for example, the second ends 286 of the grooves 282 in the first row of grooves are defined closer to the first side 260 of the wear track profile 250 and the second ends 286 of the grooves 282 in the second row of grooves are defined closer to the second side 262 of the wear track profile.

Thus, the first arm 302 of each securing member 300 of the conveyor track section 200 contacts the top surface 252 of the wear track profile 250. Further, the first arm 302 of each securing member 300 is directly above a placement pin 290 as shown in FIGS. 2A and 7. The second arm 304 of each securing member 300 extends through a corresponding slot 230 in the base plate 210, and the third arm 306 of each securing member 300 contacts the bottom surface 218 of base plate 210. It will be appreciated that, as shown in FIG. 2B, embodiments comprising C shape securing members 300 will have a similar configuration, i.e., the first arm 302 contacts the top surface 252 in the profile 250, the second arm 304 extends through a corresponding slot 230 in the base plate 210, and the third arm 306 of each securing member 300 contacts the bottom surface 218 of base plate 210. However, in embodiments utilizing C shape securing members 300, the third arm 306 extends in the same direction as the first arm 302 such that the first and third arms 302, 306 generally are vertically aligned, but in embodiments with Z shape securing members 300, the third arm 306 extends in the opposite direction as the first arm 302 such that the arms 302, 306 generally are parallel but are not vertically aligned. Further, in embodiments comprising L shape securing members 300 rather than Z shape or C shape securing members 300, the washer 308, rather than a third arm 306, contacts the bottom surface 218 of the base plate 210. Otherwise, as described with respect to the Z shape and C shape securing members 300 and as shown in FIG. 2C, the first arm 302 of each L shape securing member 300 contacts the top surface 252 of the wear track profile 250 and is directly above a placement pin 290, and the second arm 304 of each L shape securing member 300 extends through a corresponding slot 230 in the base plate 210.

When a securing member 300 is installed in each slot 230 with the first and third arms 302, 306 contacting the wear track profile 250 and base plate 210, respectively, the conveyor track section 200 is fully assembled without the need for hardware such as screws or bolts. The illustrated embodiment allows for easier assembly and disassembly of conveyor track section 200, which, e.g., decreases the amount of time required to properly clean and sanitize the conveyor system 100 when required. Further, the placement of each securing member 300 above a placement pin 290 contributes to the structural integrity of the conveyor track section 200. The securing member 300 compresses the wear track profile 250 over the base plate 210 and placement pins 290, and further prevents the wear track profile 250 from shifting or moving during operation of the conveyor system 100.

FIG. 8 is an example of a release tool 400 that can be used to install the securing members 300 with the wear track profile 250 and base plate 210 and to detach the securing members 300 from wear track profile 250 and base plate 210 so the conveyor track sections 200 can be assembled and disassembled. The release tool 400 includes a shaft 410 with a handle 420 extending from the shaft 410. A first end 414 of the release tool 400 comprises a hook 430 that fits in release holes 288 shown in FIGS. 2A-2C and 6. The release holes 288 are defined at each groove 282 on the top surface 252 of the wear track profile 250 to permit the hook 430 of the release tool 400 to be inserted under the securing member 300 such that when the hook 430 is lifted upward or rotated within the release hole 288, the securing member 300 may be released from groove 282 and thereby detached or removed from the conveyor track section 200. A second end 416 of the release tool 400 defines a slot 440 that allows assembly of the securing member 300 with the wear track profile 250 and base plate 210. More particularly, the first arm 302 or third arm 306 of a securing member 300 fits in the release tool slot 440, and the release tool 400 is rotated to position the arm of the securing member 300 in place with respect to the wear track profile 250 or base plate 210.

It will be appreciated that the securing members 300 may apply a relatively large amount of pressure (90 pounds per square inch) to the wear track profile 250 and base plate 210 to properly assemble the profile 250 and plate 210 to form the conveyor track section 200. As such, the release tool 400 may allow easier assembly and/or disassembly of conveyor track sections 200. For example, the release tool 400 may make it possible to install and detach the securing members 300, which may apply too great of a pressure to allow for assembly and disassembly by hand. As another example, the release tool 400 may reduce the amount of time it takes to assemble the wear track profile 250 with the base plate 210 or to remove the profile 250 from the plate 210. Further, to facilitate use of the release tool 400, it will be appreciated that the washers 308 used with the L shape securing members 300 may be secured to each securing member 300 after the securing member is assembled with the wear track profile 250 and base plate 210 and may be removed from each securing member 300 before the securing member is disassembled from the conveyor track section 200. In other embodiments, the release tool 400 may not be used for either assembly, disassembly, or both of the conveyor track section (s) 200 that utilize L shape securing member 300.

FIG. 9 provides a side view of two conveyor track sections 200 positioned adjacent one another at their ends to form a portion of the conveyor system 100. As previously described, at least a portion of each end 256, 258 of a wear track profile 250 may be angled with respect to the bottom surface 254 of the wear track profile. The angled portion of the first end 256 defines a first angled surface 266, and the angled portion of the second end 258 defines a second angled surface 268. As shown in FIG. 9, when the conveyor track sections 200 are positioned end-to-end, the first angled surface 266 of one conveyor track section 200 aligns with a second angled surface 268 of a second conveyor track section 200. In the illustrated embodiment, because the first end 256 and first angled surface 266 and the second end 258 and second angled surface 268 are at the same angle θ, a gap G between the conveyor track sections 200 may be minimized. Therefore, less debris enters the gap G, which enables easier cleaning and sanitation of the conveyor system 100. Further, the angled first and second ends 256, 258 help the plurality of conveyor track sections 200 transition between uneven surfaces and bends or curves in the conveyor system 100. That is, the angled interface between conveyor track sections 200 may be better for more complicated configurations of the conveyor system 100 than an essentially vertical interface between sections 200 by better enabling transitions while also minimizing gaps between sections 200.

It also will be appreciated that the base plates 210 may be configured to secure one or more wear track profiles 250 to each base plate 210. For example, the base plate 210 may secure two wear track profiles 250 using the structure detailed above. Similarly, the base plate 210 sizes may be altered so the gaps between base plates 210 occur in the midpoints of the wear track profiles 250. Further, it can be appreciated by one skilled in the art that the base plate may define additional holes, slots, grooves, etc. to mount the base plate 210 to the support structure 120 of the conveyor system 100.

Turning now to FIGS. 10 through 20, a chain adjustment assembly 500 is illustrated according to an exemplary embodiment of the present subject matter. Generally, the chain adjustment assembly 500 is a translating unit that adjusts the position of the sprocket 144 of the idler assembly 142 to loosen or tighten the mechanical chain 110 of the conveyor system 100. For instance, the mechanical chain 110 may grow slack or loosen as the conveyor system 100 is used over time; a slack or loose chain 110 may degrade the performance of the conveyor system 100. Thus, to maintain or improve the performance of the conveyor system 100, the chain adjustment assembly 500 may be used to restore the chain 110 to its previous tightness or to maintain a desired tension on the chain 110.

As shown in FIGS. 10-14, the chain adjustment assembly 500 includes a ram 502 that, in the depicted embodiment, translates horizontally in and out of a housing 504, which has a width $w_{house}$, and a height $h_{house}$, as illustrated in FIG. 14. More particularly, the ram 502 telescopes in and out of the housing 504 and is centered within the housing 504 by runners 506 that extend from the top, bottom, and sides of the ram 502. As indicated in FIG. 12, the ram 502 has a width $w_{ram}$ and a height $h_{ram}$, where the width $w_{ram}$ is measured from the outer surface of a side runner 506 to the outer surface of an opposite side runner 506 and the height $h_{ram}$ is measured from the outer surface of a top runner 506 to the outer surface of a bottom runner 506. As shown in the figures, the runners 506 are welded to the ram 502; in other embodiments, the runners 506 may be secured or attached to the ram 502 using other securing means (such as fasteners or the like), or the ram 502 may be formed such that the ram 502 and runners 506 are a single, integral component. In any event, the runners 506 may be relatively easily made part of the ram 502 to reliably position the ram 502 within the housing 504.

The width $w_{house}$ and height $h_{house}$ of the housing 504, as well as the width $w_{ram}$ and height $h_{ram}$ of the ram 502, may be selected based on the dimensions of other features of the chain adjustment assembly 500 and conveyor system 100. In an exemplary embodiment, the width $w_{house}$ of the housing 504 is 4½ inches and the height $h_{house}$ of the housing 504 is 1¾ inches, and the width $w_{ram}$ of the ram 502 is 4 inches and the height $h_{ram}$ of the ram 502 is 1¼ inches. However, other widths and heights of the ram 502 and housing 504 also may be used.

In addition to positioning the ram 502 within the housing 504, the runners 506 allow a cleaning fluid to pass through the housing 504 around the ram 502, which aids in cleaning the conveyor system 100. Further, the runners 506 reduce the friction between the ram 502 and housing 504 by reducing the contact area between the ram 502 and housing 504, e.g., compared to the friction between the ram 502 and housing 504 if one or more surfaces of the ram 502 (such as the bottom surface 502a, which would contact the housing 504 along an area equal to the entire width of the ram 502 and at least a portion of the length of the ram 502) was in contact with the housing. That is, each runner 506 comprises only a fraction of the width or height of the ram 502, and even if each runner 506 extends along the entire length of the ram 502 (and in some embodiments, one or more runners 506 may extend along only a portion of the ram length), the friction between the ram 502 and the housing 504 is reduced compared to the friction between the ram 502 and housing 504 if one or more surfaces of the ram 502 was in contact with the housing 504. Thus, the runners 506 provide reliable positioning that is easy to manufacture while minimizing the friction within the housing 504.

The ram 502 is driven by a linear drive member 508, which in exemplary embodiments is a screw or a leadscrew, as shown in FIGS. 15 and 16. The linear drive member 508 is actuated at a first end 508a, e.g., using a wrench or other device to apply torque to the first end 508a either manually or automatically. As shown in FIG. 16A, the first end 508a may include a square shaped protrusion or other section where a tool may be used to apply the torque. Opposite the first end 508a, a second end 508b of the linear drive member 508 is secured to the ram 502, e.g., using one or more set screws, such that the motion of the linear drive member 508 is translated to the ram 502. More particularly, for exemplary embodiments in which the linear drive member 508 is a leadscrew, the rotational motion of the leadscrew 508 is translated to linear motion of a shuttle or nut 510 (FIG. 16B) received on the leadscrew 508 at its second end 508b. As depicted in FIGS. 12 and 16B, the ram 502 and the nut 510 each define an aperture 512 for receipt of the leadscrew 508. The nut 510, in turn, is secured to the ram 502, e.g., using the one or more set screws, such that the ram 502 moves linearly as the leadscrew 508 is rotated. As shown in FIGS. 12 and 16B, in an exemplary embodiment, two set screws are used, such that two set screw openings 514 are defined in each of the ram 502 and nut 510. One or more jam nuts 516 (FIG. 16C) may be used to help position the nut 510 on the leadscrew 508. Moreover, the mechanical securement of the set screws is reversible and thus enables the linear drive member 508 to be easily dissembled from the ram 502 should the need arise for cleaning or replacement of any of the parts of the chain adjustment assembly 500. Further, in embodiments having a leadscrew as the linear drive member 508, the length of the leadscrew 508, its diameter, and the pitch of its threads allow dimensioning the leadscrew 508 to adequately absorb the considerable tension the chain 110 applies to the idler sprocket 144. The nut 510, having a width $w_{nut}$ and a height $h_{nut}$ as shown in FIG. 16B, also may be dimensioned based on the tension in the chain 110, as well as any dimensional constraints of the ram 502 and/or housing 504. As further illustrated in FIG. 16A, the leadscrew 508 may not be threaded along its entire length, and a threaded portion 518 of the leadscrew 508 may end at a distance or length $l_{off\_threads}$ from the second end 508b.

The ram 502 is attached to a ram plate 520, which is illustrated in FIGS. 10, 11, 17, and 19. The ram plate 520 distributes the force of the ram 502 over an area $A_{Rplate}$. The area $A_{Rplate}$ is determined by the shape of the ram plate 520. As an example, for the illustrated rectangular plate 520, the area $A_{Rplate}$ is the width $w_{Rplate}$ of the plate 520 multiplied by its height $h_{Rplate}$. In other embodiments, the ram plate 520 may have another shape, e.g., the plate 520 may be circular, oval, square, hexagonal, etc., such that the area $A_{Rplate}$ is determined using an appropriate mathematical formula for the plate's shape. The ram 502 may be attached to the ram plate 520 via welding or other suitable means of securing the ram 502 with respect to the plate 520.

As shown in FIGS. 10, 11, 18, and 19, the ram plate 520 is attached to a spacer 522. As such, a first side 520a of the ram plate 520 is attached to the ram 502 and a second side 520b is attached to the spacer 522. The spacer 522 provides room for the sprocket 144, which is attached to the chain adjustment assembly 500 using a pillow block bearing assembly 524 as illustrated in FIGS. 10, 11, and 19. In other embodiments, other types of bearing assemblies or other means for supporting the sprocket 144 may be used. The spacer 522 has a height $h_{spacer}$ and a length $l_{spacer}$. A first side 522a of the spacer 522 is attached to the ram plate 520, and a second side 522b of the spacer 522 is attached to a bearing plate 526, which is depicted in FIGS. 10, 11, 19, and 20. The bearing plate 526 helps distribute the forces applied by the sprocket 144 and chain 110 through the bearing assembly 524. The bearing plate 526 has a height $h_{Bplate}$ and a length $l_{Bplate}$, and a first side 526a of the bearing plate 526 is attached to the spacer 522 and a second side 526b is attached to the bearing assembly 524. As shown most clearly in FIGS. 18-20, each of the spacer 522 and bearing plate 526 defines apertures 528 such that the bearing assembly 524 may be attached to the chain adjustment assembly 500 using appropriate fasteners 530, e.g., bolts or the like. Each of the spacer 522 and bearing plate 526 defines a distance $d_{Baps}$ between an upper aperture 528a and a lower aperture 528b.

Turning now to FIGS. 21 through 31, a panel mount assembly 600 is illustrated according to an exemplary embodiment of the present subject matter. Generally, the panel mount assembly 600 allows panels to be attached to the conveyor system 100 to block the area below the upper grouping of links in the mechanical chain 110, e.g., to block an area below an upper wear track profile 250 on a user side 150 of the conveyor system 100. The panel mount assembly 600 includes support arms that pivot away from the conveyor support structure 120 for a panel to be attached to the support arms and that pivot toward the conveyor support structure 120 with the attached panel and are secured in place such that the area under the conveyor is blocked by the panel.

Referring particularly to FIG. 21, the panel mount assembly 600 of the illustrated exemplary embodiment comprises a support member 602, an attachment block 604, washers 606, and a bushing holder 608. A panel 610 is attached to the support member 602 using the attachment block 604. More particularly, the attachment block 604 is received on a first arm 602a of the support member 602, with a washer 606 above and below the attachment block 604, e.g., to support and retain the attachment block 604 on the support member 602. The attachment block 604, bushing holder 608, and panel 610 together define at least one aperture 612 for a suitable fastener 614 (e.g., FIG. 22), which passes through the bushing holder 608, panel 610, and attachment block 604 to secure the panel 610 to the support member 602. The fastener 614 may be a bolt, and as shown most clearly in FIG. 22, a washer 616 and a nut 618 may be used with the bolt 614 to secure together the attachment block 604, panel 610, and bushing holder 608.

As depicted in FIG. 23-25, the panel mount assembly 600 has a secured position (FIG. 23) and a mounting position (FIGS. 24 and 25). In the secured position illustrated in FIG. 23, the support member 602 is pivoted or rotated into or toward the conveyor system 100 and is held in position by a support stop or rest 620. The support member 602 includes a first arm 602a, on which the attachment block 604 is received as previously described; a second arm 602b, which laterally spaces the first arm 602a from the conveyor system 100 when the support member 602 is in the mounting position; and a third arm 602c, which is received in a pivot holder 622 that permits the support member 602 to pivot with respect to the conveyor system 100. The attachment block 604 may be placed on the first arm 602a while the support member 602 is in the secured position as shown in FIG. 23, or the attachment block 604 may be placed on the first arm 602a after the support member 602 is pivoted away from the conveyor system 100.

FIGS. 24 and 25 illustrate the support member 602 in the mounting position, in which the support member 602 is pivoted or rotated away from the conveyor system 100 such that the first arm 602a of the support member 602 is spaced from the conveyor system 100. With the first arm 602a clear of the conveyor system 100, the panel 610 may easily be secured to the attachment block 604 and, thereby, the support member 602. That is, the mounting position of the panel mount assembly 600 provides adequate space to install the panel 610. Further, the mounting position allows the panel 610 to be swung or positioned away from the conveyor system 100, e.g., to clean the panel 610 and/or another component of the conveyor system 100 without having to disassemble the panel 610 from the conveyor system 100. Thus, the panel mount assembly 600 simplifies assembly and use of the conveyor system 100.

FIG. 26 illustrates the panel mount assembly 600 returned to the secured position, with the panel 610 attached to the support member 602. More particularly, and as also shown in FIGS. 24 and 25, the panel 610 is attached to more than one support member 602. Multiple support members 602 may be needed to support a panel 610, e.g., depending on the panel's length or weight, or multiple support members 602 may be used to facilitate easier and/or more controlled motion of the panel mount assembly 600 when the panel 610 is mounted thereto. However, in some embodiments, a panel 610 may be mounted to the conveyor system 100 using only one support member 602. Further, it will be appreciated that one or more panels 610 may be used along a length of the conveyor. For instance, a single panel 610 may be used that has the same length as the conveyor, or multiple panels 610 may be used along a single length of the conveyor.

As further illustrated in FIG. 26, when the panel mount assembly 600 and mounted panel 610 are in the secured position, the panel 610 blocks the conveyor system 100 below the upper conveyor track sections 200. As such, the panel 610 impedes contaminants or other debris from gathering below or under the conveyor system 100. The panels 610 may also otherwise aid in cleaning the conveyor system 100. Moreover, the panel 610 discourages a person, such as an operator or other user of the conveyor system 100, from getting a body part, clothing, or other item near the lower portion of the chain 110 or other portions of the conveyor system 100 that are hard to see from above and could pose a safety risk. Therefore, the panels 610, which are easily mounted to the conveyor system 100 and maneuvered into position using the panel mount assembly 600, help maintain or promote cleanliness of the conveyor system 100 and increase the safety of the conveyor system 100.

Referring to FIG. 27A, it will be appreciated that each arm 602a, 602b, 602c of the support member 602 has a length. More specifically, the first arm 602a has a length $l_{SMA1}$, the second arm 602b has a length $l_{SMA2}$ (FIG. 23), and the third arm 602c has a length $l_{SMA3}$. Further, the second arm 602b may extend generally along the horizontal direction $H_z$ as shown, for example, in FIG. 23, or as shown in FIG. 27A, in some embodiments the second arm 602b may extend at an angle α with respect to the horizontal direction $H_z$. Moreover, in embodiments having an angled second arm 602b, rather than the length $l_{SMA2}$ of the second arm 602b, a horizontal distance or length $d_{panel}$ of the panel 610 from the third arm 602c may be used, e.g., to determine the spacing of the panel 610 from the conveyor system 100 when the panel mount assembly 600 is in the mounting position.

FIG. 27B also depicts an alternative embodiment of the support member 602, particularly the orientation of the first arm 602a of support member 602. As shown in FIGS. 21-23, 25, and 26 and FIG. 27A, the first arm 602a may extend upward from the second arm 602b. In the alternative embodiment of FIG. 27B, the first arm 602a extends downward from the second arm 602b. Other features of the alternative support member 602 are described below. Additionally, it will be appreciated that yet other embodiments or configurations of the support member 602 may be used in the panel mount assembly 600.

Referring to FIGS. 27A-29, the pivot holder 622 will be described in greater detail. As shown in the figures, the pivot holder 622 defines a first groove 624 on a first face 626 of the pivot holder 622 that is perpendicular to the direction of movement M of the mechanical chain 110. The pivot holder 622 further defines a second groove 628 on a second face 630 of the pivot holder 622 that is parallel to the direction of movement M of the mechanical chain 110. Further, the pivot holder defines an opening 632 therethrough for receipt of the third arm 602c of the support member 602. In some embodiments, e.g., as shown in FIG. 28A and FIG. 29A, a tapered surface 634 is defined around the opening 632 at a top 636 of the pivot holder 622. Additionally, as illustrated in FIG. 28A and FIG. 29A, the pivot holder 622 may be secured to the conveyor system 100 by welding, but other suitable attachment means (e.g., fasteners, chemical bonding, etc.) may be used as well. Alternatively, the pivot holder 622 may be secured to a pivot holder support 625 as shown in FIG. 28B and FIGS. 27B and 29B, and the pivot holder support 625 may, in turn, be secured to the conveyor system 100. In the depicted exemplary embodiment, the pivot holder 622 is welded to the pivot holder support 625, which is welded to the conveyor system 100, but other attachment or securing means may be used as well. The pivot holder support 625 may elevate the support member 602, which, e.g., may be desirable based on the configuration of the support member 602, and/or the pivot holder support 625 may provide additional support to the support member 602, which is bearing the forces applied by the panel at the first arm 602a, i.e., at a distance $l_{SMA2}$ or $d_{panel}$ from the pivot holder 622.

As depicted in FIG. 23, the support member 602 is received in the first groove 624 when in the secured position and is received in the second groove 628 when in the mounting position. The grooves 624, 628 recess the support member 602 with respect to the pivot holder 622, e.g., to help prevent unintentional movement of the support member 602 with respect to the pivot holder 622. That is, each groove 624, 628 helps hold the support member 602 in the desired position, i.e., either the secured position when the support member 602 is in the first groove 624 or the mounting position when the support member 602 is in the second groove 628. Moreover, it will be appreciated that the tapered surface 634 simplifies rotational movement of the support arm 602 between the secured position and the mounting position, i.e., from the first groove 624 to the second groove 628 and back to the first groove 624.

FIGS. 30 and 31 depict the support stop or rest 620. Like the pivot holder 622, the support rest 620 defines a groove 638 perpendicular to the direction of movement M of the mechanical chain 110. As shown in FIG. 23, the support member 602 is received in the support rest groove 638 at or near the first arm 602a when the panel mount assembly 600 is in the secured position. That is, the support rest 620 is positioned at or near where the first arm 602a of the support member 602 overlies the conveyor system 100 when the support member 602 is in the secured position. As such, the support rest 620 supports the support member 602, or the support member 602 and panel 610, in the secured position. Further, similar to the grooves 624, 628 of the pivot holder 622, the support rest groove 638 helps hold the support member 602 in the secured position, i.e., the support member 602 is recessed in the support rest 620 when received in the groove 638 to help prevent unintentional movement of the support member 602 from the secured position. Moreover, as shown in FIG. 31, the support rest 620 has a width $w_{rest}$ and a height $h_{rest}$, which dimensions may be selected based on the size or dimensions of the support member 602 and/or the load the support rest 620 must support when the panel 610 is secured to the support member 602. For example, comparing FIG. 23 and FIG. 27B, the support rest 620 may be taller (i.e., the height $h_{rest}$ may be larger) in some embodiments, such as embodiments in which the first arm 602a of the support member 602 extends downward rather than upward from the second arm 602b. Additionally, the groove 638 has a depth $d_{RG}$, which may be the same as or different from the depth of the grooves 624, 628 of the pivot holder 622, and the center of the groove 638 is a distance $d_{RGC}$ from an outer edge 640 of the support rest 620. It will be appreciated that the support rest 620 may have other configurations as well.

Turning now to FIGS. 32 through 38, a leveling assembly 700 is illustrated according to an exemplary embodiment of the present subject matter. Generally, the leveling assembly 700 provides means to support the conveyor system 100 on a support surface such as a floor, as well as means to level the mechanical chain 110. For example, the leveling assembly 700 may compensate for any variances or deviations in the support structure 120 from the vertical direction V and horizontal direction $H_z$ and thereby help the working portion of the chain 110 (i.e., the portion of the chain conveying items or articles) be positioned as close to horizontal as possible. Further, as described herein, the leveling assembly 700 is configured to prevent or discourage contaminants from being trapped in the assembly 700 such that the assembly 700 does not contribute to the contamination of the environment of the conveyor system 100.

Referring to FIG. 32, a leveling assembly 700 is attached to a plurality of the vertical supports 122 of the conveyor system support structure 120. The leveling assemblies 700 contact a support surface 10, such as a floor of a manufacturing facility, a processing facility, or other facility, which supports the conveyor system 100. A horizontal support 124 may extend at or near the leveling assemblies 700, e.g., to provide cross-bracing of the support structure 120, stiffening the support structure 120 to withstand forces applied to the structure 120. The leveling assemblies 700 may be attached to the support structure 120 at any suitable support 122, 124 using any suitable securing means, e.g., welding, chemical bonding, fastening with one or more fasteners, etc.

FIG. 33 provides a schematic view of a leveling assembly 700 according to an exemplary embodiment of the present subject matter. As illustrated in FIG. 33, the leveling assembly 700 comprises a leveling nut 704, a leveling screw 706, sealing nuts 708, jam nuts 710, a leveling pad 712, and a fastener 714. The leveling nut 704 is the portion of the leveling assembly 700 attached to a vertical support 122, and the leveling nut 704 travels linearly along the leveling screw 706 to adjust the position of the conveyor system 100 to which the leveling assembly 700 is attached, e.g., as shown in FIG. 32. The leveling nut 704 may be generally cylindrical in shape, or as depicted in FIGS. 34-38, the leveling nut 704 may have a generally square or rectangular cross-section. The shape of the leveling nut 704 may be chosen to complement the shape of the component of the support structure 120 to which the leveling assembly 700 will be attached, e.g., where the vertical supports 122 are formed as open right angles or as rectangular legs, a generally square leveling nut 704 may be used such that the leveling assembly 700 may be mounted within or flush with a support 122. Further, in some embodiments, as illustrated in FIG. 33, a top portion 704a of the leveling nut 704 may be rounded or domed. That is, the top portion 704a may comprise a portion of a sphere. In other embodiments, as illustrated in FIGS. 34-36, at least part of the top portion 704a may be formed as a compound 45° angle such that at least part of the top portion is sloped. Whether the top portion 704a is rounded or angled, the top portion 704a of the leveling nut 704 in the exemplary embodiments is shaped to help contaminants flow, slide, or otherwise fall off the leveling nut 704 to discourage buildup of contaminants at or in the leveling assembly 700. Of course, in appropriate embodiments, the top portion 704a may be substantially flat, i.e., parallel to the support surface 10, rather than rounded or angled.

As shown in FIG. 33, a first end 706a of the leveling screw 706 is received in the leveling nut 704, and a second end 706b of the leveling screw 706 is received in the leveling pad 712. The second end 706b is rounded and may be referred to as a leveling ball. The leveling pad 712 defines a complementarily shaped indentation 716, which receives the leveling ball end 706b of the leveling screw 706 and, thus, may be referred to as a ball seat. The leveling screw 706 may be dimensioned, i.e., the length and diameter of the screw 706, the pitch of its threads, etc. may be selected, based on the loading of the leveling assembly 700, the desired level of precision needed in the adjustments made to level the conveyor, and/or other such criteria. Similarly, the leveling nut 704 and leveling pad 712 may be dimensioned based on the dimensions of the leveling screw 706 and/or any appropriate criteria (such as the criteria listed with respect to selecting the dimensions of the leveling screw 706).

The leveling screw 706 and the leveling nut 704 threaded on the leveling screw 706 can pivot and rotate about an axis $A_{level}$ on the leveling ball end 706b of the leveling screw 706 and thereby level the conveyor. For example, as shown in FIG. 35, the leveling screw 706 and the nuts 704, 708, 710 threaded thereon are tilting slightly to the left. It will be appreciated that the leveling assembly 700 has sufficient "play" therein to account for any variances or deviations in the conveyor supports 122, 124 from the vertical direction V and horizontal direction $H_z$ and thereby help the conveyor system 100 be positioned as close to level as possible. That is, each leveling assembly 700 can tilt left right, forward, back, etc. (more particularly, the leveling assembly 700 can rotate a full 360° about the axis $A_{level}$ extending along the vertical direction V) as needed such that the conveyor chain 110 extends substantially along the horizontal direction $H_z$ and, thus, is substantially level.

The leveling assembly 700 also comprises at least one sealing nut 708 and at least one jam nut 710, which are threaded on the leveling screw 706 between the leveling nut 704 and the leveling pad 712. As shown in FIGS. 33-38, in exemplary embodiments, the leveling assembly 700 includes two sealing nuts 708—a first sealing nut 708a and a second sealing nut 708b—and two jam nuts 710—a first jam nut 710 and a second jam nut 710b. Each sealing nut 708 has a groove 710 defined therein, as shown in FIG. 38. The groove 718 helps secure a sealing member 720, such as an O-ring or the like, between the sealing nut 708 and an adjacent component. For instance, a first sealing member 720a is located between the first sealing nut 708a and the leveling nut 704, and a second sealing member 720b is located between the second sealing nut 708b and the leveling pad 712. The jam nuts 710 help hold the sealing nuts 708 in place and thereby keep the sealing members 720 compressed between the respective sealing nut 708 and leveling assembly component. Moreover, the first jam nut 710a may help hold the leveling nut 704 in position and the second jam nut 710b may help hold the leveling screw 706 in position with respect to the leveling pad 712 such that the level position of the conveyor can be maintained (once the level position is found after adjusting the leveling assembly 700). The sealing members 720 help prevent or impede contamination (e.g., dirt, debris, waste, etc. from processes occurring at or on the conveyor system 100 or around the conveyor system 100) from gathering at or in the threads of the leveling nut 704 and at or in the leveling pad 712, e.g., in the indentation or ball seat 716, which could compromise the cleanliness or sterility of the conveyor system. Further, sealing off the leveling nut 704 and the leveling pad 712 could make it easier to clean the leveling assembly 700 by eliminating places where contaminants could gather or be trapped.

Referring to FIG. 33, the leveling pad 712 also may define one or more blowout or clean out holes 702 for a cleaning fluid to be passed through the leveling pad 712 to clean out any debris or contamination that may have gotten into the pad 712, e.g., into the indentation 716 where the leveling ball end 706b of the leveling screw 706 is received. More particularly, as shown in FIG. 33, the clean out hole(s) 702 may be defined such that at least one hole 702 penetrates the leveling pad surface defining the indentation 716 and the cleaning fluid can reach the indentation 716 to clean the indented area of the pad 712. The clean out hole(s) 702 may be plugged with a removable plug (not shown) when the leveling pad 712 is not being cleaned, i.e., the plug is removed to clean the leveling pad 712.

Keeping with FIG. 33, the leveling pad 712 also defines an aperture 722 for receipt of the fastener 714, such as a bolt or the like, that passes through the leveling pad 712 and into the support structure 10 to secure or fasten the leveling assembly 700 to the support structure 10. For example, the leveling pad 712 defines at least one threaded aperture 722 for receipt of a bolt 714 for bolting the leveling assembly 700, and thereby the conveyor system 100 that is attached to the leveling assembly 700 as previously described, to a floor 10. Additionally, the leveling screw 706 includes an adjustment portion 726, where a tool such as a wrench or the like may be used to turn the screw 706 and thereby adjust the conveyor. The adjustment portion 726 of the leveling screw 706 may be unthreaded, i.e., generally smooth, and may be cylindrical like the screw 706 or may be shaped to complement the tool used to turn the screw, e.g., the adjustment portion 726 may have a generally square or hexagonal cross-sectional shape to complement a wrench used to turn the screw 706. As shown in FIG. 33, the adjustment portion 726 may be defined near the second end 706b of the leveling screw 706, e.g., immediately above the leveling ball end 706b of the screw 706. Moreover, in some embodiments, a layer of a material such as urethane or the like may be included on a bottom surface 712b of the leveling pad 712 or positioned between the bottom surface 712b and the support structure 10. The layer of material may further help absorb imperfections, e.g., in the support structure 10, that would otherwise contribute to the conveyor system 100 being unlevel. Further, the layer of material may help protect the support structure 10, e.g., from scuffs, scrapes, nicks, dents, etc.

Turning now to FIGS. 39 through 42, a conveyor top protection assembly 800 is illustrated according to an exemplary embodiment of the present subject matter. The conveyor top protection assembly 800 comprises one or more hanger structures 802 for hanging one or more panels 804 thereon. Each hanger structure 802 includes a hook 806 on which the panel 804 is received and at least one support 808. In the embodiment depicted in FIG. 39, each hanger structure 802 includes a vertical support 808V and a horizontal support 808H arranged in a cross shape. However, as shown in FIG. 40, the hanger structure 802 may have a different configuration, e.g., a vertical support 808V and a horizontal support 808H arranged in a cross shape and two angled supports 808A, where one angled support 808A extends from one end of the horizontal support 808H to the top end of the vertical support 808V and the other angled support 808A extends from the other or opposite end of the horizontal support 808H to the top end of the vertical support 808V. The angled supports 808A may help the horizontal and vertical supports 808H, 808V bear the load of particularly large or heavy panels 804 or multiple panels 804; without the angled supports 808A, the horizontal support 808H and/or vertical support 808V may deflect, bend, or fail under the load of the panel(s) 804. Alternatively, the horizontal and vertical supports 808H, 808V may be sized to bear the load of the panel(s) 804 without angled supports 808A, e.g., to eliminate material required to fabricate the angled supports 808A, to simplify manufacture of the hanger structure 802, etc.

Referring to FIG. 41, in yet other embodiments, the hanger structure 802 may have other suitable configurations. As shown in FIG. 41, the hanger structure 802 may comprise one or more hooks or pegs 810 that protrude from the vertical support 808. In the illustrated embodiment, each hanger structure 802 comprises at least four hooks or pegs 810, which are vertically spaced apart from one another along the vertical support 808. The hooks or pegs 810 may be configured as buttons or like, as shown in FIG. 41, or the hooks or pegs 810 may have any other suitable configuration. Further, in addition to and/or as an alternative to hanging one or more panels 804 on the hanger structure 802 as described with respect to FIG. 39, one or more wear track profiles 250 may be hung on the hanger structure 802 as shown in FIG. 41, e.g., to facilitate cleaning of the conveyor system 100.

As depicted in FIGS. 42 and 43, the panels 804 may be removed from the hooks 806 and disposed on the top portion of the conveyor system 100, e.g., between two generally parallel lengths of conveyor track sections 200. More particularly, two generally parallel lengths of conveyor track sections 200 may be spaced apart laterally. The panels 804 may be disposed in the space between the lengths of conveyor track sections 200, for example, to prevent items conveyed on the mechanical chain 110 from falling into the space, to prevent debris or waste from processes occurring or carried out at the conveyor from falling into the space, to prevent a user or operator from accessing the space by reaching over the chain 110, etc. Thus, the panels 804 may improve the performance of operations carried out by, on, or at the conveyor system 100, help keep the conveyor system 100 clean (at least below the panels 804), and improve the safety of the conveyor system 100. The panels 804 may provide other advantages as well. Further, the panels 804 also may provide similar advantages when the panels 804 are hanging from the hooks 806. For instance, when hanging from the hooks 806 of the hanger structure 802, the panels 804 help block things from passing laterally from one side of the conveyor system 100 to the other above the conveyor track sections 200.

As shown in FIGS. 44 through 47, the conveyor system 100 may include other safety features and cleanliness features as well, according to exemplary embodiments of the present subject matter. For example, referring to FIGS. 44 and 45, the conveyor system 100 may include a blocking bar 850 that blocks lower sections 200 of the conveyor track assembly 299. It will be appreciated that the conveyor track assembly 299 may comprise a plurality of conveyor track sections 200 or may be a single conveyor track section 200. As shown in FIG. 44, the blocking bar 850 rotates into position under the mechanical chain 110, e.g., to prevent a user or an item from reaching the end section 200 of the conveyor track. Referring to FIG. 45, the blocking bar 850 rotates away from the conveyor track, e.g., to permit cleaning of the conveyor track, to permit removal of the chain 110, wear track profiles 250, and/or other components of the conveyor track assembly, etc. The blocking bar 850 may be configured similarly to the support member 602 of the panel mount assembly 600, including the pivot holder 622, without first arm 602a and support rest 620. As such, the blocking bar 850 may have an arm retained in a pivot holder that defines a tapered surface to permit the blocking bar 850 to pivot or rotate and one or more grooves that help hold the blocking bar 850 in position once rotated to a desired location. Further, in some embodiments, multiple blocking bars 850 may be provided along a length of a conveyor track assembly 299, e.g., to support the wear track profile 250 before it is secured to the base plate 210.

FIGS. 46 and 47 depict a cap 860 that is mounted at an end of the conveyor track assembly, e.g., to prevent items from being caught in the sprocket and/or chain adjustment assembly 500, according to an exemplary embodiment of the present subject matter. As shown in the figures, the cap 860 is shaped to cover the end section 200 of the conveyor track assembly, as well as the space from the end of the conveyor track assembly to the sprocket 144, without impeding the motion of the chain 110 and/or items conveyed by the chain 110. Moreover, the cap 860 is shaped such that it does not protrude laterally away from the conveyor system 100, thereby avoiding a potentially dangerous configuration in which a protruding cap could cause a user of the conveyor to trip or to fall into the conveyor or items being conveyed by the conveyor. The cap 860 thereby blocks items from falling or being pulled into the space between the end of the conveyor track assembly and the sprocket 144, as well as from being caught in the sprocket 144. Further, the cap impedes contamination, such as dirt, debris, or the like, from entering the chain adjustment assembly 500 and/or other portions of the conveyor system 100 covered by the cap 860. It will be appreciated that, in other embodiments, a cap 860 may be included adjacent each side of the chain 110 and/or on the lower section 200 of the conveyor track assembly. Moreover, one or more caps 860 may be used at the drive end 102 of the conveyor system 100 (e.g., near the drive sprocket 140) in addition to or without one or more caps 860 at the return end 104 (e.g., at the idler sprocket 144 as shown).

Turning to FIGS. 48 through 50, other safety features may be used as well. Referring particularly to FIG. 48, a shield 862 and a guard 864 may be positioned at and/or over one or both of the drive end 102 and the return end 104, thereby shielding the sprocket assembly 140 and/or the idler assembly 142 from contact by a user, a user's clothing, or other objects. That is, the shield 862 and the guard 864 help prevent accidents that otherwise could be caused by a user getting an appendage or his or her clothing caught in the mechanical chain 110, sprocket assembly 140, and/or idler assembly 142. More particularly, the shield 862 may be positioned over or adjacent any parts or components of the conveyor system 100 that may be moving and/or that may protrude from one or both ends 102, 104 of the assembly 100, e.g., that may protrude generally horizontally outward from the conveyor 100. For instance, the shield 862 may be supported by and/or attached to a stationary component of the conveyor system 100, e.g., a stationary component of the respective end 102, 104 and/or the respective rotational assembly, i.e., sprocket assembly 140 or idler assembly 142. The shield 862 may be positioned over the moving and/or protruding parts or components to help prevent a user from intentionally or inadvertently accessing such parts or components.

In the depicted exemplary embodiment, the shield 862 comprises a planar surface 866 facing a user side 150 of the conveyor system 100, e.g., where a user typically would stand when using the conveyor 100. Because the planar surface 866 does not have sharp corners or edges, having the planar surface 866 face the user side 150 may help prevent the user from snagging his or her clothing on the end 102, 104 of the conveyor system 100, from catching his or her knee and/or hand on the end 102, 104 of the conveyor system 100, etc. Moreover, an end 868 of the shield 862, which is farthest from a center or midsection of the conveyor system 100, is rounded or curved. The rounded or curved shape generally mimics the shape of the mechanical chain 110 at the ends 102, 104 (as the chain returns down the conveyor, where the links 112 transition from facing up to facing down, or is fed to the working surface, where the links 112 transition from facing down to facing up). Additionally, the rounded or curved shape of the shield 862 at its end 868 is smooth, i.e., without sharp corners or edges. Thus, similar to the planar surface 866, the rounded or curved shape of the end 868 may help prevent a user from snagging clothing and/or catching a body part on the shield 862.

Further, the shield 862 is stationary, unlike the mechanical chain 110, which moves linearly, and the sprocket assembly 140 or idler assembly 142, which rotate. As such, the shield 862 helps prevent contact between the user, the user's clothing, and the like and the moving parts of the conveyor system 100. In addition, the shield 862 may include two pieces, a first shield 862a that is positioned on the outer, user side 150 of the conveyor system 100 and a second shield 862b that is positioned on an inner side 152 of the conveyor system 100, which is opposite the user side 150. In some embodiments, the first and second shields 862a, 862b may be made as separate pieces that are separately supported by and/or attached to an appropriate feature of the conveyor system 100. In other embodiments, the first and second shields 862a, 862b may be two segments or portions of a single component, i.e., the first and second shields 862a, 862b may not be separate components but may be integrally formed as a single component. In either embodiment, the first and second shields 862a, 862b may be substantially identical, e.g., to help ensure both sides 150, 152 are shielded from an object being caught in the moving parts of the conveyor system 100. Thus, as described herein, the shield 862 (which may comprise both the first and second shields 862a, 862b) may help prevent pinching, crushing, falling, and/or other accidents that could happen if a user, a user's clothing, or other object was caught by or between moving part(s) of the conveyor system 100.

As further illustrated in FIGS. 48 through 50, the conveyor system 100 may include a guard 864, e.g., to enhance the safety of the conveyor 100. In the depicted embodiment, the guard 864 extends vertically above and below the shield 862 and extends axially beyond the ends of the shield 862. Further, the guard 864 is positioned between the shield 862 and the mechanical chain 110. Like the shield 862, the guard 864 is a stationary component of the conveyor system 100 and is attached to a stationary component of the conveyor system 100.

Moreover, as illustrated in FIGS. 49 and 50, the guard 864 may comprise a first guard 864a and a second guard 864b, which may be formed as two separate pieces or as parts of a single, integral component as described with respect to the first and second shields 862a, 862b. The first and second guards 864a, 864b project or extend above the exposed surface of the mechanical chain 110, with a relatively narrow gap 870 defined between the guards 864a, 864b. The mechanical chain 110 is disposed between the first guard 864a and the second guard 864b such that the first guard 864a is positioned on a first, user side 150 of the mechanical chain and the second guard 864b is positioned on a second side 152 of the mechanical chain, which is opposite the user side 150 and is an inner side of the conveyor system 100. Because the opening or entrance to the gap 870 is raised above the mechanical chain 110, and the gap 870 is relatively narrow, it may be hard for a user to have an appendage, clothing, or the like caught in the moving mechanical chain 110. Thus, the guard 864, which may comprise the first and second guards 864a, 864b, may help enhance the safety of the conveyor system 100 by reducing opportunities for a user, a user's clothing, or other object to become caught in, snagged by, etc. the mechanical chain 110. Also, as depicted in the exemplary embodiment of FIGS. 48-50, each of the first and second guards 864a, 864b extends beyond the end 102 or 104 of the conveyor system 100, which may also reduce opportunities for injury due to ensnarement in the sprocket assembly 140 or idler assembly 142.

Further, as shown in FIGS. 49 and 50, the guard 864 may be sized such that it does not interfere with the operation of the conveyor system 100. More particularly, an attachment 114 may be used with one or more links 112 of the mechanical chain 110, e.g., to raise a product conveyed by the mechanical chain 110 off the surface of the chain 110. The attachment 114 may be inserted into a link 112 designed to receive the attachment (e.g., as shown in FIG. 43) or may be formed with a link 112. For instance, the attachment 114 may include a cone-shaped portion 116 for receipt of a poultry carcass or a portion thereof. The guard 864, or each of the first guard 864a and second guard 864b, may have a height $h_{guard}$ at its highest or tallest point above the wear track profile 250 that does not impede the movement of the attachment 114, which may include when an object such as a poultry carcass (or portion thereof) is received on the attachment 114. Moreover, the guard 864 (or each of the first guard 864a and second guard 864b) may include a proximal end 872 and a distal end 874, where the proximal end 872 is closer to a center or midsection of the conveyor system 100 and the distal end 874 is opposite the proximal end 872 and is near or adjacent the end 868 of the shield 862. As illustrated in FIGS. 48 and 49, the guard 864 (or each of the first guard 864a and second guard 864b) may be angled from the proximal end 872 toward the distal end 874, e.g., the guard 864 may ramp up in height from a minimum height $h_{guard}$ at the proximal end 872 to a maximum height $h_{guard}$ between the proximal end 872 and the distal end 874. The angled or ramped configuration of the guard 864 (or each of the first guard 864a and second guard 864b) may help enhance the safety of the conveyor system 100, e.g., by eliminating an abrupt introduction of the guard 864 and a sharp corner where a user could catch a body part or clothing on the guard 864. Further, the distal end 874 of the guard 864 may be a generally smooth rounded or curved portion, like the shield 862, e.g., to eliminate a sharp corner or edge that could pose a hazard to a user.

As depicted in FIGS. 48 through 50, each of the shield 862 and guard 864 may be secured in place using one or more locking pins 876. For example, an aperture in the guard 864 may receive the pin body of a locking pin 876 and the pin body may also extend into a support to hold the guard 864 in place. Each locking pin 876 may include a ring 878, which, for example, may facilitate removal of the locking pin 876 such that the shield 862 and/or guard 864 may be removed for cleaning of the conveyor system 100. In other embodiments, instead of locking pins 876 to hold the guard 864 in place, the guard 864 may be received in a groove defined, e.g., in the shield 862. Other mechanisms or methods for securing the shield 862 and guard 864 in their respective positions with respect to one another and/or the conveyor system 100 may be used as well.

It will be appreciated that the shield 862 and guard 864 together may form a cover assembly 880. That is, the shield 862 and guard 864 may be installed together on the conveyor system 100 as an assembly 880, e.g., to enhance the safety of the conveyor system 100, to protect the respective end 102, 104 of the system 100 from contaminants, etc. Further, the cap 860 also may be part of the cover assembly 880. In some embodiments, each of the cap 860, shield 862, and guard 864 may be used to cover portions of one or both ends 102, 104 of the conveyor system 100. In other embodiments, two of the cap 860, shield 862, and guard 864 may be used to cover portions of one or both ends 102, 104 of the conveyor system 100, and in still other embodiments, only one of the cap 860, shield 862, and guard 864 may be used to cover portions of one or both ends 102, 104 of the conveyor system 100. In yet other embodiments, each of the cap 860, shield 862, and guard 864 may be omitted such that one or both ends 102, 104 of the conveyor system 100 are uncovered.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A conveyor system, comprising:
   a mechanical chain;
   a drive end, a sprocket assembly positioned at the drive end for driving the mechanical chain;
   a return end, an idler assembly positioned at the return end;
   a guard positioned adjacent at least one of the drive end and the return end, the guard including a first guard and a second guard, the first guard and the second guard defining a gap therebetween; and
   a locking pin extending through the guard and into a support, the locking pin securing the guard in place,
   wherein the mechanical chain is disposed between the first guard and the second guard such that the first guard is positioned on a first side of the mechanical chain and the second guard is positioned on a second side of the mechanical chain.

2. The conveyor system of claim 1, wherein the guard comprises a proximal end and a distal end, and wherein the guard ramps up in height from a minimum height $h_{guard}$ at the proximal end to a maximum height $h_{guard}$ between the proximal end and the distal end.

3. The conveyor system of claim 1, wherein the guard comprises a proximal end and a distal end, and wherein the distal end is rounded.

4. The conveyor system of claim 3, wherein the distal end is disposed farther from a center of the conveyor system than the proximal end.

5. The conveyor system of claim 1, wherein the first guard and the second guard each extend a height $h_{guard}$ above the mechanical chain.

6. The conveyor system of claim 1, further comprising:
   a shield positioned outward from the guard such that the guard is disposed between the shield and the mechanical chain,
   wherein the shield is positioned over at least one of the sprocket assembly and the idler assembly such that the at least one of the sprocket assembly and the idler assembly is not accessible by a user.

7. The conveyor system of claim 6, wherein the shield is attached to a stationary component of the conveyor system.

8. The conveyor system of claim 6, wherein the shield comprises a planar surface facing a user side of the conveyor system.

9. The conveyor system of claim 6, wherein an end of the shield farthest from a center of the conveyor system is rounded.

10. The conveyor system of claim 1, further comprising:
    a cap mounted at an end section of a conveyor track assembly of the conveyor system, the end section defining an end of the conveyor track assembly,
    wherein the cap is configured to cover the end section and a space between the end of the conveyor track assembly and the sprocket assembly.

11. A conveyor system, comprising:
    at least one mechanical chain having a plurality of links, the at least one mechanical chain configured for conveying items thereon;
    an upper profile for receipt of a portion of the at least one mechanical chain;
    a lower profile for receipt of another portion of the at least one mechanical chain;
    a support structure for supporting the at least one chain, the upper profile, and the lower profile;
    a drive end, a sprocket assembly positioned at the drive end for driving the mechanical chain;
    a guard positioned adjacent the drive end, the guard including a first guard and a second guard, the first guard and the second guard defining a gap therebetween;
    a shield positioned over the sprocket assembly, the shield including a first shield and a second shield; and
    a chain adjustment assembly including a ram that translates horizontally in and out of a housing, wherein the first guard is disposed between the mechanical chain and the first shield and the second guard is disposed between the mechanical chain and the second shield, and wherein the mechanical chain is disposed between the first guard and the second guard such that the first guard is positioned on a first side of the mechanical chain and the second guard is positioned on a second side of the mechanical chain.

12. The conveyor system of claim 11, further comprising:
a blocking bar configured to be positioned under a lower conveyor track assembly, the lower conveyor track assembly supporting the lower profile.

13. The conveyor system of claim 11, further comprising:
a panel mount assembly including a support member, an attachment block, and a panel attached to the support member using the attachment block, wherein the panel mount assembly is configured to block an area below the upper profile on the first side of the mechanical chain, and wherein the first side is a user side of the conveyor system.

14. The conveyor system of claim 11, further comprising:
a leveling assembly for leveling the mechanical chain, the leveling assembly including a leveling nut, a leveling screw, a sealing nut, a jam nut, a leveling pad, and a fastener.

15. The conveyor system of claim 11, further comprising:
a conveyor top protection assembly including one or more hanger structures for hanging one or more panels thereon, wherein each panel is configured to be disposed in a space between lengths of conveyor track sections.

16. A conveyor system, comprising:
a mechanical chain;
a drive end, a sprocket assembly positioned at the drive end for driving the mechanical chain;
a return end, an idler assembly positioned at the return end;
a guard positioned adjacent at least one of the drive end and the return end, the guard including a first guard and a second guard, the first guard and the second guard defining a gap therebetween; and
a panel mount assembly including a support member, an attachment block, and a panel attached to the support member using the attachment block, wherein the mechanical chain is disposed between the first guard and the second guard such that the first guard is positioned on a first side of the mechanical chain and the second guard is positioned on a second side of the mechanical chain, wherein the panel mount assembly is configured to block an area below the upper profile on the first side of the mechanical chain, and wherein the first side is a user side of the conveyor system.

17. The conveyor system of claim 16, further comprising:
a first shield positioned outward from the guard such that the guard is disposed between the first shield and the mechanical chain, wherein the first shield is positioned over at least one of the sprocket assembly and the idler assembly such that the at least one of the sprocket assembly and the idler assembly is not accessible by a user.

18. The conveyor system of claim 17, further comprising:
a second shield,
wherein the first shield is positioned on a user side of the conveyor system, and
wherein the second shield is positioned on an inner side of the conveyor system, the inner side opposite the user side.

19. The conveyor system of claim 16, further comprising:
a chain adjustment assembly including a ram that translates horizontally in and out of a housing.

20. The conveyor system of claim 16, a conveyor top protection assembly including one or more hanger structures for hanging one or more panels thereon, wherein each panel is configured to be disposed in a space between lengths of conveyor track sections.

* * * * *